US012668248B2

(12) United States Patent
Tisseur et al.

(10) Patent No.: US 12,668,248 B2
(45) Date of Patent: Jun. 30, 2026

(54) MOBILE DEVICE AND SYSTEM FOR AUTOMATED TRIP FAMILIARITY RECOGNITION AND CORRESPONDING METHOD THEREOF

(71) Applicant: Swiss Reinsurance Company Ltd., Zürich (CH)

(72) Inventors: Riccardo Tisseur, Aramengo (IT); Tobias Tekampe, Milan (IT)

(73) Assignee: Swiss Reinsurance Company Ltd., Zürich (CH)

( * ) Notice: Subject to any disclaimer, the term of this patent is extended or adjusted under 35 U.S.C. 154(b) by 571 days.

(21) Appl. No.: 17/933,623

(22) Filed: Sep. 20, 2022

(65) Prior Publication Data

US 2023/0128964 A1     Apr. 27, 2023

Related U.S. Application Data

(63) Continuation of application No. PCT/EP2021/074939, filed on Sep. 10, 2021.

(51) Int. Cl.
*B60W 40/08* (2012.01)
*G01C 21/30* (2006.01)
(Continued)

(52) U.S. Cl.
CPC ............. *B60W 40/08* (2013.01); *G01C 21/30* (2013.01); *G06N 20/20* (2019.01); *G06Q 50/26* (2013.01);
(Continued)

(58) Field of Classification Search
CPC ........... B60W 40/08; B60W 2540/227; B60W 2556/45; H04W 4/38; H04W 4/48;
(Continued)

(56) References Cited

U.S. PATENT DOCUMENTS 9,378,602 B2 *  6/2016  Ricci .................... G06Q 20/384
9,805,276 B2 * 10/2017  Pillai .................... B60W 40/08
(Continued)

FOREIGN PATENT DOCUMENTS

EP        3 091 498 A1    11/2016

OTHER PUBLICATIONS

International Search Report mailed Apr. 1, 2022 in International Application No. PCT/EP2021/074939.

*Primary Examiner* — Andrea C Leggett
(74) *Attorney, Agent, or Firm* — Oblon, McClelland, Maier & Neustadt, L.L.P.

(57) ABSTRACT

A method and system for electronic trip familiarity detection based on sensory data measured by a plurality of sensors of a mobile telematics device associated with a user and/or a vehicle, the plurality of sensors at least comprising a GPS sensor and/or an accelerometer, the mobile device comprising one or more wireless connections, wherein by at least one of the wireless connection the mobile device acts as a wireless node within a cellular data transmission network by means of antenna connections of the mobile device to the cellular data transmission network, and the plurality of sensors being connected to a monitoring mobile node application of the mobile device, wherein the monitoring mobile node application captures usage-based and/or user-based sensory data of the plurality of sensors of mobile device.

16 Claims, 35 Drawing Sheets

(51) Int. Cl.

| | |
|---|---|
| *G06N 20/20* | (2019.01) |
| *G06Q 50/26* | (2012.01) |
| *G06Q 50/40* | (2024.01) |
| *H04W 4/02* | (2018.01) |
| *H04W 4/029* | (2018.01) |
| *H04W 4/38* | (2018.01) |
| *H04W 4/48* | (2018.01) |

(52) U.S. Cl.
CPC ............ *G06Q 50/40* (2024.01); *H04W 4/027* (2013.01); *H04W 4/029* (2018.02); *H04W 4/38* (2018.02); *H04W 4/48* (2018.02); *B60W 2540/227* (2020.02); *B60W 2556/45* (2020.02)

(58) Field of Classification Search
CPC ...... H04W 4/029; H04W 4/027; G06N 20/20; G06Q 50/40; G06Q 50/26; G01C 21/30
See application file for complete search history.

(56) References Cited

U.S. PATENT DOCUMENTS

| | | | | |
|---|---|---|---|---|
| 10,630,723 | B1 | 4/2020 | Prasad et al. | |
| 11,683,347 | B1 * | 6/2023 | Prasad .................. | G06Q 50/40 |
| | | | | 726/1 |

* cited by examiner

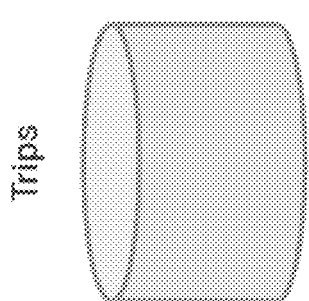
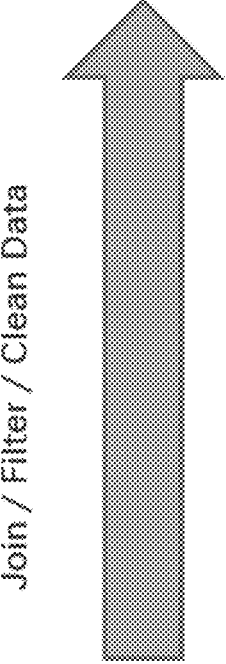
Join / Filter / Clean Data
Trips
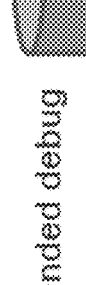
Extended debug
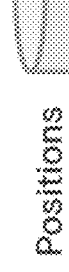
Positions
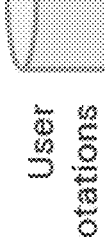
User Annotations
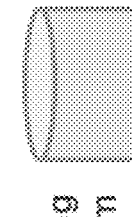
Operating System Activities
Accelerometers
Fig. 8

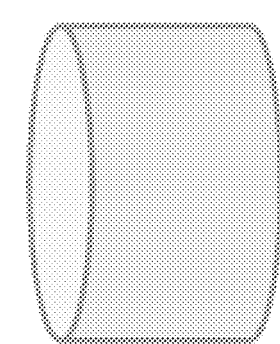
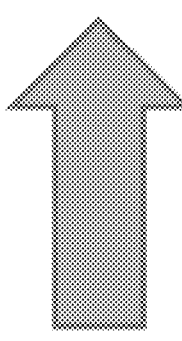
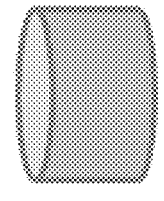
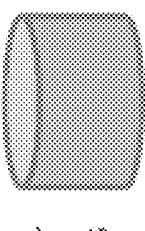
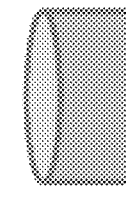
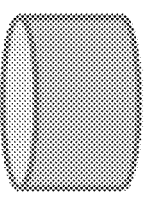
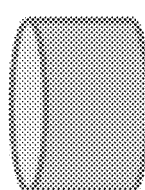
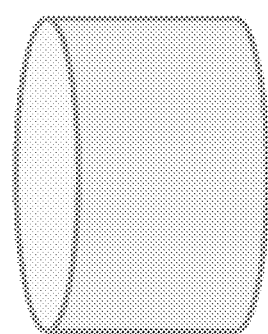
Feature vectors
GPS Features
Accelerometer Features
GFE
RME
OS Activities
Enriched Trips
Fig. 13

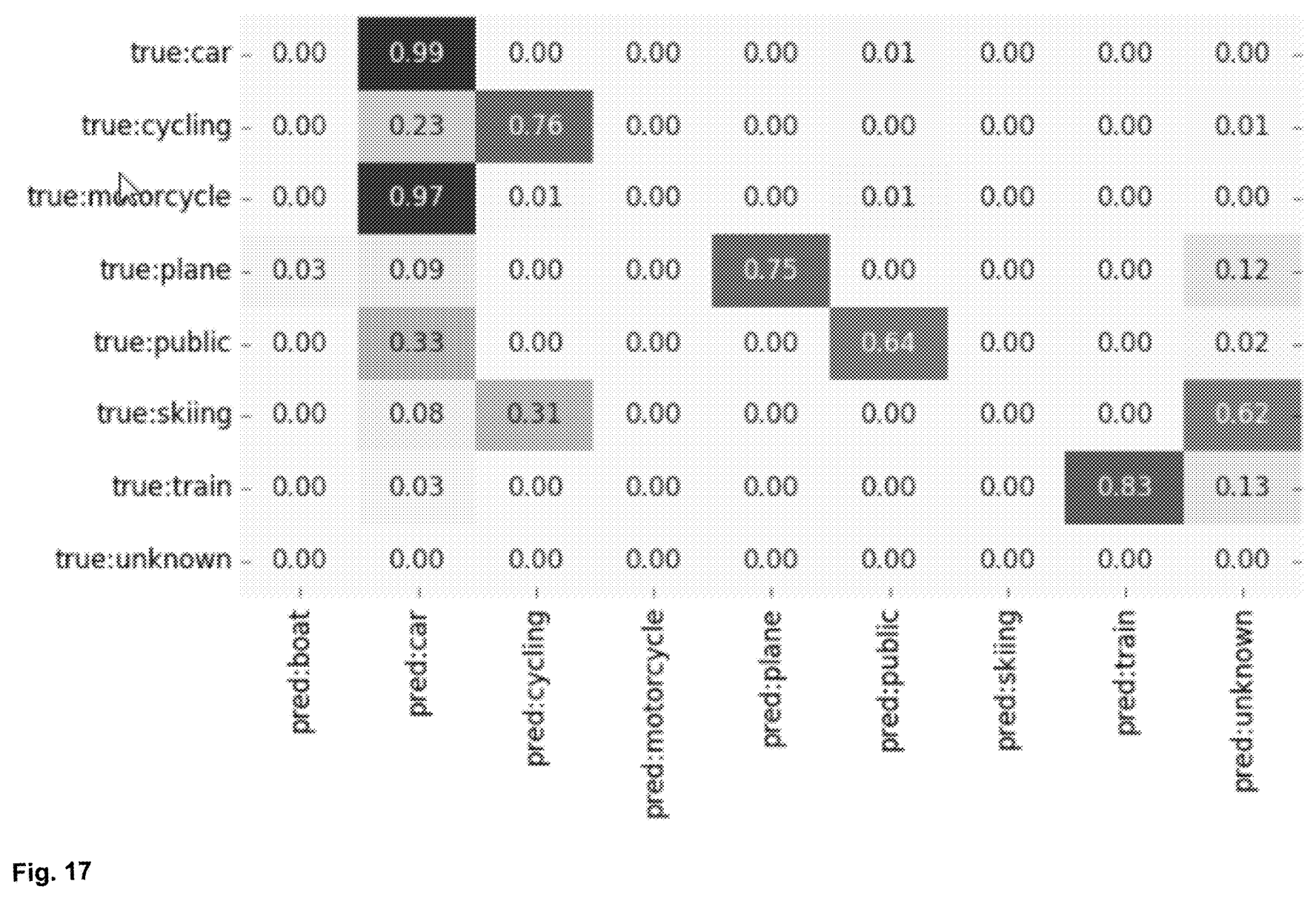

| | true:car | true:cycling | true:motorcycle | true:plane | true:public | true:skiing | true:train | true:unknown |
|---|---|---|---|---|---|---|---|---|
| pred:unknown | 0.00 | 0.01 | 0.00 | 0.12 | 0.02 | | 0.13 | 0.00 |
| pred:train | 0.00 | 0.00 | 0.00 | 0.00 | 0.00 | 0.00 | | 0.00 |
| pred:skiing | 0.00 | 0.00 | 0.00 | 0.00 | 0.00 | 0.00 | 0.00 | 0.00 |
| pred:public | 0.01 | 0.00 | 0.01 | 0.00 | | 0.00 | 0.00 | 0.00 |
| pred:plane | 0.00 | 0.00 | 0.00 | | 0.00 | 0.00 | 0.00 | 0.00 |
| pred:motorcycle | 0.00 | 0.00 | 0.00 | 0.00 | 0.00 | 0.00 | 0.00 | 0.00 |
| pred:cycling | 0.00 | | 0.01 | 0.00 | 0.00 | 0.34 | 0.00 | 0.00 |
| pred:car | 0.99 | 0.23 | 0.97 | 0.09 | 0.33 | 0.08 | 0.03 | 0.00 |
| pred:boat | 0.00 | 0.00 | 0.00 | 0.03 | 0.00 | 0.00 | 0.00 | 0.00 |

Fig. 17

| | true:car | true:cycling | true:motorcycle | true:plane | true:public | true:skiing | true:train | true:unknown |
|---|---|---|---|---|---|---|---|---|
| pred:unknown | 0.04 | 0.20 | 0.13 | 0.38 | 0.12 | 0.90 | 0.01 | 0.00 |
| pred:train | 0.00 | 0.00 | 0.00 | 0.00 | 0.00 | 0.00 | 0.98 | 0.00 |
| pred:skiing | 0.00 | 0.00 | 0.00 | 0.00 | 0.00 | 0.00 | 0.00 | 0.00 |
| pred:public | 0.00 | 0.01 | 0.01 | 0.00 | 0.87 | 0.00 | 0.00 | 0.00 |
| pred:plane | 0.00 | 0.00 | 0.00 | 0.95 | 0.00 | 0.00 | 0.00 | 0.00 |
| pred:motorcycle | 0.00 | 0.00 | 0.03 | 0.00 | 0.00 | 0.00 | 0.00 | 0.00 |
| pred:cycling | 0.00 | 0.97 | 0.00 | 0.00 | 0.00 | 0.08 | 0.00 | 0.00 |
| pred:car | 0.90 | 0.01 | 0.84 | 0.03 | 0.13 | 0.00 | 0.01 | 0.00 |
| pred:boat | 0.00 | 0.00 | 0.00 | 0.00 | 0.00 | 0.00 | 0.00 | 0.00 |

Fig. 18

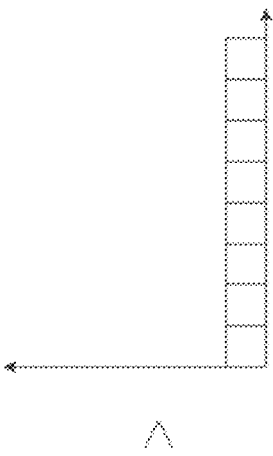
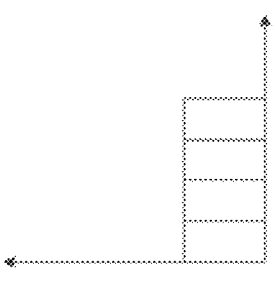
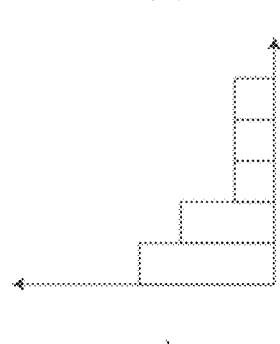
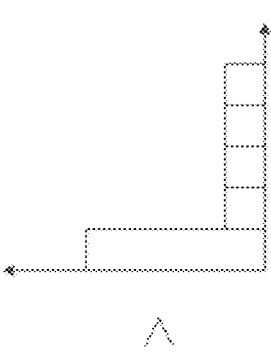
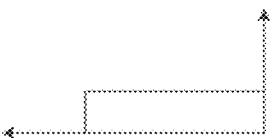
Fig. 20 clustering through linkID bag of links: linkIDs frequency start & stop

MOBILE DEVICE AND SYSTEM FOR AUTOMATED TRIP FAMILIARITY RECOGNITION AND CORRESPONDING METHOD THEREOF

FIELD OF THE INVENTION

The present invention relates generally to sensor-based, electronic trip familiarity recognition systems and devices particularly to systems and methods for mobile phone sensory data, as smartphone sensory data based transportation mode detection, and/or in-car sensor measuring data based trip familiarity recognition or detection. More generally, the invention relates to mobile real-time systems reacting dynamically to captured sensory data based on dedicated environmental or operational parameters, in particular to automotive use monitoring, capturing, and reacting to automotive or user-related parameters in the context of motor vehicle operation. More particularly, the present invention relates to telematics based devices and systems for trip familiarity recognition or detection. Finally, the invention also relates to telematics-based real-time recognition and detection systems. The term telematics, in particular traffic telematics, refers to sensory systems that are used for communications, instrumentation and control, and information technology in the field of transportation, such as land-based or maritime or air-based transportation. Thus, the present invention relates to the use of telematics and/or mobile phone sensory data together with real-time measuring, monitoring, dynamically and automatedly adapting systems based on captured and measured usage-based and/or user-based telematics data.

BACKGROUND OF THE INVENTION

In daily live, trip pattern and trip behavior pattern of people, irrespective of walking, cycling, driving, or using public transportation, are typically similar or itself similar in familiar environments. This makes automated trip recognition possible. Automated detection and sensory-based recognition of the trip chains (in particular door-to-door trip chains) of people has a multitude of technical applications. For infrastructure planners, public transport providers, and/or large area steering controlling and optimization of traffic control systems etc. measurements and knowledge of the origins, destinations and volumes of commuters or other persons moving from one location to another are the fundamentals of understanding of technical requirements for the road and transport networks, road infrastructures and traffic control systems.

To assist users in private or public transport with relevant information about opportunities and problems it is technically vital to be able to generate a prediction of the next destination, time of travel and the means of public transport the person is going to use. For many people the same trips are repeated with regular cycles, i.e. daily, on (certain) weekdays, weekly or monthly. Such travelers can be proactively given targeted information about disruptions in road traffic or public transport lines, which they frequently use, at their personal times of regular usage. Thus, real-time recognition of trips based on trip familiarity pattern and of the current means of transport and a prediction of the likely destinations are mandatory when e.g. connecting to a traveler or mobile devices as smart phones of a traveler for many technical reasons.

Further, familiarity of trips of a certain traveler has in many cases, such as car travels, direct impact on measurements of occurring accident probabilities, e.g. in relation to car trips, not only in respect to the chosen path in a specific environment, but also in respect to the driver's familiarity with a trip, itself. It is a known fact that road safety is closely related to human factors, which play a crucial role in about 90% of crashes. Among all driver-related crash variables, the present invention is specifically focused on trip familiarities and accompanying with it the drivers' route familiarity, and its multiple relationships with road safety. In contrast to trip familiarities, denoting the frequency of choosing a certain or familiar trip, route familiarity is herein defined as a specific driver's familiarity with the routes on a chosen trip repeatedly travelled and thus, with the familiarity of a driver with the road elements they consist of. The word familiarity in the context of route familiarity relates to the frequency of having experienced a given stimulus in the past, while the word familiarity in the context of trip familiarity relates to the similarity of (frequent) chosen trips. Hence, by applying these preliminary concepts, a route familiar driver is a driver who is travelling on a frequently chosen trip well-known from long or close association, and the travelling on that specific trips is composed of different routes and road elements has been the stimulus repeatedly experienced.

It is to be noted, that drivers may also travel in different vehicles and under many personal, environmental, traffic conditions, with which they may be familiar or unfamiliar. All these factors could be influential: for example a driver can be suggested to be trip familiar only at specific hours or in given conditions. For appropriate risk measurements, e.g. the measurements of a probability for the occurrence of an accident on a certain trip, an automated system should be able also to capture on the effects of drivers' familiarity/unfamiliarity with given trip, unseen other familiarity aspects of the system human-vehicle-environment.

The trip familiarity condition can be easily associated to the recurrent driving task undertaken while going almost every day to the same workplace (such as commuters), school, shop, etc. Hence, route familiarity is a very common condition for drivers (or movement pattern in general) worldwide. Some examples of the significant number of trip familiarity drivers in the traffic flow are reported as follows. About one third of the vehicle-miles travelled by American private vehicles are for commuting. More than 60% of a surveyed Italian sample repeat a given trip at least 3 days a week and more than 60% of the average daily trips. One of the reasons to consider route familiarity is because of its influence on driving behavior. However, by affecting driving behavior, route familiarity can influence road and traffic behavioral-based safety aspects. Nevertheless, in prior art systems, the impact of route familiarity by measuring trip familiarities, e.g. on road safety aspects, is missing. Thus, there is further a need for automated systems enabled to capture the effect of the relationships between trip familiarity, route familiarity and road safety. Moreover, while it is possible to provide a basic definition of trip and route familiarity, and some exemplifications of familiar drivers such as commuters, the prior art lacks a system enabled to precisely measure, classify and categorize different levels of route familiarity. This means that finding a clear threshold for determining when an unfamiliar driver starts becoming familiar after a given frequency of travelling on the same trip is difficult. One of the major technical issue is the difficulty in comparing results from measurement.

Trip familiarity and thus drivers' route familiarity has consequences for road safety because it affects the driving task itself. The driving task is complex and is often defined as complex, organized in different hierarchical levels described through different levels of performance. Moreover, driving tasks can both require attention, or being partly/totally automatic in given conditions. By combining driving task levels and performances having the focus on familiarity, the following relationship arises: (A) Familiarity can be related to skill-based task automation, requiring less attention (such as in a commuting travel, while negotiating familiar road elements or operating short-term driving patterns). The switch to automation is possible in the case of familiarity with one or more factors of the road system (i.e. with the road, the vehicle, the environment). However, drivers familiar with these factors can also shift to rule-based behaviors (for example in unfamiliar cars, by applying well-known rules to other vehicles); (B) Unfamiliarity can be related to the knowledge-based driving task consciousness, requiring attention to address the unknown situation (such as being a first-time driver, or while navigating in unfamiliar environments or operating unfamiliar maneuvers, as skilled drivers).

To technically capture the habituation process prior art systems are often based on a dual-process approach. People exposed to the same repeated stimulus over time, progressively decrease their response to that stimulus until an asymptotic value is reached. However, this habituation effect can last for short or long-term periods (even weeks: long-term habituation), where prior art systems are typically not able to parameterize this time variance. Additionally, in the case of a novel stimulus some responses can be recovered: in the so-called dishabituation effect. The response further decays, whether or not the stimulus is maintained. When driving on the same trip in given boundary conditions is the repeated stimulus, then one should expect drivers to get progressively habituated to it. Thus, drivers' responses should asymptotically approach a low level, at which the mental workload and the attention capacity can be greatly decreased, as explained through the Malleable Attentional Resources Theory (MART). However, in a low attention condition, the mind can be unconsciously occupied by non-driving-related thoughts, referred to as mind wandering". Moreover, the less demanding is the driving scenario, the more time may be spent driving with a wandering mind. Therefore, the acquired route familiarity based on measured trip familiarities can possibly foster drivers' distraction, through mind wandering.

This possible relationship between the measured trip and route familiarity and distraction may be influential in road safety. In fact, distraction is a crucial causal factor for crashes and driving errors. These findings are coherent with the "law of cognitive capacity": the more cognitive capacity is reduced (in this case through distraction), the more the accident rates increase. A two-fold effect of familiarity can be assumed: it can induce distraction by deteriorating the response to hazardous events, but also lead to overconfidence and risk underestimation. The overconfidence of familiar drivers could be explained by the optimism bias in perceiving accident risks, which increases with driving experience, and is potentially transferrable to the trip familiarity case. Coherently, the perceived involvement of familiar drivers in accidents may be underestimated with respect to that of unfamiliar drivers compared to actual rates. In addition, route familiarity is often measured among the self-perceived safest driving conditions. This often result in overconfidence measures in the prior art systems.

Moreover, habituation can also be noted in the case of behavioral adaptation to road changes, i.e. the collection of unintended behaviors that follows the introduction of changes to the road transport system. Drivers' adaptation is troubling if road safety measures induce negative behavioral changes (e.g. speeding and less concentration in the case of lighting or decreasing compliance to enforced speed limits over time). Adaptation is possible only if drivers are repeatedly exposed to countermeasure, then the measure is easily noticed, likely to exclude cases in which it is aimed at reducing crash outcomes (e.g. restraint systems). Route familiar drivers may be particularly subject to adaptation, since they can repeatedly test the new condition (i.e. the safety countermeasure) and get used to it, following the usual habituation process and modifying their behavior.

A simplified equation for quantifying the risk R of an event is: $R = P \times L$ where P=Measured probability of the event, I=Intensity of consequences or impacts. It can be measured in an abstracted term of losses (such as the replacement cost induced by traffic accidents as occurring event).

Though it is clear, that road safety measures can reduce the accident probability (e.g. in the case of lighting), drivers who perceive this improvement, could feel safer and modify their behavior in order to reduce travel times (by driving faster), or mental workloads (by being less focused on driving, as in the case of lighting). However, these behavioral tendencies are associated with higher risks, able to undermine the risk reduction partially or totally. This phenomenon represents the downside of behavioral adaptation (previously associated with familiar drivers): so-called "risk compensation". Though, such effects are known, the prior art measuring systems are typically not able to cope with the technical challenges to capture such complex interrelations.

Regarding the available sensory means, up-to-date engineered car driving (including completely manually controlled driving, partially autonomous car driving, driverless cars, self-driving cars, robotic cars) is associated with vehicles that are capable of sensing their environment and operational status or use. At the same time, the use of sensors in cellular mobile phones, in particular in so called "smart phones", has strongly increased in recent years, making it possible to monitor or to time-dependently track the operation mode of the smart phone as well as surroundings, use or even behavior of the user. Modern, mobile smart phones comprise a variety of sensors, as touchscreens, accelerometers, gyroscopes, GPS, cameras, microphones etc., allowing to capture a vast mixture of contextual parameters during the use of the mobile device. On the other side, digital systems of the vehicle can include transceivers and/or interfaces that are configured to communicate with a driver's mobile phone. Typically, the driver can utilize the vehicle computer system to handle hands-free communication utilizing vehicle features. For example, the conversation can be output on vehicle speakers and a vehicle mic may be utilized to pick up. Other occupants and/or passengers can be in the vehicle when a driver has initiated a voice session.

The communication between the mobile device and the computer system of the vehicle can related to other data than voice transmission, since modern automotive engineered vehicles are capable of detecting a wide variety of operational or surrounding parameters using for example radar, LIDAR (measuring device to measure distances by means of laser light), GPS (Global Positioning System), odometry (measuring device for measuring changings in position over time by means of using motion sensor data), and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity into a signal that can be read by an observer or by another instrument, circuit, or system. Commonly used sensors for automotive motor vehicle or mobile cell phones are for example infrared sensors containing an infrared emitter, and an infrared detector, for example used with touchless switches, passive infrared (PIR) sensors reacting and detecting only on ambient IR such as motion sensors, speed detectors e.g. radar guns such as microwave radars using the Doppler effect (the return echo from a moving object will be frequency shifted) or IR/Laser radars sending pulses of light for determining the difference in reflection time between consecutive pulses to determine speed, ultrasonic sensors emitting a sound and detecting the echo to determine range, accelerometers measuring the rate of change of the capacitance and translating it into an acceleration by means of a proof mass, gyroscopes measuring a mass oscillating back and forth along the first axis, and plates on either side of the mass in the third direction where the capacitance changes when a rotation is detected around the second direction, IMU-sensors (Inertial Measurement Unit) providing a sensor with a full 6-degrees of freedom by using a combination of accelerometer and gyroscope, force sensing resistor e.g. for contact sensing, touchscreens based on resistive, capacitive or surface acoustic wave sensing, location sensors such as GPS (Global Positioning System), triangulation or cell identification systems, visual sensors such as cameras and computer visions, SIM-based or RFID-based (Radio-Frequency Identification) sensors, or environment sensors as moisture sensors, humidity sensors, temperature sensors, magnetometer etc. Due to the improved assistance by such digital systems and sensory data, vehicle driving is steadily becoming safer by incorporating automated systems to monitor operations of the vehicle while the vehicle is in motion and to provide coordinated alerts and assistance as needed.

In summary, difficulties remain in reliable and automated detection of trip familiarity and measurements of route familiarity and associated risk measuring. Trip familiarity recognition is important for many technical applications, including transportation in-depth monitoring and machine-based intelligence analysis, urban planning, health monitoring, computer supported elder-care, epidemiology, etc. With the knowledge of travelers' trips and trip frequencies, targeted and customized electronic advertisements may be routed and sent to their devices. This information is also useful for the development of context aware cell phones that sense the current context and adapt their behavior accordingly. Also, if the precise trip familiarity (e.g. together with transportation modes) of individual users are detected, measured and/or monitored, it is possible to provide a more realistic picture of travel demand. This knowledge may help to determine the environmental impact of travel patterns, such as carbon footprints of users and optimize the travel patterns or track the daily step count of users and amount of calories they burn etc. Another application is the detection of real-time traffic states because companies such as Google collect data from mobile phones in order to estimate and measure the traffic speed on roads, or technical traffic guidance systems or navigation systems for optimization of traffic lightening, in particular real-time steering. Again, in the context of automated detection of trip familiarity (e.g. together with transport modes) it is important to differentiate between the different applied classifications. The accurate classification of trip familiarity (again, e.g. together with transport mode recognition and classification) can be critical when the system is intended to trigger assistance or enact measures to inform, warn, or protect a user or in measuring user-specific exposure parameters in the context of possibly impacting or affecting occurring event, as accidents or disaster events.

To determine trip familiarity and/or mode of transportation based on smartphones, the data from different built-in smartphone sensors can be used. Most modern smartphone devices have sensors that measure motion, orientation, and various environmental conditions. They are capable of providing data with high measuring precision and accuracy. These sensors are useful for monitoring three-dimensional device movement or positioning, or for monitoring changes in the ambient environment near a device. Motion sensors include accelerometers, gravity sensors, gyroscopes, and rotational vector sensors. Position sensors include orientation sensors and magnetometers. Environmental sensors include barometers, photometers, and thermometers. In addition to mobile device sensor information, some external data source can also be valuable.

The smartphone sensors and external data sources typically employed in trip and/or transportation measuring can be summarized as follows: (A) Accelerometers are able to measure the physical motion of a solid object. Id est, they measure the acceleration force that is applied to a device on all three physical axes, including the force of gravity. Accelerometers are primarily used for orientation sensing in smartphones. However, trip and/or transportation measuring shows that the acceleration generated during human movement varies across the body and depends upon the activity being performed. The key feature that makes this sensor attractive is low energy consumption; (B) Gyroscope measures a device's rate of rotation around each of the three physical axes. It can provide orientation information and provides an additional dimension to the information supplied by the accelerometer. Gyroscopes are typically characterized by low power consumption, but are, however, prone to error accumulation as a result of significant calibration errors, electronic noise, and temperature; (C) Magnetometer measures the ambient geomagnetic field for all three physical axes. It provides mobile phones with a simple orientation in relation to the Earth's magnetic field; (D) Global Positioning System (GPS) sensor provides the position and velocity of the user that is measured based upon the distance of the mobile phone and each of a number of satellites in two dimensions. Connection to at least three satellites is required for two-dimensional positioning, and the precision increases with more visible satellites. GPS does not work indoors, and is therefore primarily used for outdoor positioning. A further technical limitation is, that it is characterized by reduced precision of positioning in dense urban environments, due to the fact that buildings reflect and occlude satellite signals. GPS is considered as the most power consuming localization technique for mobile computing, and it reduces the battery life of the phone significantly. The accuracy of this system is between 50 to 80 meters and can be improved to an accuracy of up to 10 meters; (E) Cellular network signals are used by the phone for calls and data transfer. The most widespread cellular telephony standard in the world is Global System for Mobile Communication (GSM). A GSM base station is typically equipped with a number of directional antennas that define sectors of coverage or cells. A cell is therefore a geographic region in a cellular communication network within which mobile devices can communicate with a particular base station. Each cell has a unique cell identifier. The fluctuation pattern of cell identifiers together with signal strength can provide information on the position of a phone. To collect this type of data, an application that measures and records the surrounding radio environment has to be installed on a mobile device. Mobile phones can be tracked in outdoor and indoor contexts. A precision varies depending on cell size from 50 to 200 meters, but can deteriorate even more in low density areas. Cellular network signals are associated with "ping-pong" phenomenon, which appears when a user is within the coverage of two or more stations. Signal strength from the stations fluctuates and causes repetitive changes of associated cell even when users are stationary. The data from mobile phone operators can be analyzed consisting of anonymous location measurements generated each time a device connects to the cellular network (e.g. when a call is placed or received, when a short message is sent or received, when the user connects to the Internet, etc.). However, these measurements are available only during the time that the device is in use, or when the associated cell changes over time (e.g. during a trip); (F) Bluetooth allows wireless connectivity and short range communication. Bluetooth sensors are able to sense devices in their vicinity, and to obtain their Bluetooth identifiers, names and types. The range of Bluetooth scanners and penetration rate vary between 10 to 100 meters, respectively between 7% and 11%; (G) WIFI provides wireless connectivity to devices inside a Wireless Local Area Network (WLAN). The WLAN provides communication ranges of up to 100 meters and allows to track devices outdoor and indoor. Smartphones do not need to be logged on to the WLAN, but their WIFI antennas has to be turned on. The positioning accuracy is low. It is possible to improve the localization in case when there is more than one access point available using for instance signal triangulation and fingerprinting. WIFI is the most power-demanding sensor after GPS when used to provide location information. The effect called "ping-pong" is also typical for WIFI data; (H) Other sensors include barometers that measure atmospheric pressure and can be used to detect how high the phone is above sea level, thermometers and humidity sensors that measure ambient temperature and air humidity, cameras, microphones, etc.; and (I) External data sources can provide additional useful information in trip and/or transportation measuring. They include network infrastructure data and route maps, as well as the time schedules of public transportation in a static or a real-time form.

In the prior art systems, raw data measured and collected by different smartphone sensors are typically transformed into more computationally efficient and lower dimensional sets of features. The extracted features are intended to be informative and e.g. relevant for the learning task. A variety of feature-extraction techniques are used in the state of the art, based on different data processing approaches, algorithm structures and statistical procedures. The raw sensor data are typically segmented into several windows and features are extracted from a window of samples. The window size, as well as the sampling frequency, are important parameters, as they both affect computation and power consumption of sensing algorithms. Smaller window sizes cause classification accuracy to suffer due to certain features not being effective (e.g. accelerometer frequencies) and larger window sizes may introduce noise in the data.

Time domain and frequency domain features are used for trip familiarity and/or transportation mode detection tasks. Time domain features are used to characterize the information within the time varying signal. Many prior art systems use raw speed or acceleration data, and GPS positioning information over time as input features. The difference in distance covered between measurements and heading changes are used in addition. For accelerometer signals, the features such as mean, standard deviation, median, minimum, or maximum of the signal are the most commonly used in time domain. GSM signal strength and cell tower fluctuations are utilized for inferring different states of user motion. Frequency domain features are regarded as technically more computationally demanding compared to the time domain features. This is due to an additional processing step, related to the data transformation from the time to the frequency domain. An example of these features is the peak frequency of the power spectral density of the accelerometer signal. Finally, features extracted based on external data typically include bus location closeness, bus stop closeness and rail line closeness.

The prior art algorithm structures used for trip familiarities and/or transportation mode detection can typically be categorized as discriminative or generative. Generative algorithms are based on modelling and/or simulating class-conditional probability density functions and backward in time probabilities. As such, they allow to generate samples from the derived joint distributions, and are typically flexible in expressing dependencies in complex learning tasks. For this group, structures of prior art systems comprise the algorithms Naïve Bayes, Bayesian Networks, Mixture Models and Hidden Markov Models. Discriminative algorithms do not attempt to model underlying probability distributions. Instead, they are focused on a direct estimation of posterior probabilities. Popular discriminative algorithms include Support Vector Machines, Neural Networks, Nearest Neighbor, Decision Tree, Random Forests, Clustering, etc.

The prior art document U.S. Pat. No. 10,630,723 B1 shows a system for adjusting policy characteristics based on a determined similarity between routes. A similarity metric may be determined indicating the similarity between a first route followed by a vehicle and/or driver and a second (e.g., previous) route followed by the vehicle and/or driver. An appropriately defined similarity metric indicates the similarity in movements, and changes in movement, exhibited by the vehicle on the routes. In particular, the similarity metric is determined through an applied analysis of real time data collected by in-vehicle sensors, mobile user devices, external sensors, or other data sources. Based on the similarity metric, a premium, a deductible, a price, or other characteristics of a policy is determined. As a variant, the policy characteristics are adjusted (e.g., in real time) based on the analysis according to changing risk conditions if a driver is following routes that are dissimilar from typical routes. Finally, EP 3 091 498 A1 discloses a mobile-device-based system for classifying a mode of transportation during a trip. The system includes a mobile device including a location detection system and an accelerometer. The mobile device collects location data and acceleration data during the trip. The system also includes a data processing unit for receiving the location data from the mobile device, for receiving contextual data related to a plurality of transportation systems, and for processing the location data and a first portion of the contextual data using a first transportation mode classifier associated with first transportation systems and a second portion of the contextual data using a second transportation mode classifier associated with second transportation systems. The data processing unit further classifies the mode of transportation during the trip and update the classifiers based on user input.

SUMMARY OF THE INVENTION

It is one object of the present invention to provide a more reliable and accurate automated system for automated trip familiarity detection based on measured sensory data of a mobile device, such as a cellular mobile phone or a smart phone. The mobile device should be able to automatically detect and identify familiarities of trips and/or routes. Further, the system should not be limited to frequency-based or distance-based or mode-based detection. Independent of possibly available, dedicated in-vehicle hardware, may be providing alternative solutions, the invention shall provide an appropriate system and method for trip familiarity detection, in particular real-time trip familiarity detection, and more particularly continuous real-time or near real-time tracking and familiarity detection, solely based on the available sensors of a smartphone of a smartphone user. The output signaling of the trip familiarity detection should achieve an accuracy to be usable for as input signaling for electronically triggering or steering various technical, trip familiarity dependent processes and systems, such as navigation systems, traffic control systems or risk-measuring systems, in particular usage-based risk-transfer processes and/or appropriate usage-based real-time risk-transfer systems, the automated usage-based real-time risk-transfer systems being enabled by the signaling of the electronic trips familiarity detection to perform the location and/or familiarity dependent risk-transfer processes.

According to the present invention, these objects are in particular achieved with the features of the independent claims. In addition, further advantageous embodiments can be derived from the dependent claims and the related descriptions.

According to the present invention, the above-mentioned objects for trip familiarity detection based on sensory data measured by one or more sensors of a mobile device of the trip familiarity detection system associated with a user and/or a vehicle are in particular achieved in that the one or more sensors at least comprising a GPS sensor and/or an accelerometer, the mobile device comprising one or more wireless connections, wherein by at least one of the wireless connection the mobile device 10 acts as a wireless node within a cellular data transmission network by means of antenna connections of the mobile device to the cellular data transmission network, and the one or more sensors being connected to a monitoring mobile node application of the mobile device, wherein the monitoring mobile node application captures usage-based and/or user-based sensory data of the one or more sensors of the mobile device, in that the mobile device measures a plurality of time series of sensory parameter values based on measuring parameters obtained from the mobile device's sensors, each time series at least comprises a time series of sensory parameter values of location and/or speed measurements of the GPS sensor, wherein the GPS sensor measures the mobile device's longitude, latitude and altitude positions as time series by measuring different speed of light delays in the signals receiving from two or more satellites, in that for each measured time series, a start point and an end point of at least a part of a measured time series of sensory parameter values is detected triggering the allocation of the at least part of the measured series to a specific trip having the detected start point and the detected end point, in that for any pairing of detected trips, a first geographical distance between the detected start points of said trip pairing and between the end points of said trip pairing is measured based on the GPS-based location parameter values of the sensory parameters 32 of the at least part of the measured series, and a second geographical distance between the detected start point of a first trip and the detected endpoint of a second trip of said trip pairing and between the detected start point of the second trip and the detected endpoint of the first trip of said trip pairing is measured based on the GPS-based location parameter values of the sensory parameters of the at least part of the measured series, in that a third geographical distance is measured by measuring for each of the two trips of the pairing a trip length between the detected start and end points of each trip of the trip pairing, where the third geographical distance is given by the relative difference of the two measured trip lengths, and in that the three measured geographical distances are mutually normalized mapping the measured geographical distances into a range between 0 and 1 by applying a modified sigmoid transfer by mapping the three measured geographical distances in a normalized range from 0 and 1, wherein an overall familiarity parameter value is measured by composing the three normalized geographical distance values to a weighted average of the three normalized geographical distance values, wherein the measured overall familiarity parameter value in a normalized range from 0 and 1, and wherein an overall familiarity parameter value of 0 indicated identical trips and an overall familiarity parameter value of 1 completely different trips. As an embodiment variant, the mobile device can also access sensory data of external sensory devices, as e.g. in-car sensors, or smart-house sensors, over interfaces as Bluetooth or WIFI etc. It is to be noted that the trip length is not just the geographical "air" distance between start and end point, but either takes into account the route matching or can e.g. be generated as the sum over the point to point distance of all the GPS points in the trips time series. Otherwise circular trips would have 0 distance.

As an embodiment variant, clusters can e.g. be stored having start and end regions with a defined radius. The center of a start and/or end region can e.g. be defined by the average of all start and end points of trips associated with a cluster and the radius is defined as the respective standard deviation. For a cluster, additionally an average travelled distance and its standard deviation can e.g. be generated and stored by the system 114. A trip can e.g. be matched by generating the distance between start and/or end points in units of the respective radius and the distance in terms of travelled kilometers in units of the standard deviation.

As a further embodiment variant, trips can e.g., be clustered using an agglomerative clustering by a machine learning structure grouping iteratively together trips that are closest together until there are no trips left that are closer together than a defined threshold. The electronic trip familiarity detection can e.g. comprise one or more predefined hyperparameter dynamically being optimized in dependence of increasing and decreasing performance measures for the electronic trip familiarity detection. For the generation of the first, second and/or third geographic distance, there can e.g. be at least two hyperparameters, which are the weights for the start- and end point component and for the travelled distance component. For the clustering, there can e.g. be at least two hyperparameters, which is a distance threshold, wherein within its range two trips are detected to form a cluster, and a minimum number threshold of trips required to create a new cluster. The optimization of the hyperparameters can e.g. be performed separately for each possible technical application comprising different modes of transportation and/or different geographic locations and/or driver to passenger trips. The optimization of the hyperparameters can e.g. be performed separately for each possible mode of transportation, wherein the hyperparameters are optimized by varying the hyperparameters in a way that maximizes the pureness of the found clusters in terms of transportation mode.

In an embodiment variant, the mobile device can e.g. be realized as a mobile telecommunication device and the one or more sensors are integrated sensors of said mobile telecommunication device. The mobile telecommunication device can e.g. be a cellular mobile phone and/or a smart phone.

In an embodiment variant, possible transport modes distinguishable by the method can e.g. comprise at least land-based vehicles and/or maritime vehicles and/or air-based transportation means and/or hiking and/or skiing. The land-based vehicles can e.g. at least comprise distinguishable modes for cars and/or motor bikes and/or bicycles.

BRIEF DESCRIPTION OF THE DRAWINGS

The present invention will be explained in more detail, by way of example, with reference to the drawings in which.

| Transport Mode | Support | Recall | Precision |
|---|---|---|---|
| boat | 12 | 100.00% | 100.00% |
| car | 12710 | 98.68% | 94.98% |
| cycling | 407 | 71.74% | 91.54% |
| motorcycle | 851 | 53.94% | 88.78% |
| other | 13 | 30.77% | 2.60% |
| plane | 115 | 77.39% | 88.12% |
| public | 1000 | 77.90% | 92.63% |
| skiing | 349 | 93.70% | 92.90% |
| train | 316 | 82.59% | 95.96% |

Figure 5:
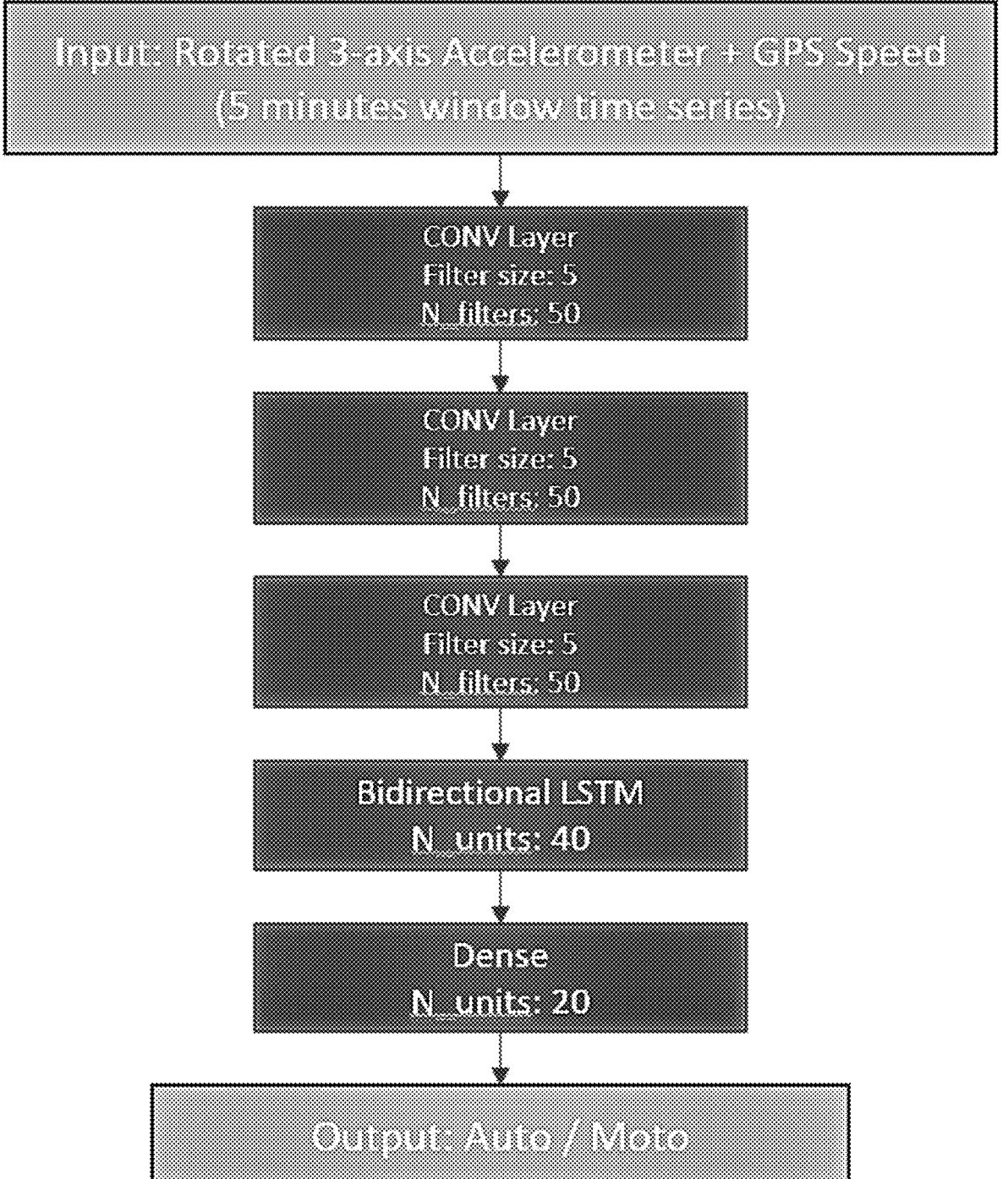

FIG. 5 shows a diagram illustrating an exemplary architecture of the data preprocessing. Before being inputted to the machine learning structure of the TMR system 113, the time series pass through the following preprocessing steps: (i) Rotation of the 3-axis accelerometer from the smartphone reference system to the vehicle reference system, (ii) Alignment between accelerometer and GPS, sharing a common 10 Hz sampling grid, and (iii) Each trip is split into multiple 5 minutes long mini-trips. The final input to the TMR system 113 is for this exemplary case a 4-dimensional time series, with a fixed length of 3000 timesteps (5 minutes*10 Hz).

Figure 6:
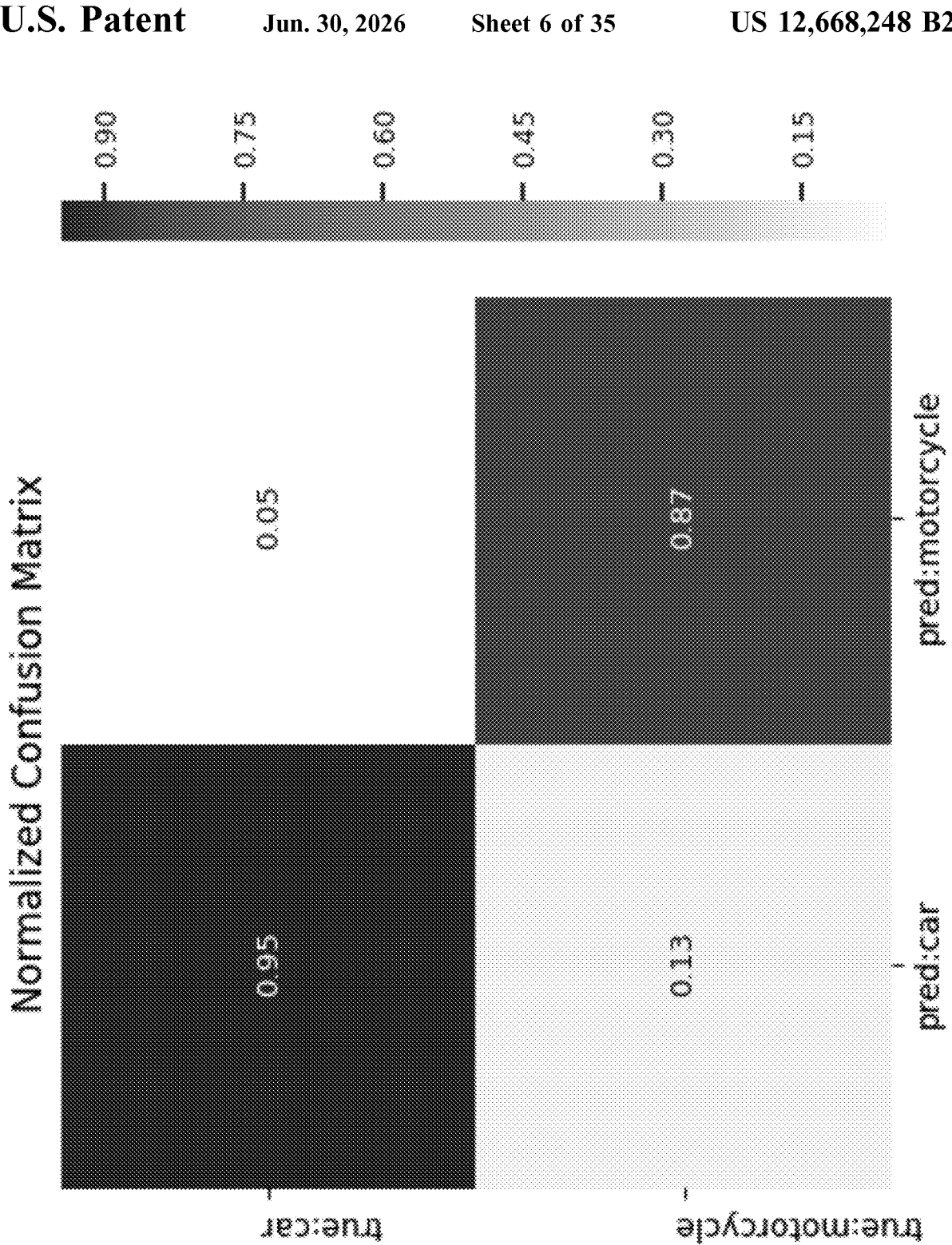

FIG. 6 shows a diagram illustrating an exemplary performance of the automated TMR system 113. Performances have been measured and assessed through a 5-fold Cross-Measurement or Cross-Validation with a leave k-users out splitting technique, leading to the results shown in FIG. 6 and the following table:

| Transport Mode | Precision | Recall | F1-Score |
|---|---|---|---|
| Car | 93.63% | 94.58% | 94.10% |
| Moto | 89.02% | 87.23% | 88.11% |

Figure 7:
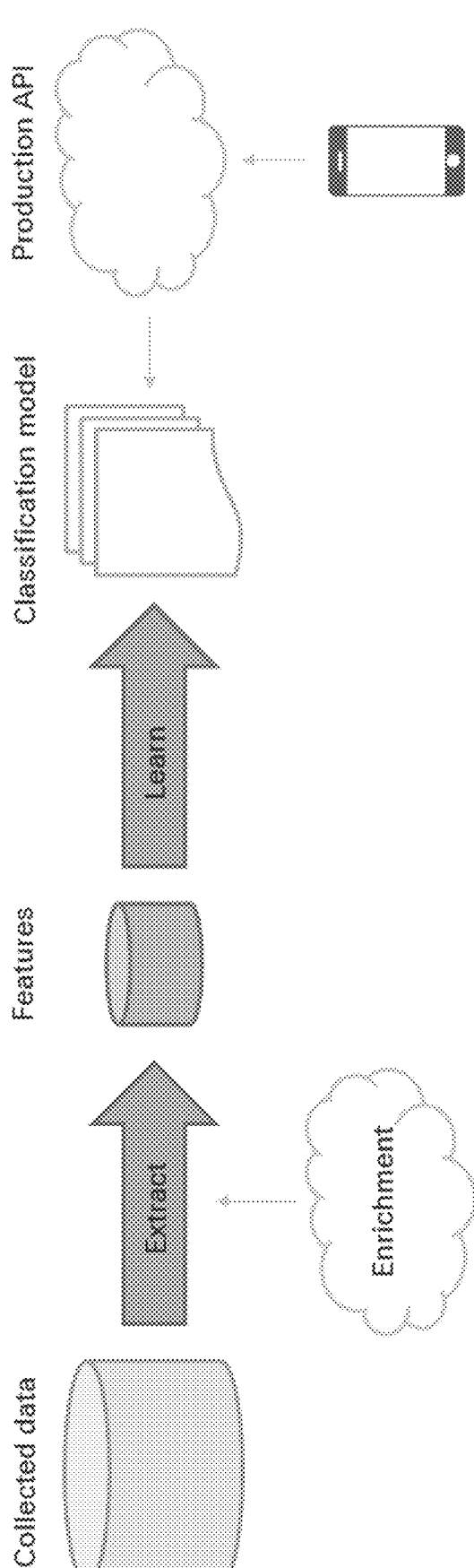

FIG. 7 shows another block diagram illustrating schematic an exemplary overview of the architecture of the Transport Mode Recognition system part of system 1.

FIG. 8 shows a block diagram illustrating schematic an exemplary overview of the trip extraction process.

Figure 9:
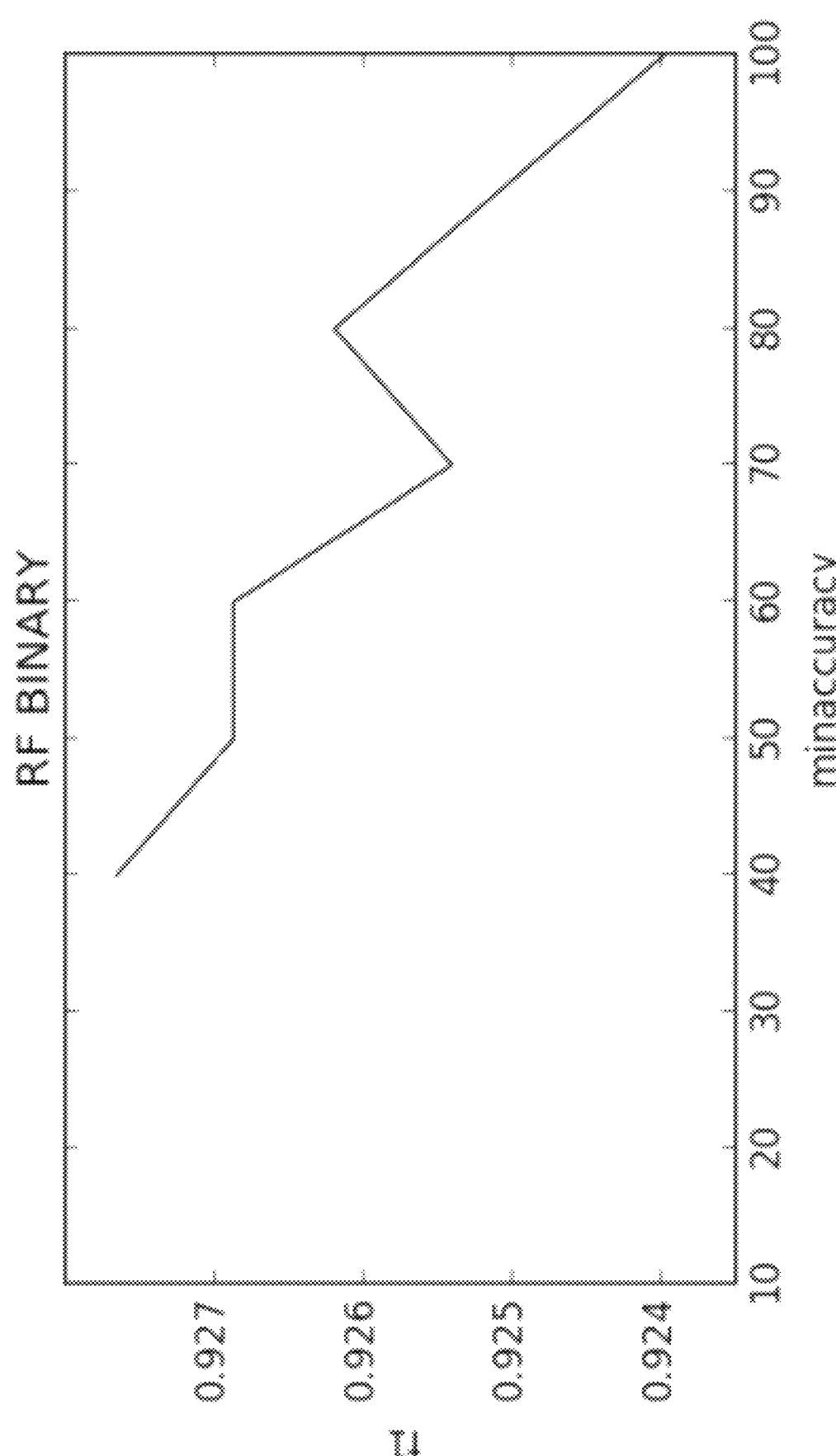

FIG. 9 shows a diagram illustrating schematic an exemplary Car/NoCar performance (F1 score) with minimum accuracy as a free parameter.

Figure 10A:
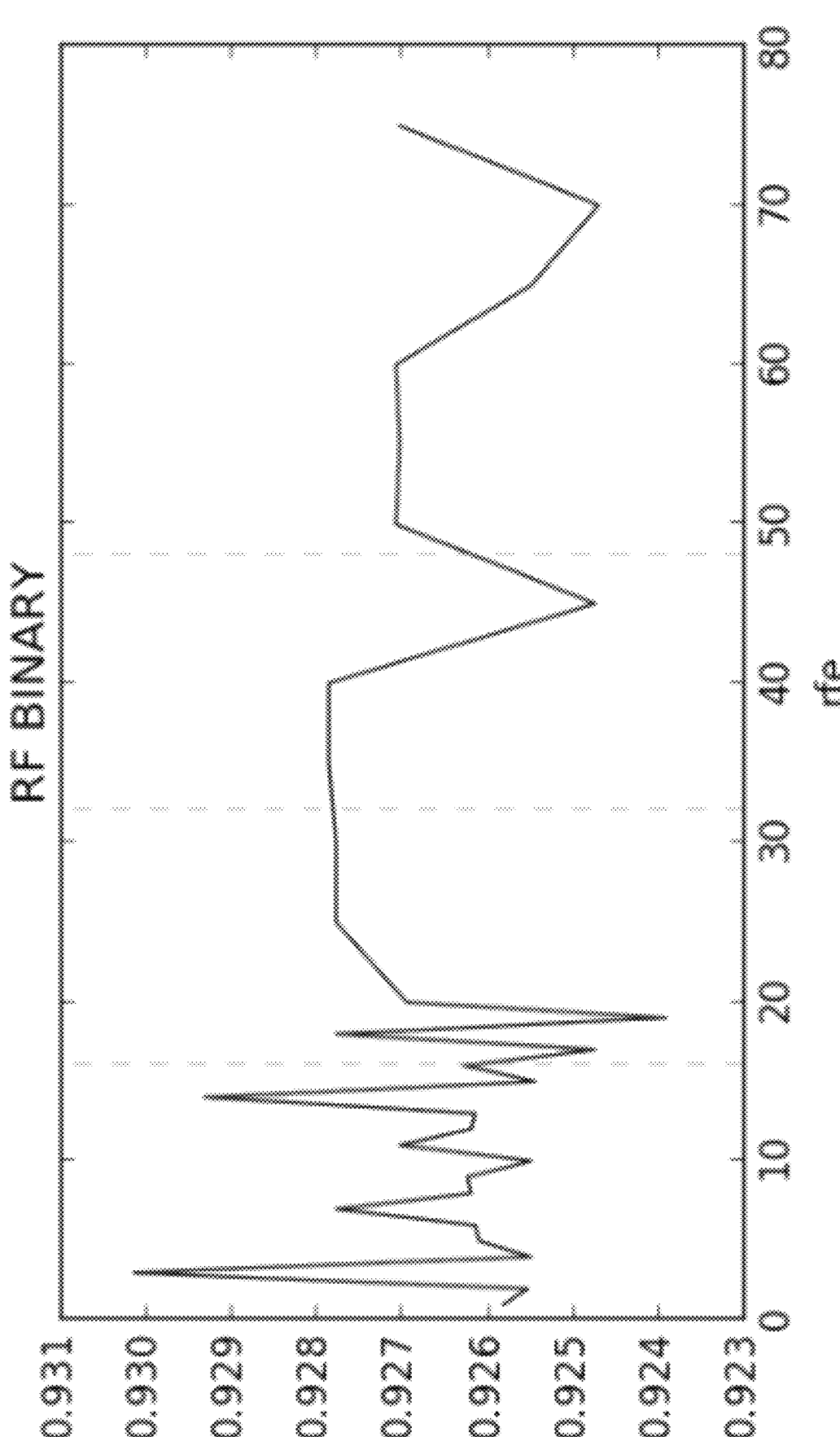
Figure 10B:
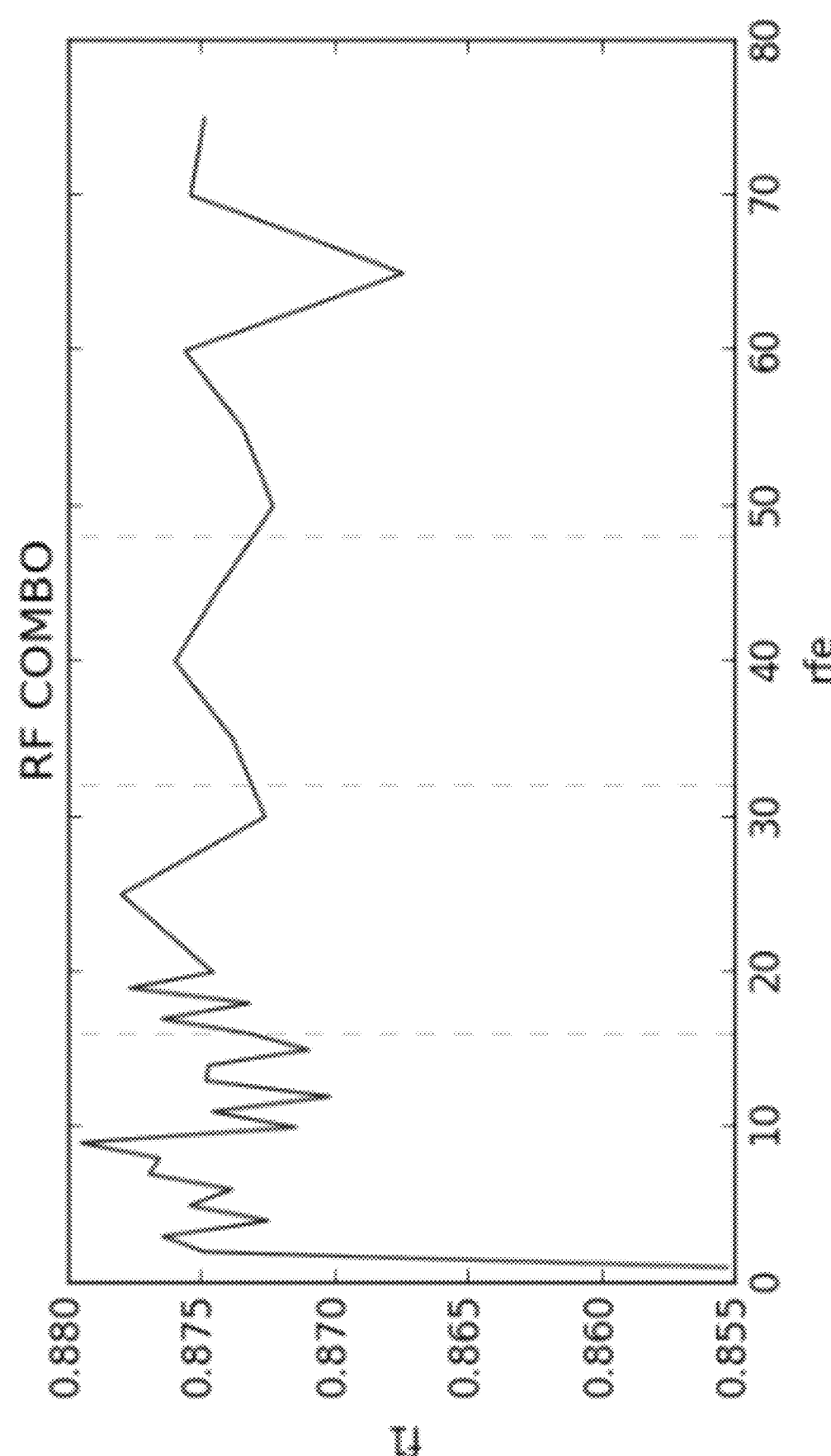

FIGS. 10a and 10b show diagrams illustrating schematic an exemplary TMR performance (F1 score) with number of sampled points as a free parameter.

Figure 11:
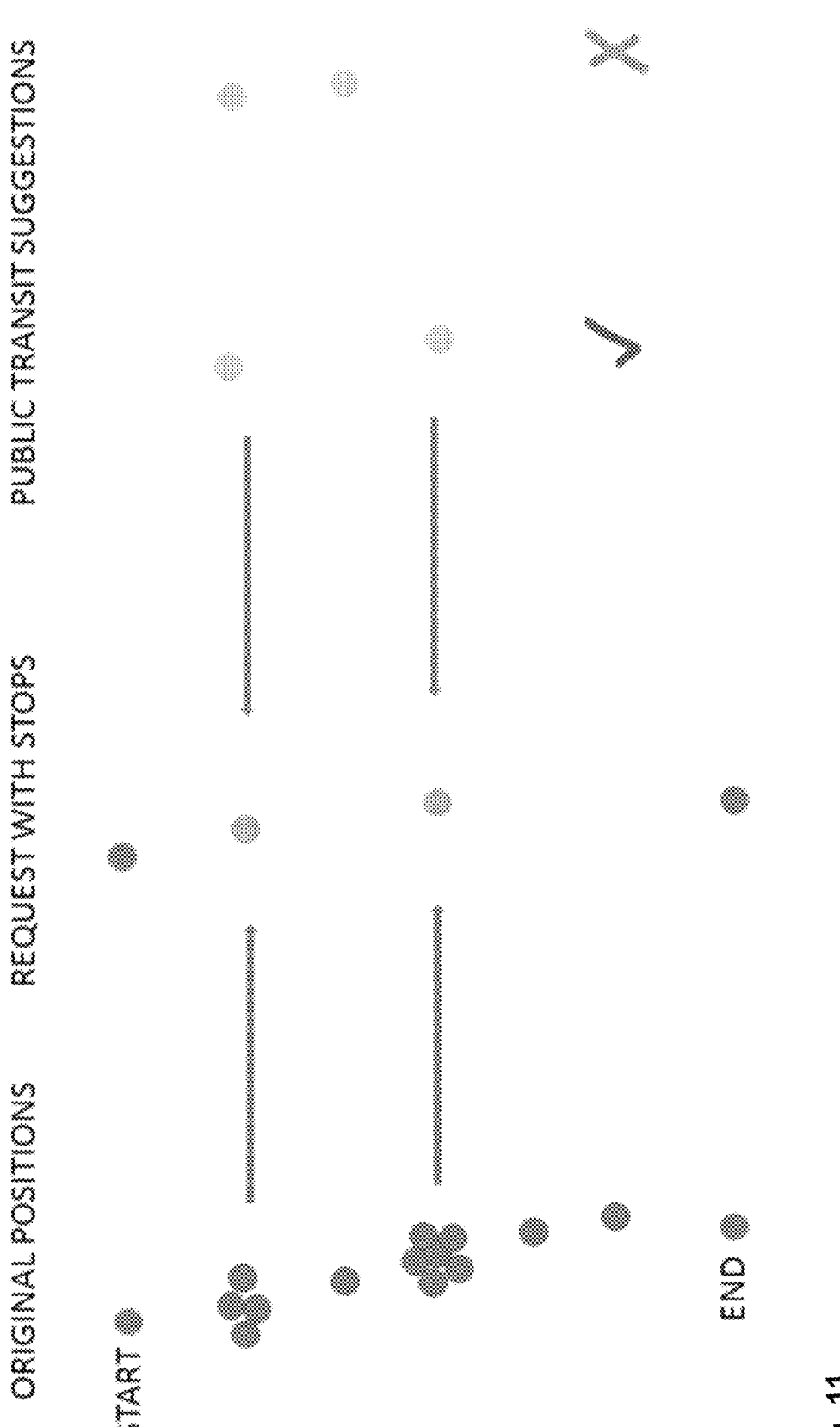

FIG. 11 show a diagram illustrating schematic an exemplary candidate stops extraction.

Figure 12:
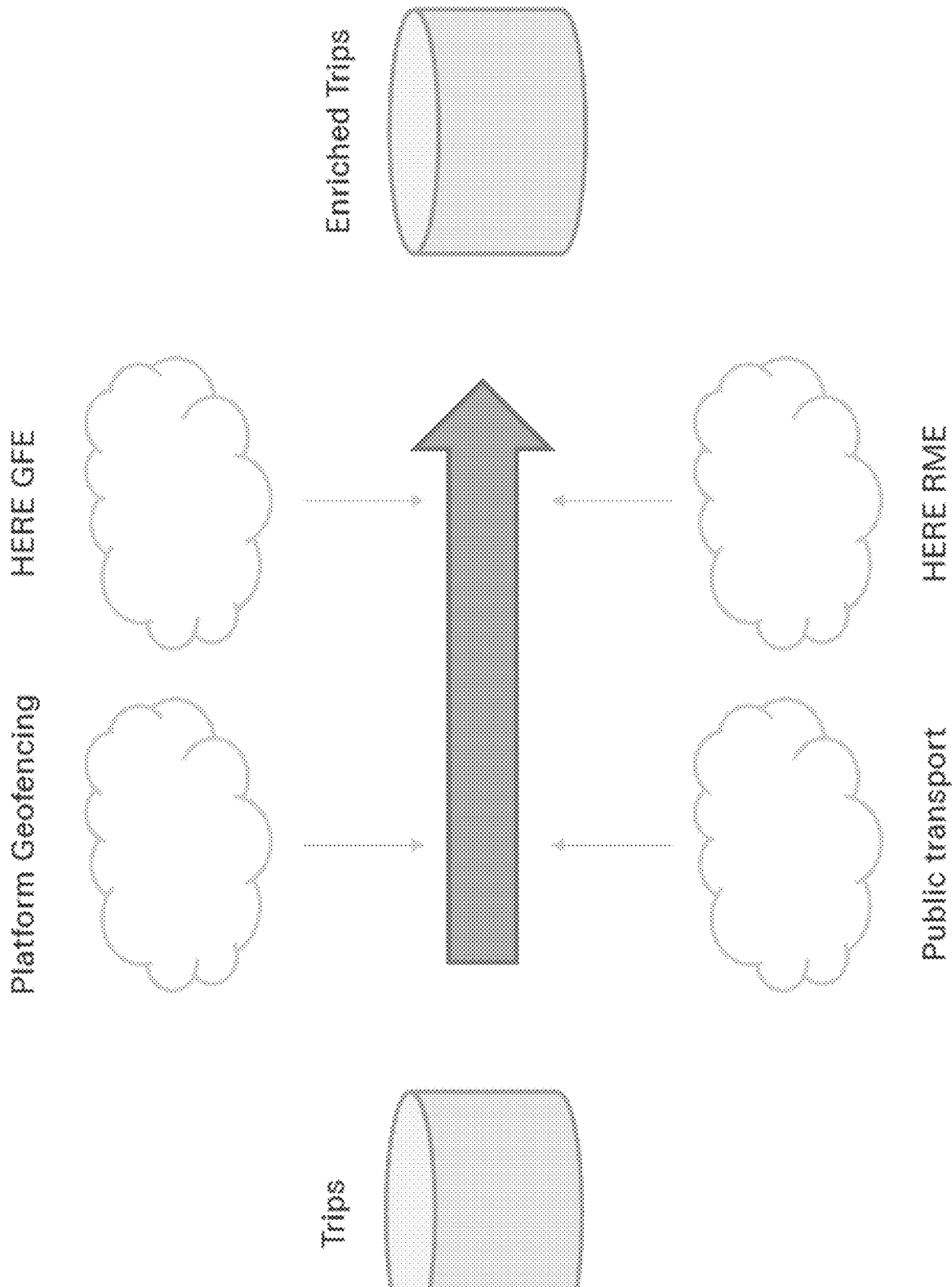

FIG. 12 shows a block diagram illustrating schematic an exemplary trip enrichment process.

FIG. 13 shows a block diagram illustrating schematic exemplary feature extraction modules.

Figure 14:
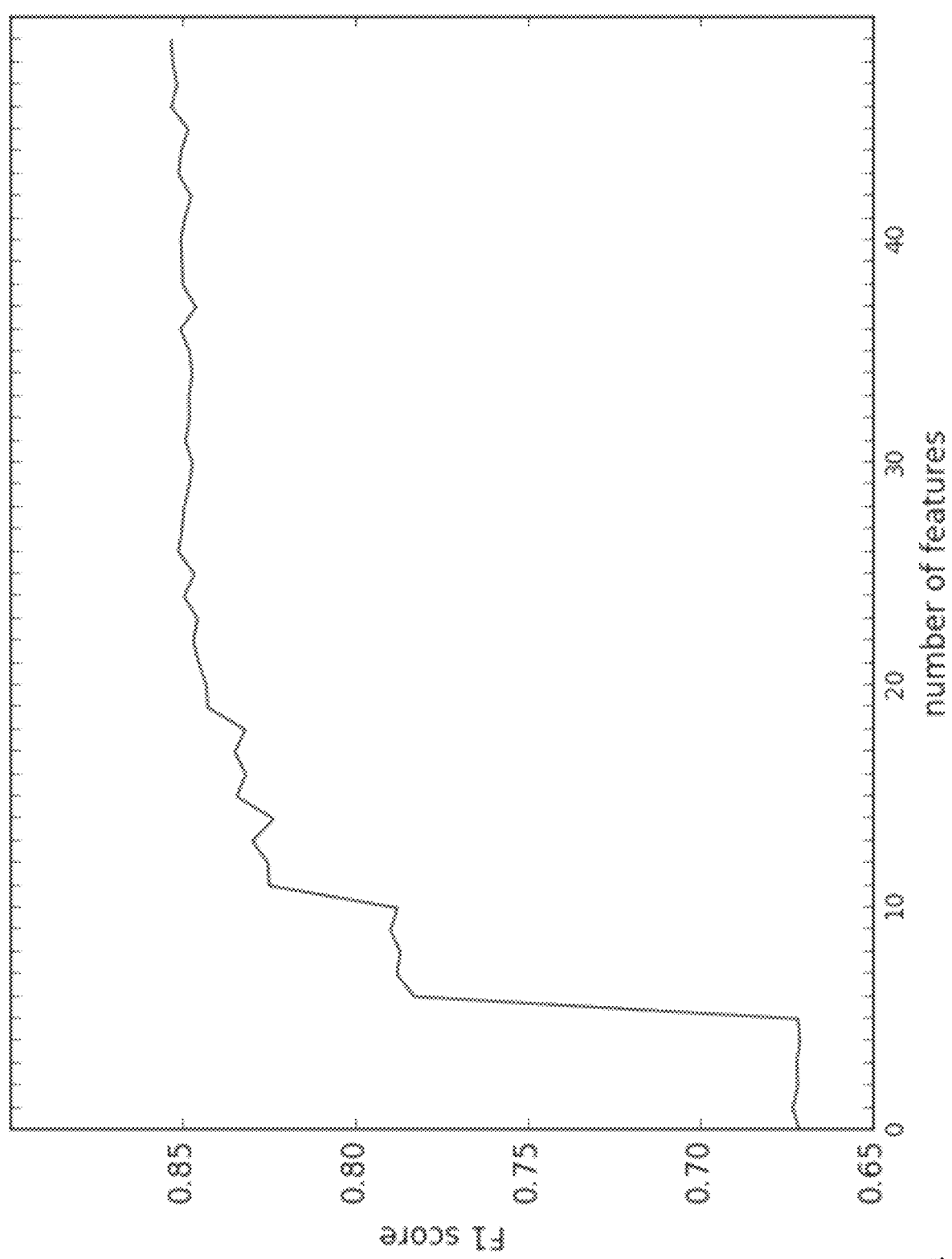

FIG. 14 shows a diagram illustrating schematic an exemplary recursive feature elimination used for the transport mode recognition TMR of the system 1.

Figure 15:
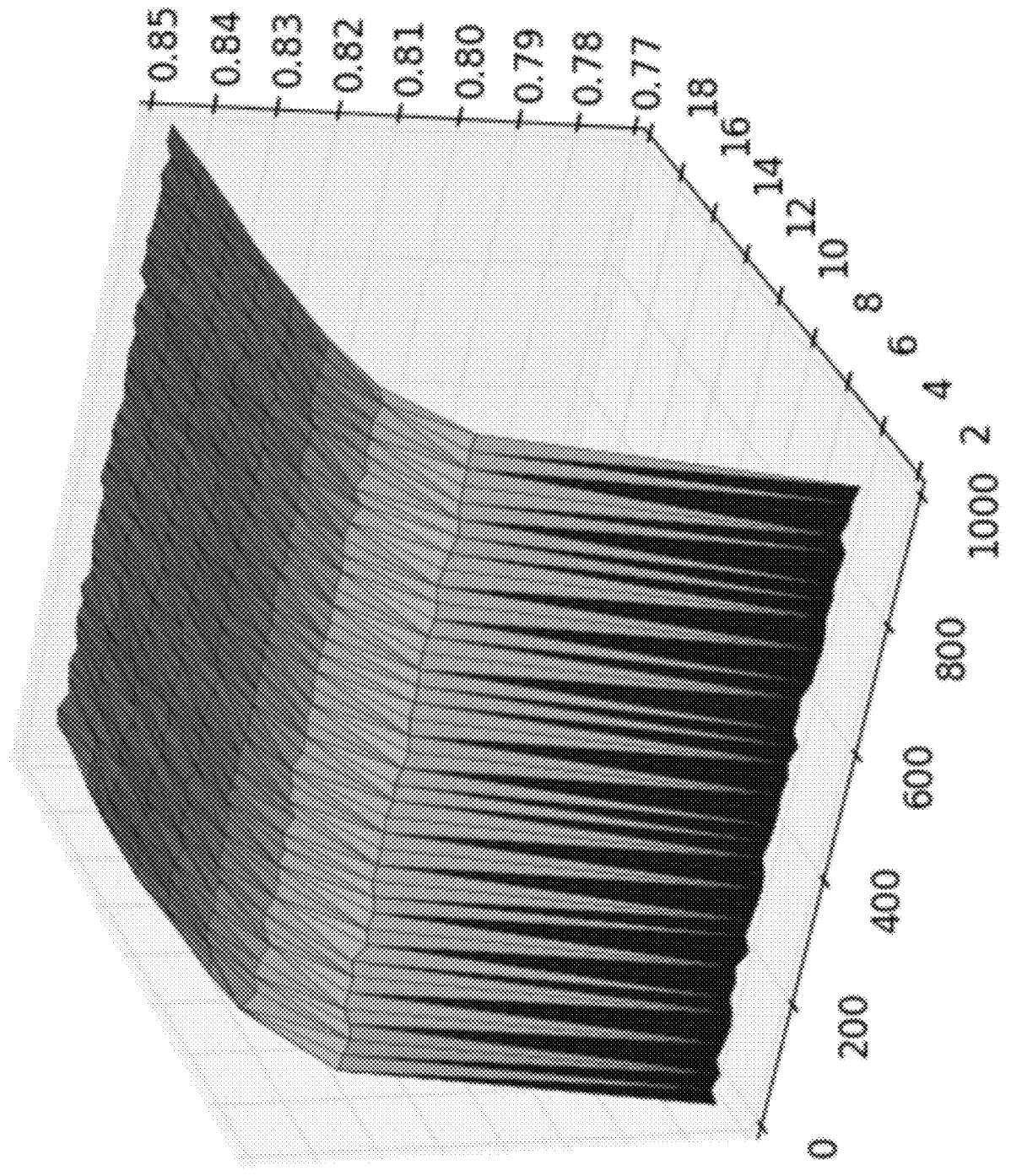

FIG. 15 shows a diagram illustrating schematic an exemplary Grid exploration of the number of trees and tree depth parameters.

Figure 16:
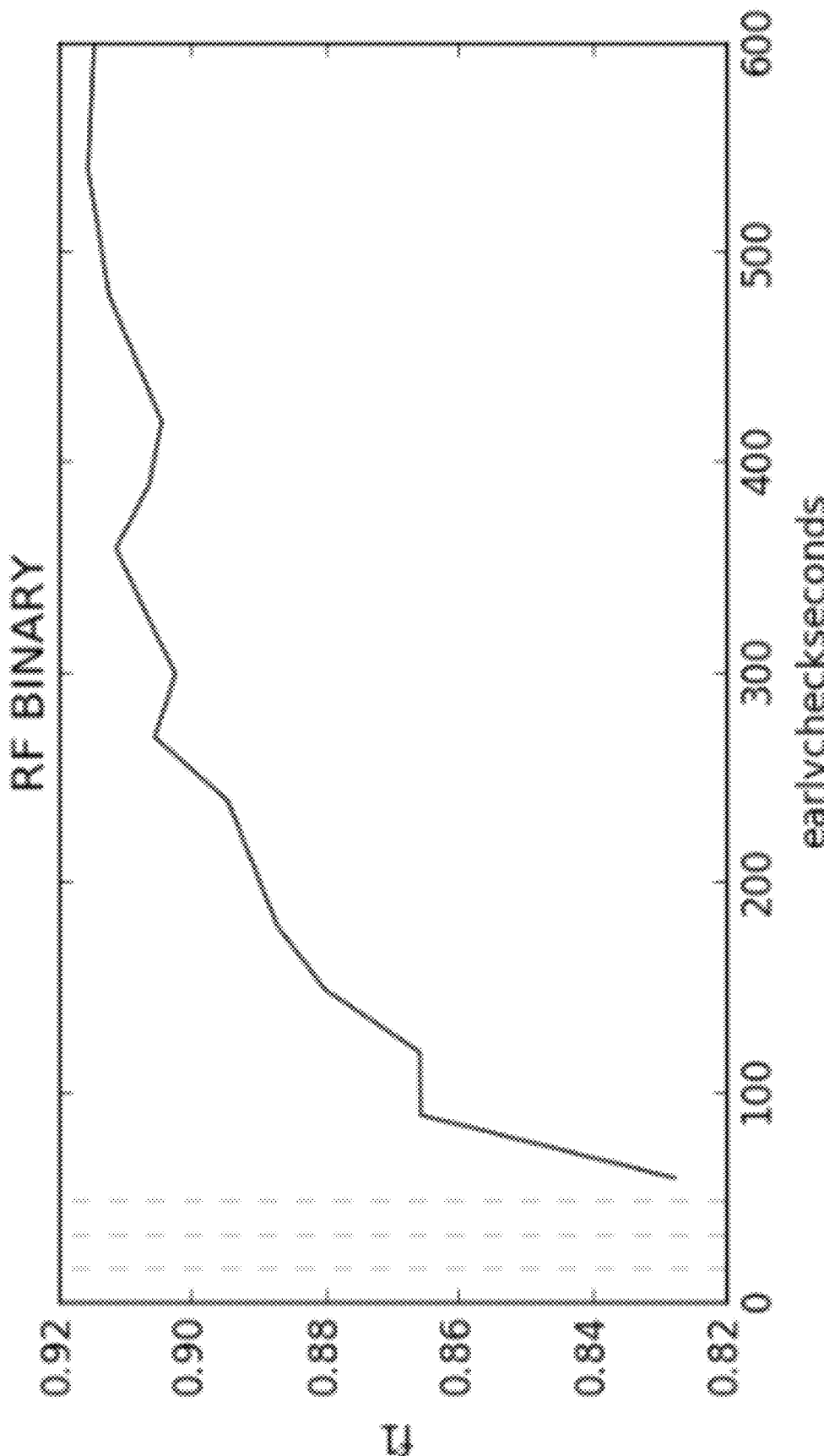

FIG. 16 shows a diagram illustrating schematic an exemplary early TMR detection for car/nocar classifier, F1 score.

FIG. 17 and FIG. 18 show respectively the performances of the current TMR service and the proposed solution, where FIG. 17 shows the distributions of true labels, performance of the deployed solution (baseline), and FIG. 18 shows the distributions of true labels, proposed solution.

Figure 19:
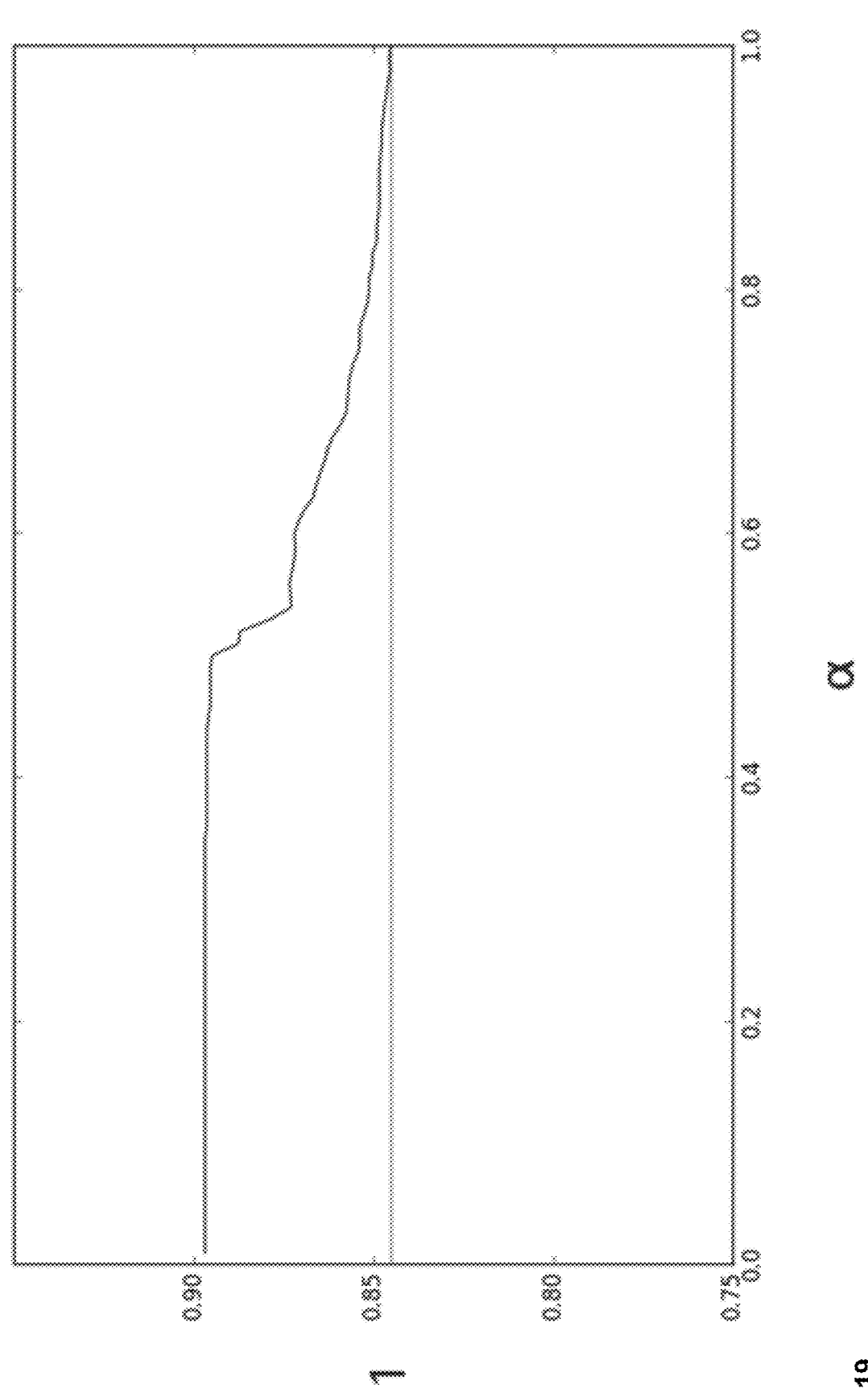

FIG. 19 shows a diagram illustrating schematic an exemplary F1 score varying TMR label weight (probability mass assigned to the automatic label).

FIG. 20 shows a diagram illustrating schematic an exemplary the design of an index value used for the generation of the familiarity and familiarity score, so that it orders the users with the following order, given the clusters dimensions (x-axis: cluster number, y-axis: cluster dimension).

Figure 21:
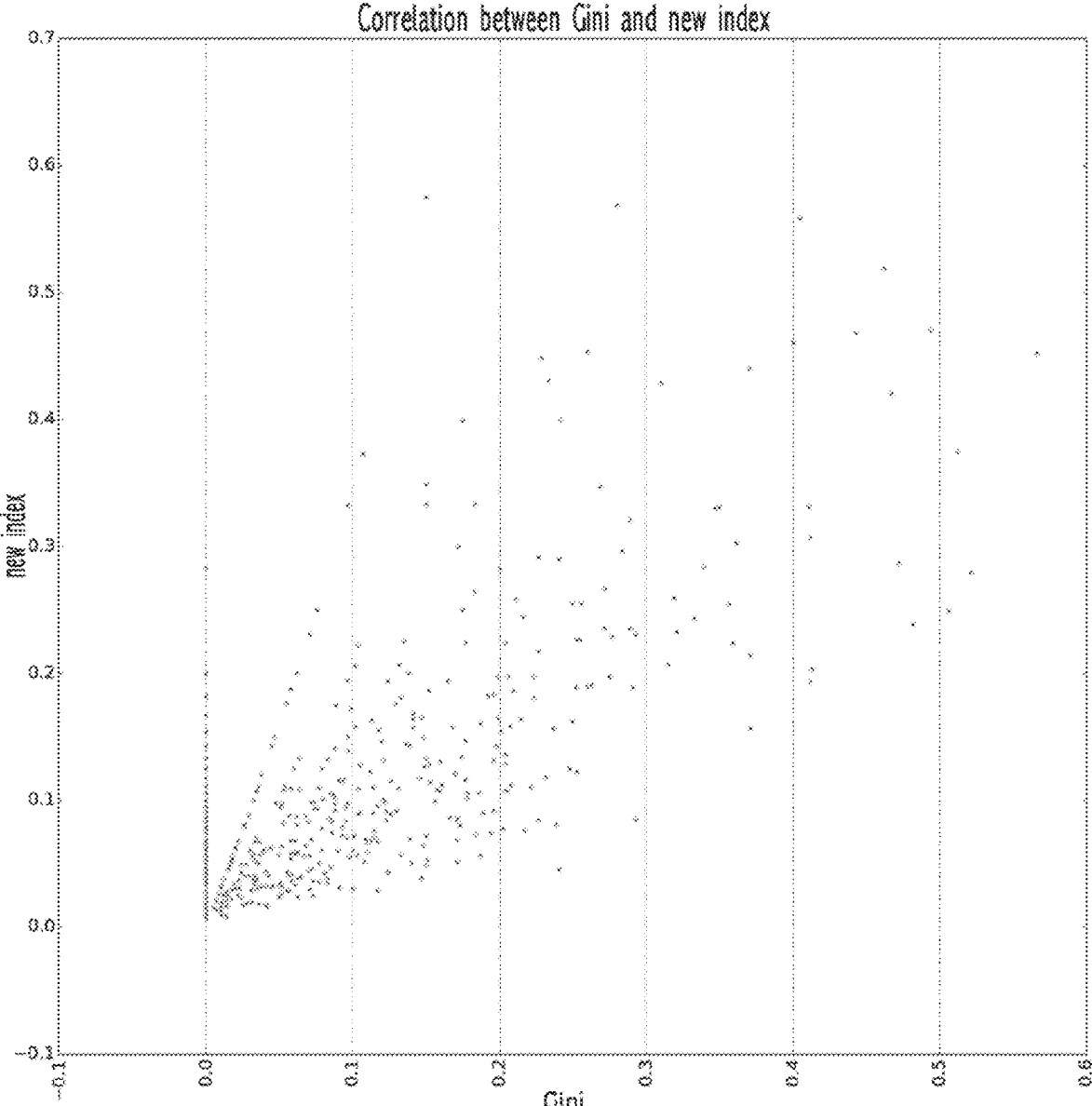

FIG. 21 shows a diagram illustrating schematic the correlation between the Gini index and the index (denoted as "new index"), used in the proposed embodiment variant.

Figure 22:

FIG. 22 shows a diagram illustrating schematic an exemplary user going from the same point A to the same point B, but passing through different links. This behavior causes low aggregation in Link familiarity embodiment variant and high aggregation in Start Stop embodiment variant.

Figure 23:
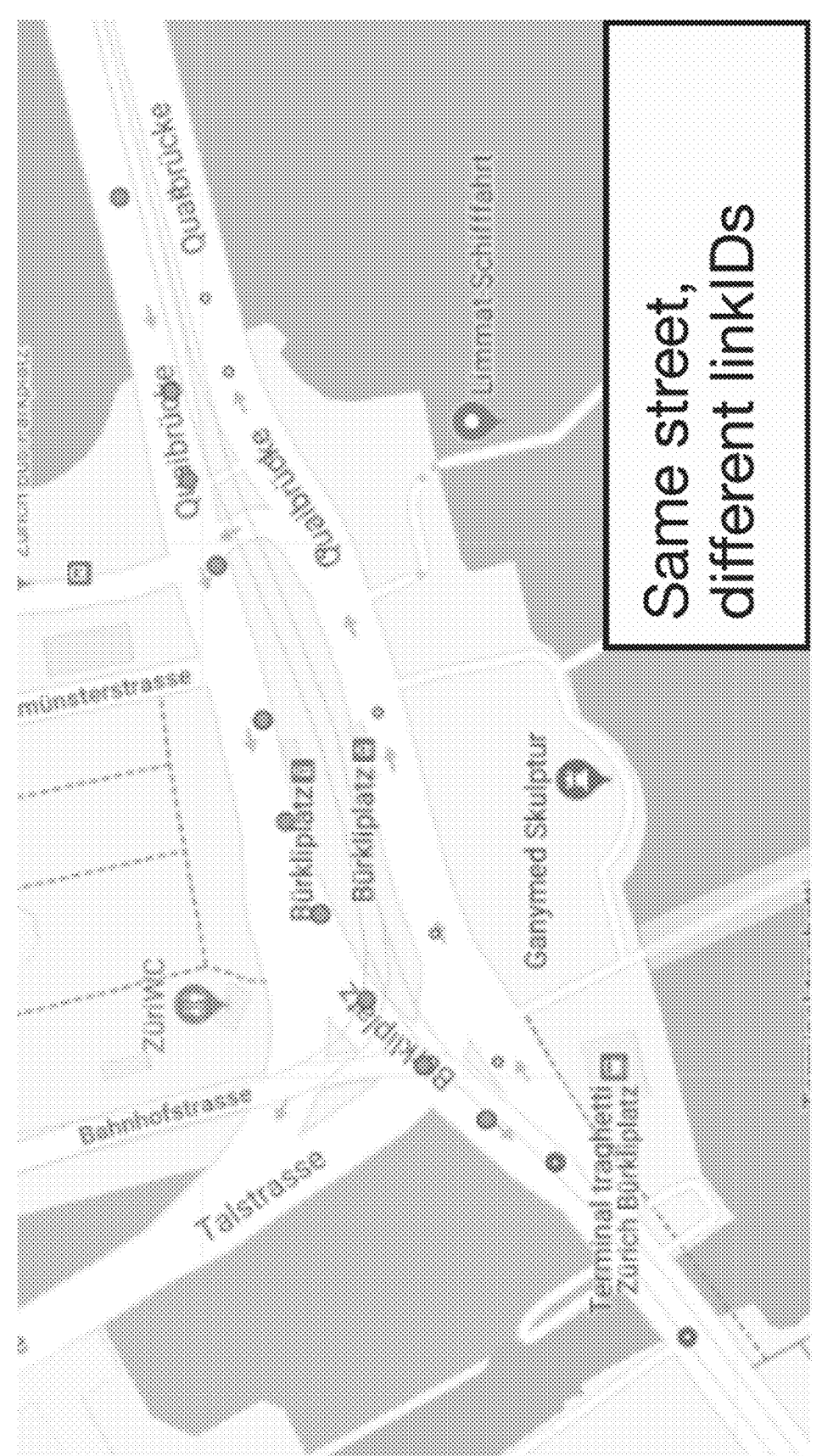

FIG. 23 shows a diagram illustrating schematic exemplary cases in which the user travels the same streets but the way the geocoding measuring (e.g. HERE) gives the links causes a wrong behavior in the link method. Typically happens that big streets have two different linkIDs for the two direction of the street, or two streets are too near and HERE spots the user in the wrong one.

Figure 24:

FIG. 24 shows a diagram illustrating schematic an exemplary occurrence of the second case when the user goes once from point A to point B1 (session S1), and once from A to B2 (session S2), as shown in FIG. 23. If S1 and S2 have enough links in common (the user travels the same path but ends up in different places) the two trips are clustered together in the Link method but not in the Start Stop method (in the cases in which the stop points are not enough near).

Figure 25:
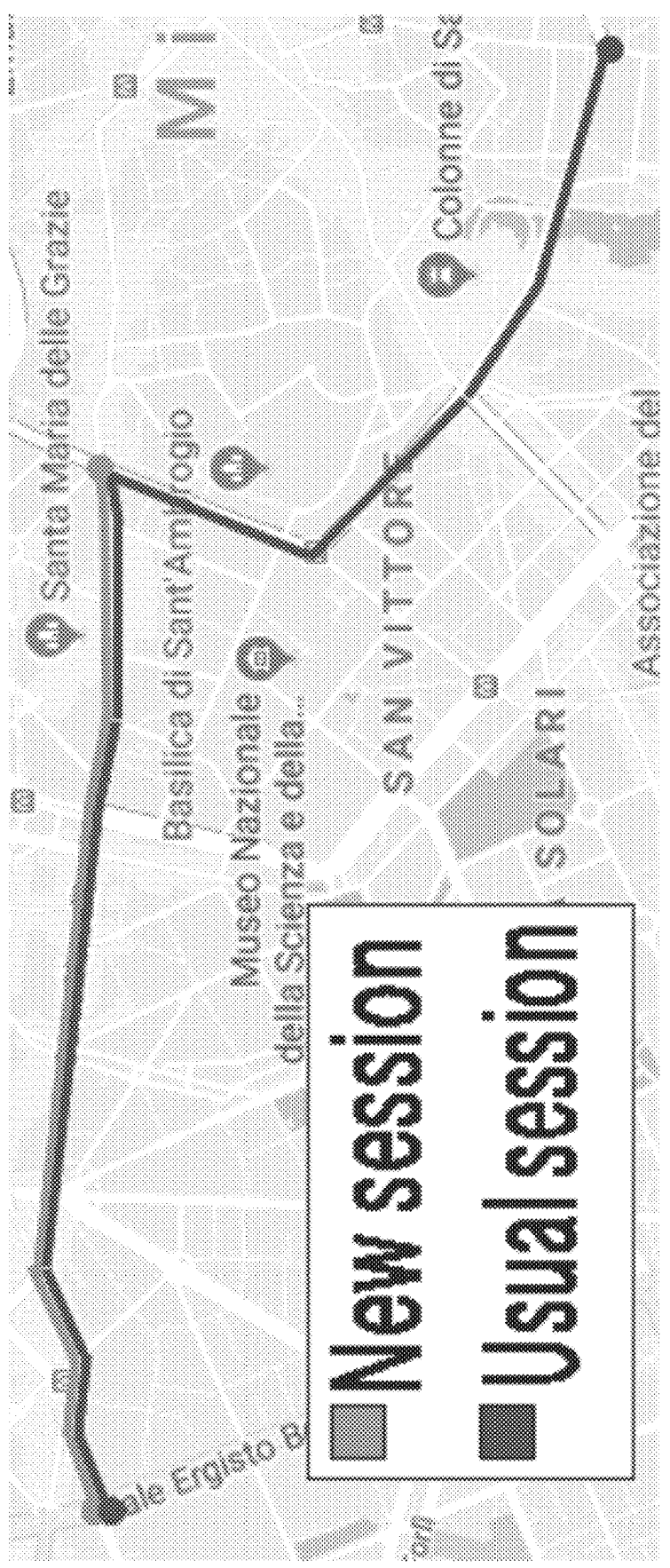

FIG. 25 shows a diagram illustrating schematic an exemplary embodiment variant of the Bag of Links (BOL), which does not generate clusters, so a direct comparison on how the trips are agglomerated cannot be performed. However, a good inspection on this method can be done considering the get_familiarity process, respect to the other get_familiarity of the other embodiment variants. The case in which the BOL embodiment variant becomes useful is when the user does a new trip using only link that has already travelled in each of the previous sessions, but without covering the 80 percent of the shortest of these sessions. In this case the start and stop points are far away so the get_familiarity start stop will return 0, also the number of links in common are not enough to cover the 80 percent of links so also the get_familiarity of the link methods will return a low score. This new method instead will give a maximum scores of 1 (see FIG. 23).

Figure 26:
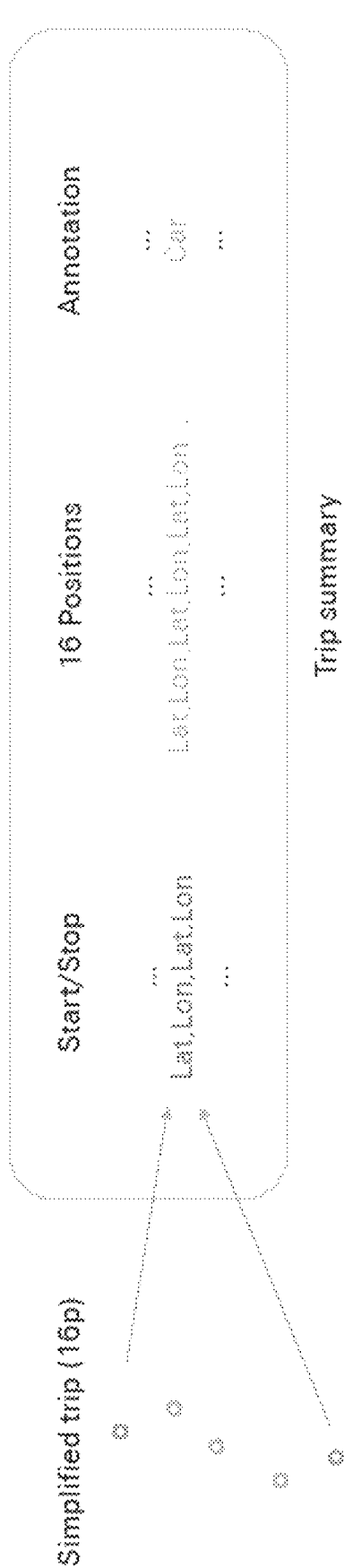

FIG. 26 shows a diagram illustrating schematic an exemplary measuring of a trip using an appropriate trip summary. When a TMR 113 request is received live, the system 1 respectively the TMR 113 checks if a user already annotated or corrected a similar trip. Consequently, the system 1 must be able to efficiently retrieve historical annotated trip data and define a trajectory similarity measure. Since the TMR 113 live request contains a representation of the trip with 19 points, in the present embodiment variant, it makes sense to store this representation for each annotated trip, partitioned by a user identifier. This can e.g. be done in a database or a filesystem (e.g. one row per trip). The user annotation preferably can e.g. be stored together with the trip summary. This trip summary can be built/updated in batch using, for example, Databricks (e.g. nightly). The embodiment variant can imply information availability within 24/48 h from user annotation. Existing facilities and other approaches can be considered as well.

Figure 27:
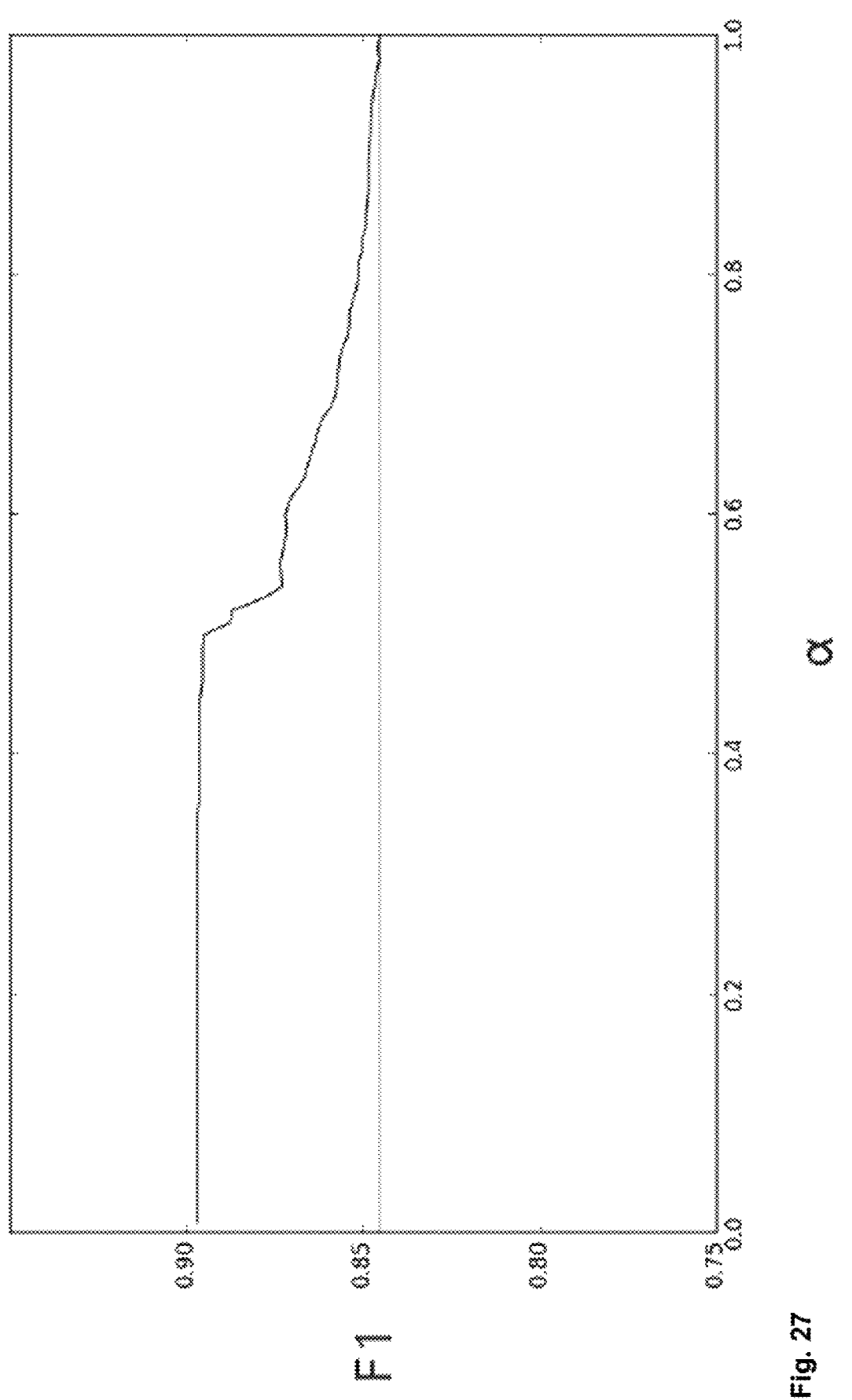

FIG. 27 shows a diagram with a TMR baseline (given by the straight line) illustrating schematic an exemplary weighting of the parameters and evaluating the performance under TMR 113. The multiclass probabilities can e.g. be weighted less than the annotation probability. This is in line with the fact, that, fi the user corrected a trip in the past and a similar trip was observed by the system 1, the user should be trusted. The proposed value for the weight is 0.4.

FIG. 28 shows a diagram illustrating an exemplary embodiment variant of the DPD 112, which can be used for the trip familiarity detection 115, and which can e.g. comprise the following technical steps performed by the system 1 and the trip familiarity detection and measuring 115, respectively: (1) Collect user history, (2) Cluster similar trips, (3) Define centroid trip, (4) New trips arrives: seek match with existing clusters, and (5) Check cluster DPD label. In FIG. 76, (i) N is the total number of sessions with DPD score in the cluster, (ii) $D_i \in [0,1]$ $P_i \in [0,1]$ and $X_i \in [0,1]$ are final confidence scores returned by DPD for each sessions (including enter/exit and BT connection), and (iii) cluster scores can be also generated from user annotations (Truth) or eventually from a combination of both sources.

Figure 29:
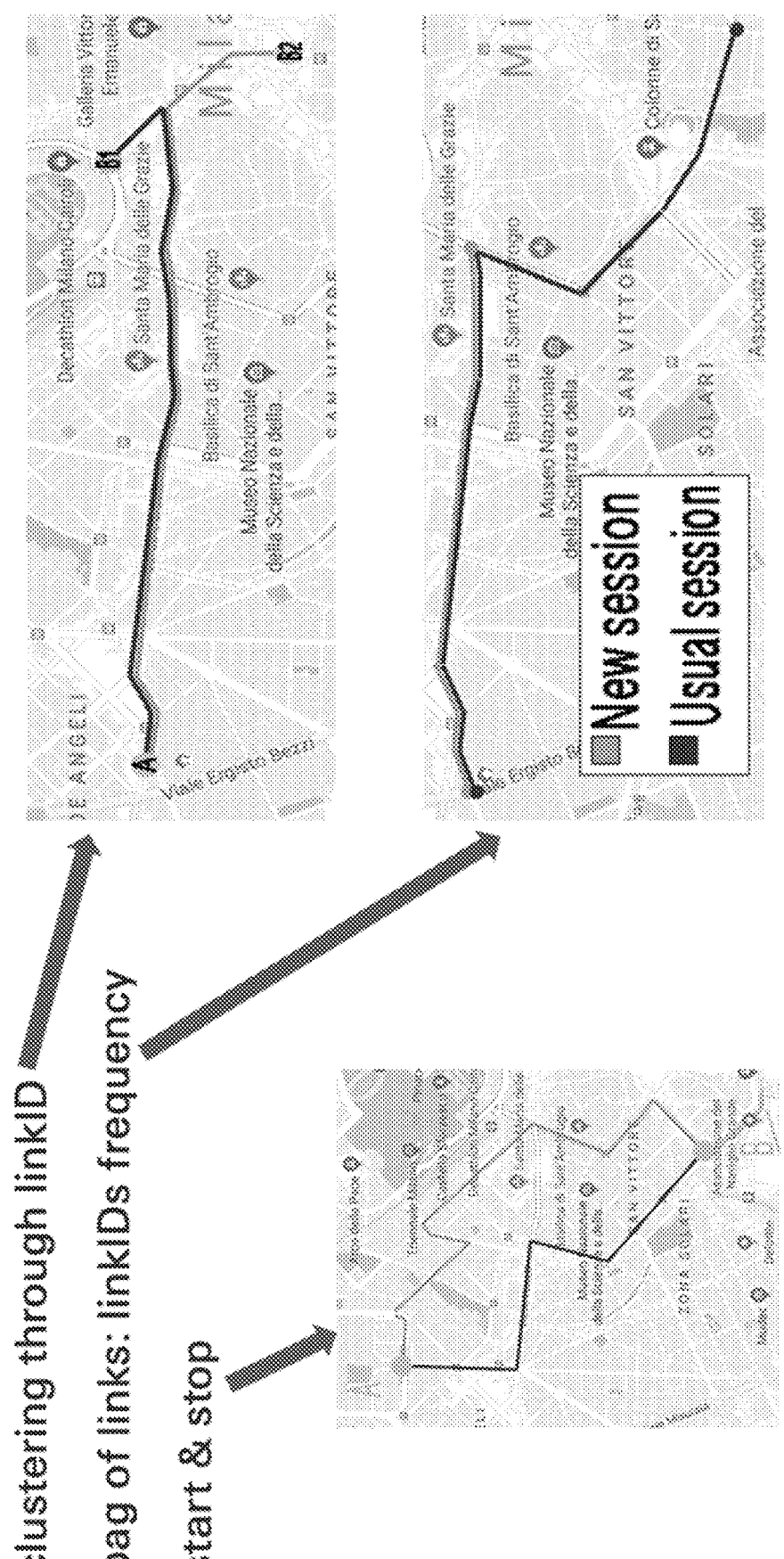

FIG. 29 shows a diagram illustrating the exemplary objective of the familiarity score to create a measure for scoring purposes on how much a user travel on familiar roads. This can e.g. require the three different methods, as illustrated by FIG. 29, i.e. (1) Clustering through linkID, (ii) bag of links: linkIDs frequency, and (iii) start & stop.

Figure 30:
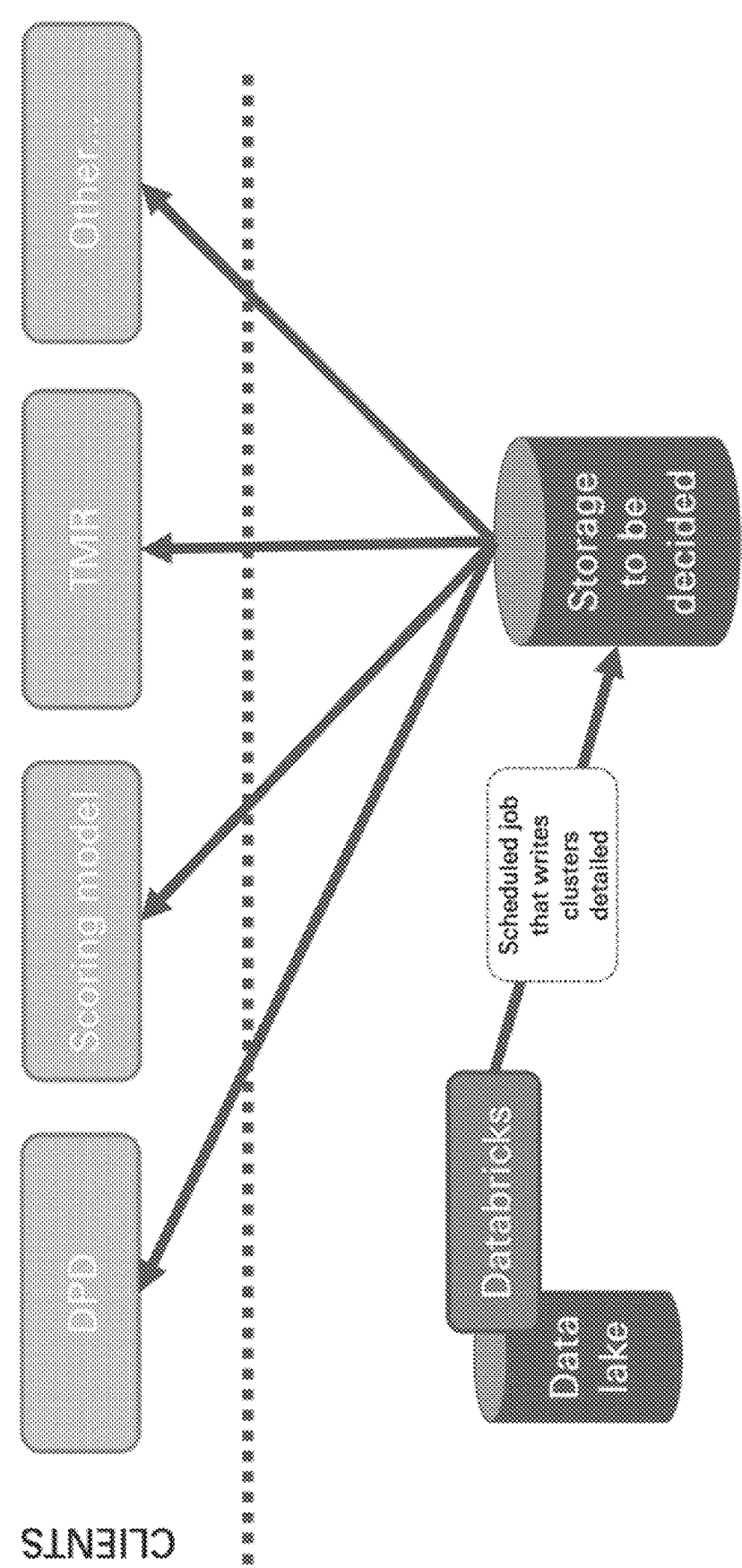

FIG. 30 shows a diagram illustrating an exemplary realization of the start&stop method, as a powerful approach.

Figure 31:
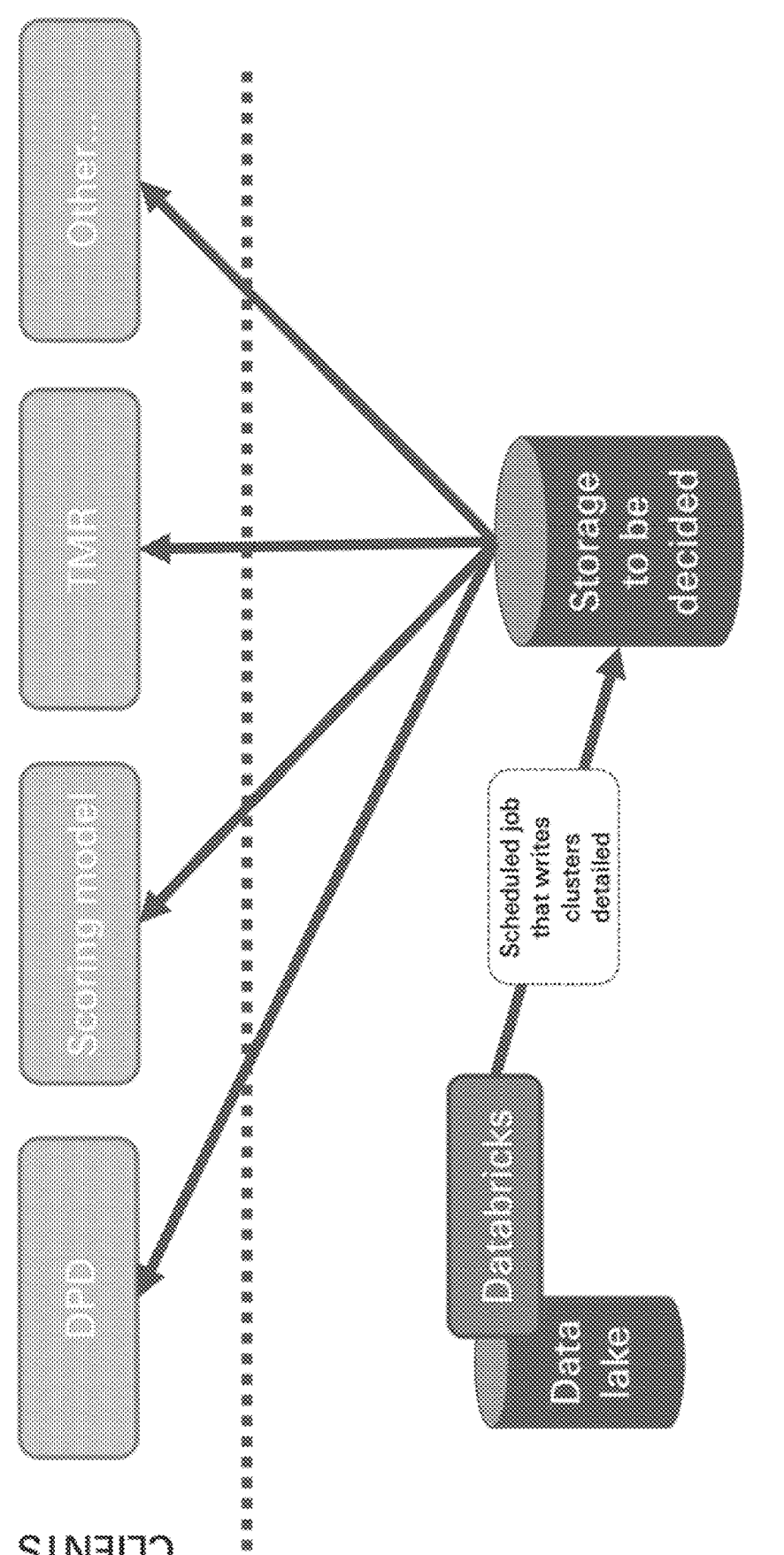

FIG. 31 shows an exemplary overview of a possible general architecture of the trip familiarity detection and measuring.

Figure 32:
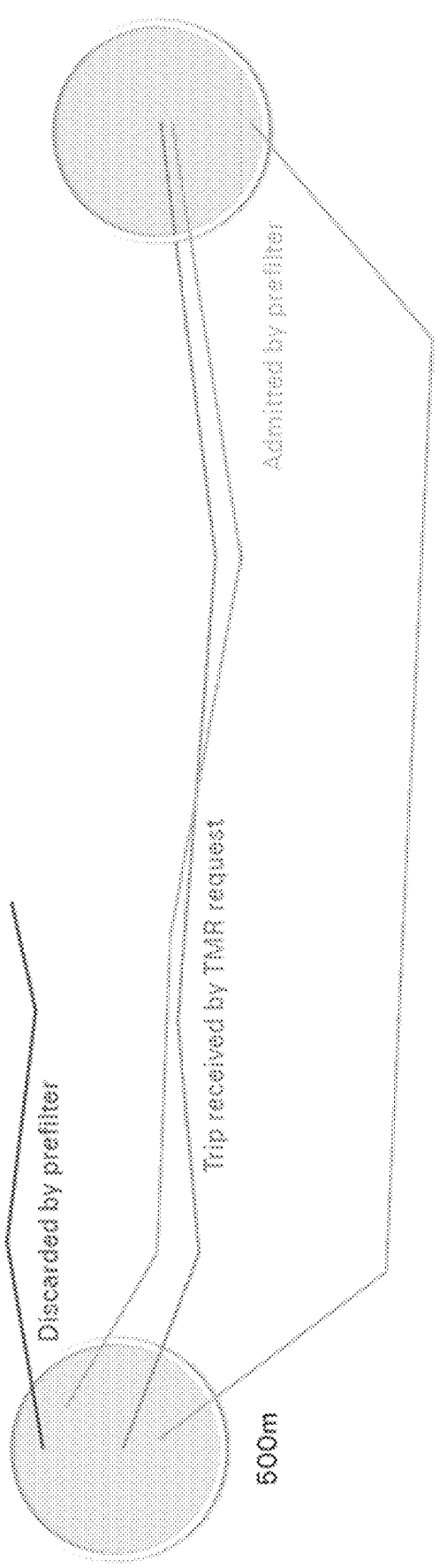

FIG. 32 shows a diagram illustrating an exemplary realization of an embodiment variant using a similarity prefilter technique, in particular for TMR 113, where the data processing is preferably performed only on a subset of likely candidates. A trip is considered a valid candidate of its start and end both lie within a certain radius from the start/end of the current trip (the one that is evaluating in a TMR live request). The radius can e.g. be set to 500 meters for this example, based on empirical observation. Since user annotations can be in limited number (in normal operating conditions) and using the proposed similarity prefilter, the trajectory similarity is actually generated against a small subset of trips, which is illustrated in FIG. 80.

Figure 33:
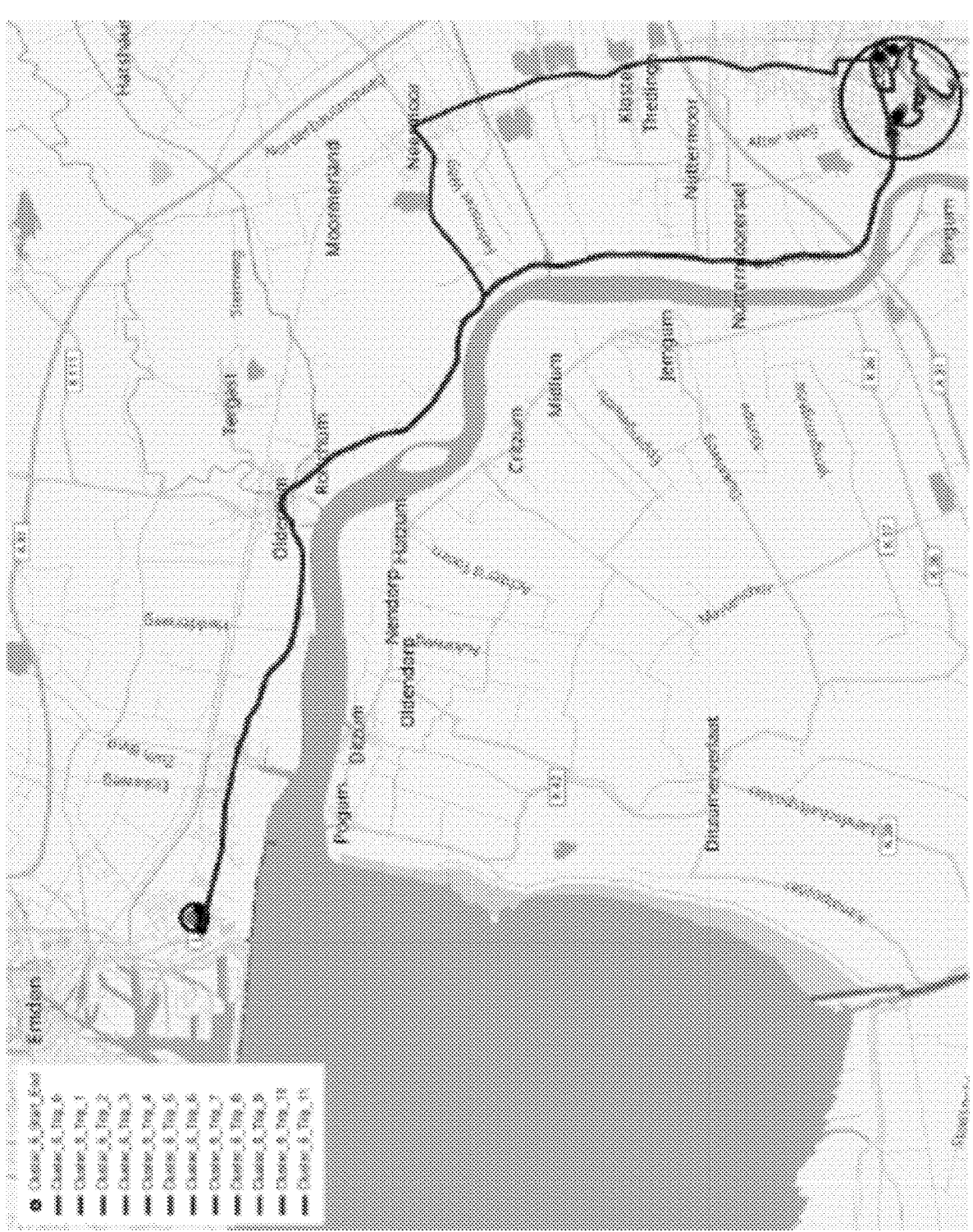

FIG. 33 shows a diagram illustrating an exemplary visual representation of a cluster. The open circles mark the start and end regions. Blue lines represent the routes of various trips that belong to this cluster. Green (Red) dots highlight start (end) locations of the respective trip.

Figure 34:
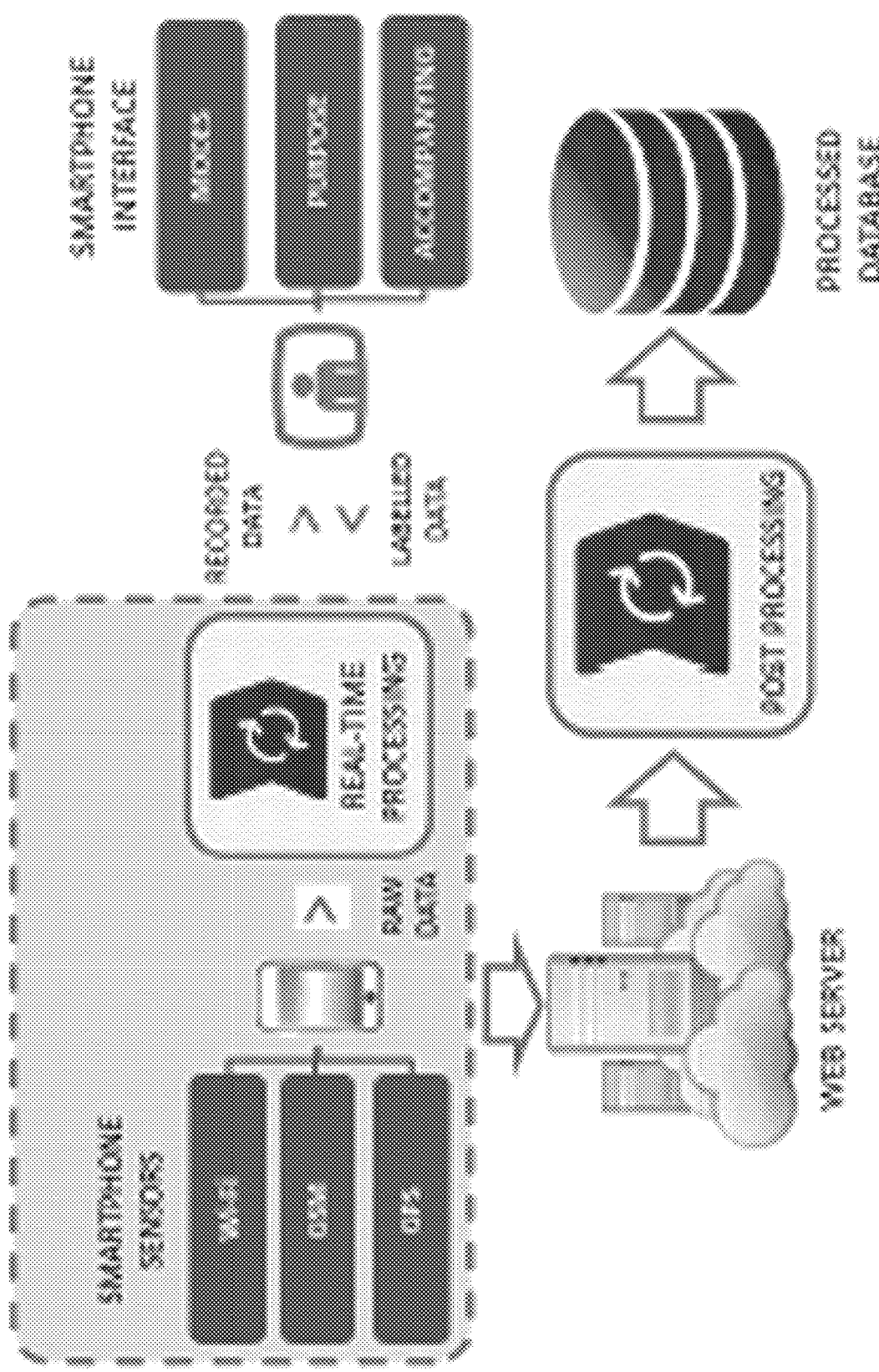

FIG. 34 shows a diagram illustrating an exemplary overview of an embodiment variant of a tip measuring data collection and reporting, optionally combined with a trip mode detection and/or trip purpose detection and/or trip accompanying detection and measuring.

Figure 35:
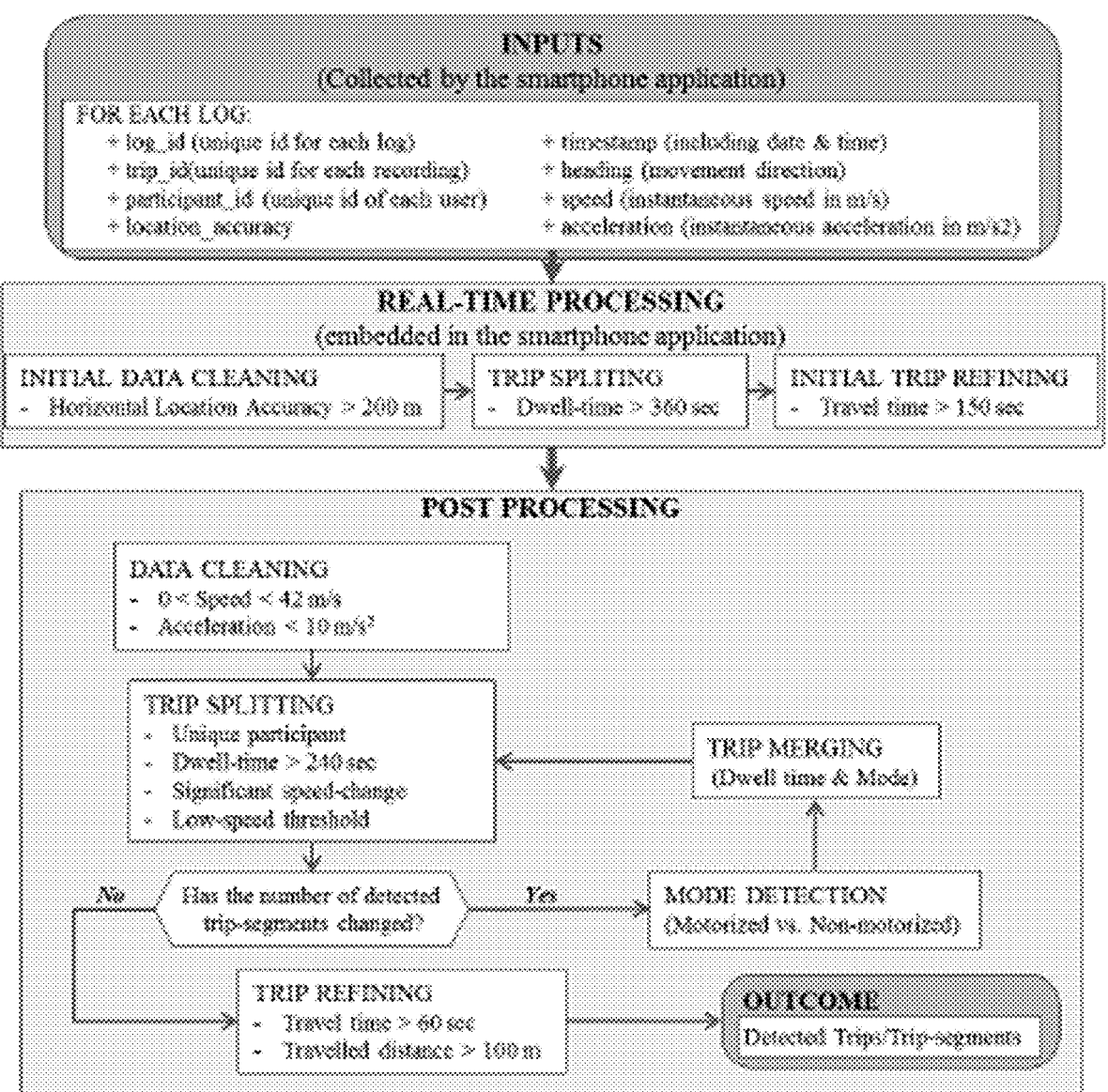

FIG. 35 shows a diagram illustrating an exemplary processing for trip/trip-segment detection based on the captured time-series of measuring data of the smartphone sensors.

DETAILED DESCRIPTION OF THE PREFERRED EMBODIMENTS

Figure 1:
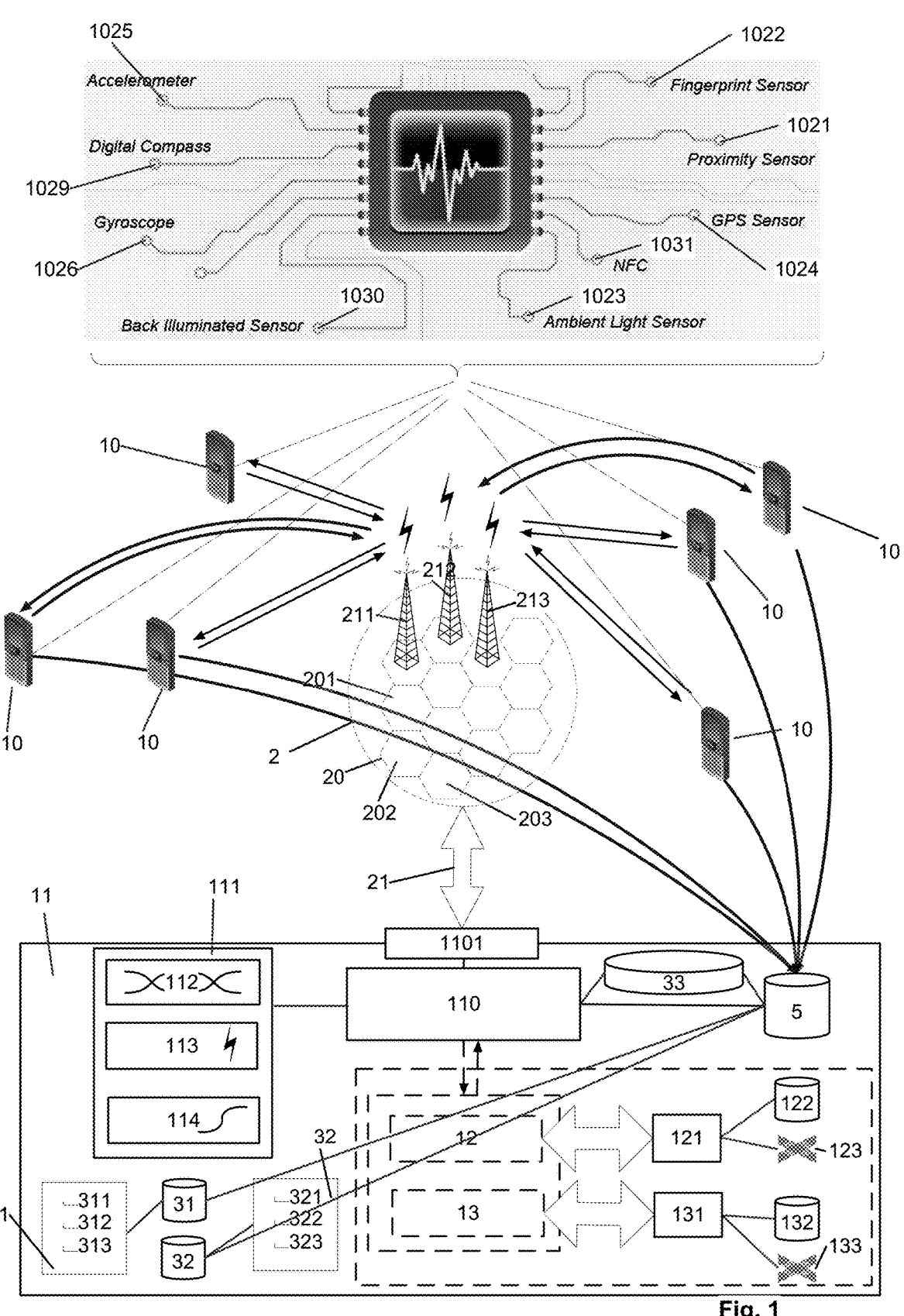
FIG. 1 shows a block diagram schematically illustrating an exemplary system for the inventive automated trip familiarity detection system 114. The electronic trip familiarity detection 114 is based on sensory data 3 measured by one or more sensors 102 of a mobile device 10 of the trip familiarity detection system 114 associated with a user 6 and/or a vehicle, the one or more sensors 102 at least comprising a GPS sensor 1024 and/or an accelerometer 1025, the mobile device 10 comprising one or more wireless connections 105, wherein by at least one of the wireless connection 105 the mobile device 10 acts as a wireless node 221, . . . , 225 within a cellular data transmission network 2 by means of antenna connections of the mobile device 10 to the cellular data transmission network 2, and the one or more sensors 102 being connected to a monitoring mobile node application 101 of the mobile device 10, wherein the monitoring mobile node application 101 captures usage-based 3 and/or user-based sensory data 3 of the one or more sensors 102 of the mobile device 10, in that the mobile device 10 measures a plurality of time series 331, . . . ,33t of sensory parameter values based on measuring parameters 3 obtained from the mobile device's 10 sensors 102, each time series 331, . . . ,33t at least comprises a time series 33i2 of sensory parameter values 32 of location and/or speed measurements of the GPS sensor 1024/102, wherein the GPS sensor 1024/102 measures the mobile device's 10 longitude 10241, latitude 10242 and altitude 10243 positions as time series 33i2 by measuring different speed of light delays in the signals receiving from two or more satellites, in that for each measured time series 331, . . . ,33t, a start point 11411 and an end point 11412 of at least a part of a measured time series 331, . . . ,33t of sensory parameter values is detected triggering the allocation of the at least part of the measured series 331, . . . ,33t to a specific trip 1141 having the detected start point 11411 and the detected end point 11412, in that for any pairing 1142 of detected trips 1141, a first geographical distance between the detected start points of said trip pairing and between the end points of said trip pairing is measured based on the GPS-based location parameter values of the sensory parameters 32 of the at least part of the measured series 311,312,313;321,322,323, and a second geographical distance between the detected start point of a first trip and the detected endpoint of a second trip of said trip pairing and between the detected start point of the second trip and the detected endpoint of the first trip of said trip pairing is measured based on the GPS-based location parameter values of the sensory parameters 32 of the at least part of the measured series 311,312,313;321,322,323, in that a third geographical distance is measured by measuring for each of the two trips of the pairing a trip length between the detected start and end points of each trip of the trip pairing, where the third geographical distance is given by the relative difference of the two measured trip lengths, and in that the three measured geographical distances are mutually normalized mapping the measured geographical distances into a range between 0 and 1 by applying a modified sigmoid transfer by mapping the three measured geographical distances in a normalized range from 0 and 1, wherein an overall familiarity parameter value is measured by composing the three normalized geographical distance values to a weighted average of the three normalized geographical distance values, wherein the measured overall familiarity parameter value in a normalized range from 0 and 1, and wherein an overall familiarity parameter value of 0 indicated identical trips and an overall familiarity parameter value of 1 completely different trips. As an embodiment variant, the mobile device 10 can also access sensory data of external sensory devices, as e.g. in-car sensors, or smart-house sensors, over interfaces as Bluetooth or WIFI etc. The measured time series 331, . . . ,33t consists of a sequence of discrete-time measurements at successive equally or speed-dependently or transportation-mode-dependently spaced measuring points in time, describing the measured time course of a route or trip.

FIG. 1 schematically illustrates an architecture for a possible implementation of an embodiment of the system and method for automated trip familiarity detection 114. The electronic trip familiarity detection 114 is based on sensory data 3 measured by one or more sensors 102 of a mobile device 10 of the trip familiarity detection system 114. The mobile device can e.g. be associated with a user 6 and/or embedded in a vehicle, such as a car or a maritime vessel etc. The mobile device 10 can e.g. be realized as a mobile telecommunication device 10 and the one or more sensors 102 are integrated sensors 102 of said mobile telecommunication device 10. As an embodiment variant, the mobile device 10 can also access sensory data of external sensory devices, as e.g. in-car sensors, or smart-house sensors, over interfaces as Bluetooth or WIFI etc. The mobile telecommunication device 10 can e.g. be a cellular mobile phone and/or a smart phone. The one or more sensors 102 at least comprising a GPS sensor 1024 and/or an accelerometer 1025. The mobile device 10 comprise one or more wireless connections 105, wherein by at least one of the wireless connection 105 the mobile device 10 acts as a wireless node 221, . . . , 225 within a cellular data transmission network 2 by means of antenna connections of the mobile device 10 to the cellular data transmission network 2. The one or more sensors 102 are connected to a monitoring mobile node application 101 of the mobile device 10, wherein the monitoring mobile node application 101 captures usage-based 3 and/or user-based sensory data 3 of the one or more sensors 102 of the mobile device 10.

The mobile device 10 measures a plurality of time series $331, \ldots, 33t$ of sensory parameter values based on measuring parameters 3 obtained from the mobile device's 10 sensors 102. The measured time series $331, \ldots, 33t$ consists of a sequence of discrete-time measurements at successive equally or speed-dependently or transportation-mode-dependently spaced measuring points in time, describing the measured time course of a route or trip. Each time series $331, \ldots, 33t$ at least comprises a time series $33i2$ of sensory parameter values 32 of location and/or speed measurements of the GPS sensor 1024/102, wherein the GPS sensor 1024/102 measures the mobile device's 10 longitude 10241, latitude 10242 and altitude 10243 positions as time series $33i2$ by measuring different speed of light delays in the signals receiving from two or more satellites.

For each measured time series $331, \ldots, 33t$, a start point 11411 and an end point 11412 of at least a part of a measured time series $331, \ldots, 33t$ of sensory parameter values is detected triggering the allocation of the at least part of the measured series 331, . . . ,33t to a specific trip 1141 having the detected start point 11411 and the detected end point 11412. To measure and trigger the detection of a start point 11411 and/or an end point 11412 based on the measured time series 331, . . . ,33t of sensory parameter values, wherein the earliest geo coordinates (latitude and longitude) for the trip start point and the latest for the trip end point are selected.

The detection of the start points 11411 and the end points 11412 in at least part of the measured time series 331, . . . ,33t of sensory parameter values can e.g. comprise reporting of the exact geo coordinates by a monitoring module and/or application if the "start recording" trigger fired and when the "stop recording" trigger fired. "Start recording" and "stop recording" triggers can e.g. be fired based on an edge module running in the mobile device monitoring different sensory parameter comprises motion activity detector and geofencing service built-in the mobile phone. The process for automatic trip recording is based on the following steps:

"Start recording" both app implementations (Android, iOS) do have background processing that monitor the connection to Bluetooth devices, activity chip output, pedometer sensor, significant location change (SLC event for iOS and Fused Location Provider FLP for Android) and AppStart event when the app is bring to the foreground process. If during the background processing any of the following events is detected a "Start recording" event is raised and the next step "Trip Validation" start:

A Bluetooth connection has been activated

Activity chip is returning "Automotive" for iOS or "IN_Vehicle" for Android with at least a medium confidence.

Pedometer sensor is not detecting steps for 25 seconds after a walking session

SLC event is raised by the operating system e.g. radio cell change

App is started

"Trip validation" is the period after a "Start recording" trip event is raised when the app monitors the GPS speed for a maximum of 120 seconds. If within 120 s there are at least 5 GPS speed values above or equal to 20 km/h the trip validation finish successfully and the "trip recording" stage start. On Android if a walking related activity is detected the trip validation is stopped. On iOS there is not analogous rule.

"Trip recording" is the period of time during which the app record GPS @1 Hz, accelerometer @10 Hz and distraction events. The recording is stop when a "Stop recording" trigger is detected.

"Stop recording" event trigger a "Stop trip validation" phase that is explained in the next point. "Stop recording" trigger is fired based on the following rules:

Bluetooth connect is lost for 120 seconds

Activity chip is detecting "Walking" or "Stationary" activity and GPS speed is below 10 km/h GPS receiver do not receive valid positions, accuracy greater equal than 50 meters, or speed is below 10 km/h for 10 minutes "Trip end validation" is successful if within 90 seconds no GPS speed value is above 20 km/h otherwise current "Trip end validation" is canceled and app keeps recording until the next "Stop recording" event.

It is to be noted for mobile devices, that in the prior art, several Global Positioning System (GPS)-assisted data collection and recording methods (or simply GPS methods) are known providing chunks of time-series of measuring parameter value, associated the start and end of a trip. These systems or applications can be run on mobile devices. However, many of these methods usually require extensive financial and human resources to implement and impose extra tasks on participants. Recent improvements in smartphone-based location and communication technologies allow to address the limitations of current GPS methods. However, considering the battery consuming procedure of travel data recording using smartphones, the continuous recording of individuals' travel activity is not always possible in smartphone-assisted methods. Addressing this concern, it would be imaginable to employ an active data collection approach to minimize the duration of trip recording. This approach requires the participant to be actively involved during the data collection and start/stop the trip recording. However, the accuracy of the collected data using this approach might be negatively impacted due to its high level of participant involvement. Id est, a trip will be missed, if the participant forgets to start/stop trip recording on time. Another technical possibility is to reduce the accuracy of positioning, by increasing logging intervals, or relying on inaccurate positioning algorithms. However, these alternatives adversely impact on the quality of collected data. As an alternative to the above proposed embodiment variant for measuring chunks of trip measuring data with start and end point, a smartphone-based travel data measuring is proposed, which is able to address the battery consumption concern as well as minimizing participants' involvement, while enhancing the accuracy of data collection. The proposed data processing can e.g. be designed to detect single mode trip-segment of individuals automatically based on a combination of real-time and post processing. As FIG. 34 illustrates, the method is able to automatically detect single mode trip-segments in a smartphone-assisted travel data collection. The proposed methodology consists of a data collection procedure which is supported with an enhanced trip/trip-segment detection model. A combination of real-time and post processing is employed in the development of the proposed trip/trip-segment detection model. The reliable performance of the model has a crucial significance in accurately detecting and recording the travel activity of participants with a high-level of accuracy, while managing the battery consumption of the smartphone. This model is developed based on the data collected automatically by the sensors of a smartphone.

In this embodiment variant, the data collection can e.g. be conducted by a smartphone application running on a smartphone. It should be able to automatically record the travel behavior of survey participants over a full working-day relying on its enhanced battery optimization. FIG. 1 presents an overview of an embodiment variant of data measuring, collection and/or reporting. When the smartphone application is installed and launched on a smartphone, it runs in the background without interfering with the normal phone usage of the participant. It automatically starts and stops the trip recording procedure based on participant's significant movements triggering the "start trip" and the "stop trip" detection. During the recording, the application automatically records the travel attributes of a participant (e.g., timestamp, GPS coordinates, speed, heading, and location accuracy), for example, for every 10 meters of movement. The application stops recording automatically when the participant remains stationary for a predefined time threshold, e.g. for six minutes. In an initial learning phase, at the end of a travel day, as a control back loop the participant can e.g. review his/her recorded trips and label them on their phone by specifying purpose, mode(s) of travel and accompanying persons. Then his/her labelled trips can e.g. be uploaded to a web server through a menu in the smartphone application or the like.

This embodiment variant can incorporate a combination of real-time and post processing of collected data. The real-time processing occurs within the smartphone app, while the post processing starts when the collected data has been uploaded to the research server. For an example, see FIG. 35. The real-time data processing can be used in the smartphone application for data cleaning, detecting stationary situations and splitting trips, as well as trip refining. In this embodiment variant, the application performs the initial data cleaning while storing logs on the smartphone. A threshold is defined on the horizontal location accuracy of recorded points to remove the points that have horizontal location accuracy of more than 200 meters. These logs are automatically discarded by the smartphone application before storing the trip data. This criterion is important to exclude inaccurate logs, and efficiently store and transfer accurate data. A threshold is defined as the dwell-time for detecting stationary situations. Trip recording can e.g. be stopped automatically if a stationary situation has been detected for more than this interval. Choosing a suitable value for the dwell-time can be crucial, as a small value would lead to several incorrect trip/activity detections. For instance, being in traffic congestion or waiting at a red light can significantly increase the time difference between two consecutive trip-logs. Dwell-time has to be chosen appropriately to ignore all interim points of a single-mode trip and detecting the actual start/finish or mode transfer points. Several values have been tested for dwell-time in a trial and error process. The value of 360 seconds for the dwell-time of the real-time processing returned the most accurate results. Since GSM signals are employed for detecting any significant movement and any change in GSM signal can lead to an incorrect trip recording (false trip) in the trip refining step, a threshold of 150 seconds is defined remove false and very short trips.

The post processing can in a combine embodiment variant e.g. comprise the steps of: (i) data cleaning, (ii) trip/trip-segment identification, (iii) mode class identification, (iv) trip merging and (v) finally trip refining. Unlike previously proposed trip detection methods, data smoothing is suggested to be dropped in the proposed trip detection framework. Many prior art systems use data smoothing on GPS raw data, however, it is to be noted that this may lead to removing some informative trip logs, which can be used in next steps of trip attribute extraction, specifically trip detection.

For the data cleaning, the following exemplary thresholds can be used to remove inaccurate logs, which are not removed during the initial (real-time) data cleaning: (1) If (speed<0) then delete trip-log (Unavailable speed (speed should be positive), (2) If (speed>42 m/s) then delete trip-log (Incorrectly recorded speed based on the historical data), (iii) If (acceleration>10 m/s2) then delete trip-log (Unrealistic acceleration based on historical data). The first threshold removes those logs in which the smartphone could not detect the instantaneous speed (for these logs, the instantaneous speed is recorded as (−1)). The second and third thresholds are defined based on the maximum speed and possible acceleration of historical data. These thresholds can e.g. be defined as 42 m/s and 10 m/s².

The system can e.g. process the cleaned data based on four different aspects: dwell time, participant-id, significant speed change and low-speed threshold. These rules are proposed based on specifications of the collected data, and can e.g. be calibrated as follows: (1) Dwell time: This rule is employed to initially identify trips/trip-segments. The threshold of 240 seconds is chosen for this rule. The threshold is reduced compared to the dwell time threshold of the real-time processing (i.e., 360 seconds) to detect stationary situations more accurately. To merge those trip-segments which might be split incorrectly, the proposed trip splitting model is followed by a trip merging step; (2) Participant-id: Participant-id is used to distinguish the travel activities of different participants; (3) Motorized/Non-motorized trip identification: The following rules are applied to specifically identify the non-motorized trip-segments which are made immediately before or after a motorized trip: (a) Significant speed change: A speed-change threshold of 10 m/s is defined to detect significant speed changes. If the difference of the average speed of 10 previous logs and 10 later logs of a point is more than 10 m/s, the point is labelled as a significant speed change point. These points could be an index for a mode transfer; (b) Speed-change clusters detection: Since significant speed changes can occur in consecutive logs, this rule is defined to detect and aggregate those consecutive logs in which significant speed changes occur; (c) Low-speed threshold: In order to shortlist those mode-transfer points where a motorized mode changed to a none-motorized mode (or vice versa), a low-speed threshold of 2 m/s is defined. This rule is applied on those points chosen based on the previous two rules and those points that have a non-motorized mode on one side of them.

In this combined embodiment variant, for example, a rule-based structure can be used to classify detected trips/trip-segments based on their mode-class (motorized versus non-motorized trips). The purpose of this step is to identify and merge those trip-segments, which were split incorrectly. This structure is based on an outlier analysis on the average speed and acceleration of reported trips, and the labelled mode of travel by participants. The outlier analysis (with an accuracy of 95%) can e.g. be performed on the average speed of the reported trips to distinguish the motorized from the non-motorized trips. In addition, an outlier analysis can be performed on the average acceleration of the outliers of the speed-related rule. The rules e.g. used for mode-class identification can be defined as follows: (1) Mode: Non-motorized modes (cycling and walking)—Mode-detection rules: (a) average speed≤5.60 (in m/s) and (b) average acceleration≤0.23 (in m/s²); (2) Mode: Motorized modes (passenger car, bus, and train)—Mode-detection rules: (a) 5.60<average speed (in m/s), and (b) 0.23<average acceleration (in m/s²). Since a single trip might be split into several trip-segments in the 'trip splitting' step, a trip merging step is required to identify and merge the incorrectly split trip-segments. Consecutive trip segments, which were previously labelled, are reviewed based on their mode class and time difference. Two consecutive trip-segments of a participant are merged if their time difference is, e.g., less than 120 seconds and their mode are combinable. As discussed (e.g. see FIG. 35), there can be a feedback loop from the 'trip merging' step to the 'trip detection' step. The feedback loop is controlled by a logical test on the total number of detected trips. It means that the loop will be continued until the same total number of trips is detected in two consecutive loops. To avoid over-split trips/trip-segments and the need for further data refining procedures, predefined rules can e.g. be applied to identify and remove them. For example, a trip-segment can be discarded if its travelled distance is less than 50 m, or the trip duration is less than 30 seconds.

For any pairing 1142 of detected trips 1141, a first geographical distance between the detected start points of said trip pairing and between the end points of said trip pairing is measured based on the GPS-based location parameter values of the sensory parameters 32 of the at least part of the measured series 311,312,313;321,322,323. A second geographical distance is measured between the detected start point of a first trip and the detected endpoint of a second trip of said trip pairing and between the detected start point of the second trip and the detected endpoint of the first trip of said trip pairing is measured based on the GPS-based location parameter values of the sensory parameters 32 of the at least part of the measured series 311,312,313;321, 322,323. A third geographical distance is measured by measuring for each of the two trips of the pairing a trip length between the detected start and end points of each trip of the trip pairing. The third geographical distance is given by the relative difference of the two measured trip lengths, and in that the three measured geographical distances are mutually normalized mapping the measured geographical distances into a range between 0 and 1 by applying a modified sigmoid transfer by mapping the three measured geographical distances in a normalized range from 0 and 1. An overall familiarity parameter value is measured by composing the three normalized geographical distance values to a weighted average of the three normalized geographical distance values, wherein the measured overall familiarity parameter value in a normalized range from 0 and 1, and wherein an overall familiarity parameter value of 0 indicated identical trips and an overall familiarity parameter value of 1 completely different trips.

In further embodiment variants, the signaling output of the present trip familiarity detection system 114 can e.g. be used as steering or input signals for Advanced Driver Assistance Systems (ADAS), traffic control systems, navigation system, usage-based risk measuring and monitoring systems etc. For example, the system 1 can e.g. comprise one or more automated first-tier risk-transfer systems 12 (automated primary insurance systems) and one or more automated second-tier risk-transfer systems 13 (automated reinsurance systems). The automated first-tier risk-transfer systems 12 can comprise at least one electronic first-tier resource-pooling system 121 and the automated second-tier risk-transfer systems 13 can e.g. comprise at least one electronic second-tier resource-pooling system 131. Resource-pooling systems 121/131 are systems for automated, electronically steered pooling of resources from assigned risk exposed occupants/drivers/passengers 6, thereby transferring a defined risk associated with the risk exposed user 6 to the automated first-tier and/or second-tier systems 12/13, wherein the operation of the transferred risk is defined by risk-transfer parameters 122/132, e.g. predefined by means of predefined parameters given by risk-transfer policies, and wherein in case of triggering the occurrence of the defined risk at a user 6, an occurring and detected loss of the concerned risk exposed user 6 is distinctively covered by the automated resource-pooling systems 121/131 by triggering the specific transfer of resources from the resource-pooling system 121/131 to the concerned risk exposed user 6, e.g. through appropriate signaling based on generated payment transfer parameters 123/133. The operation of such a system 1 will be described in detail below. The risk-transfer parameters 122/132 can e.g. comprise parameters defining physical measuring parameters to detect the occurrence of a risk event at the risk exposed user 6, by means of the system 1 and/or time- or amount related threshold values. The risk exposed user 6 can be any type of person and the risk can e.g. be associated with vehicle- or car-driving or traffic risk, e.g. associated with a driver or passenger. A risk is related to the probability for the occurrence of an impacting event in relation to risk-exposed user 6. The automated system 1 can e.g. include at least a processor and associated memory modules. The operation of the system 1 is controlled, monitored, and steered by the electronic control device 11, in particular generating appropriate signaling and steering the activation and interworking of the various components of the automated system 1. The automated system 1 can also include one or more display units and operating elements, such as a keyboard, and/or graphic pointing devices, such as a computer mouse. The system 1 is a technical device inter alia comprising electronic means used in the field of computer and data processing technology, telematic technology and automated risk transfer or insurance technology. The invention seeks to technically capture, manage, and automate complex related operations of monitoring devices.

Transport Mode Recognition (TMR) 113

Figure 2:
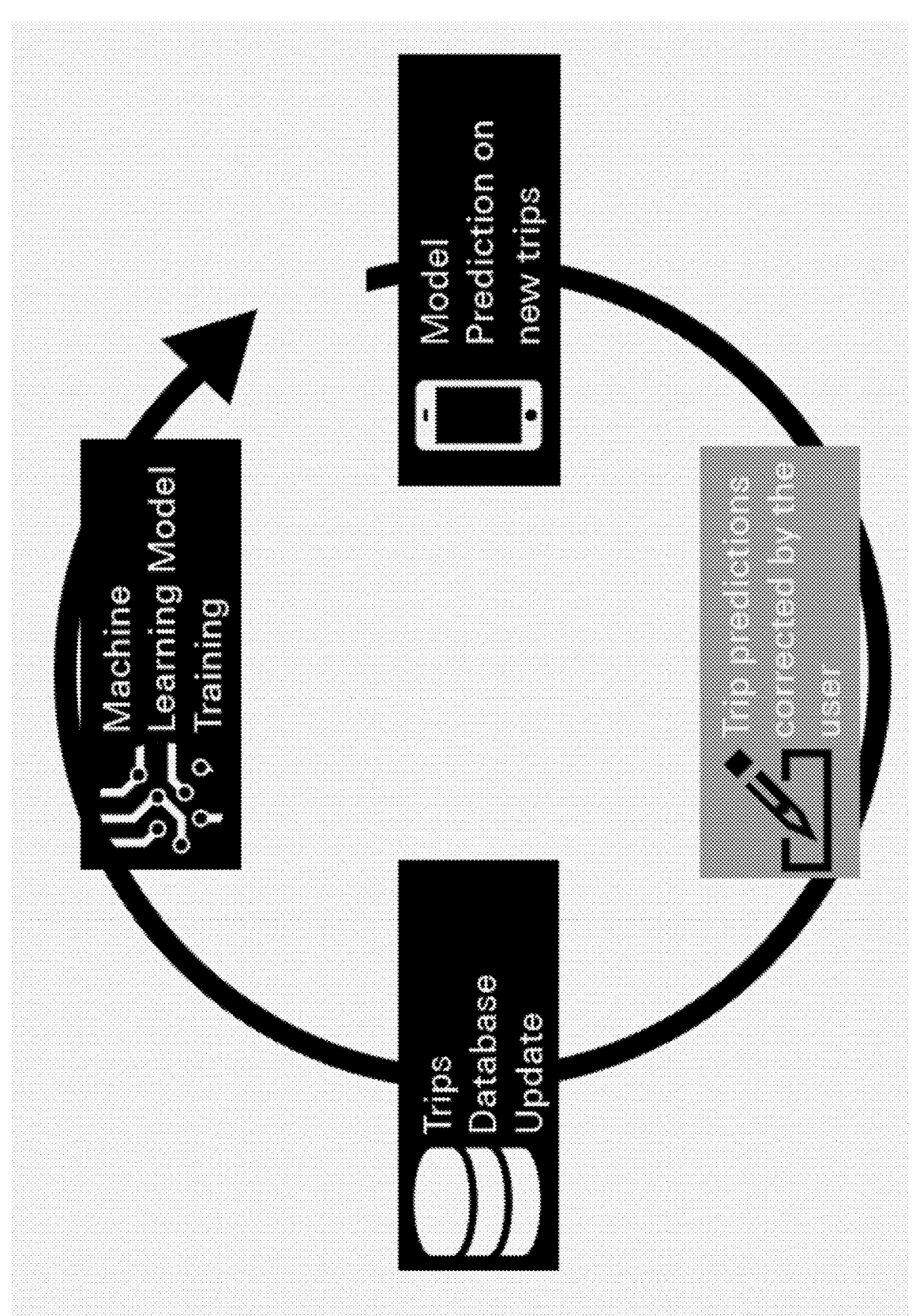
FIG. 2 shows a block diagram schematically illustrating an embodiment variant of an exemplary system for automated transportation mode recognition 113. A supervised learning structure 1136 is applied to the gradient boosting machine-learning classifier 1131 of the transportation mode recognition 113 during a supervised learning phase. Transport mode movement patterns 11351 of measured trips 1135 are stored to a trips database 33. The mobile device 10 measures sensory movement parameters 311,312,313;321,322,323 based on measuring parameters obtained from sensors 102 of mobile devices 10 of a heterogeneous set of users 6. Transport mode movement patterns 11351 of a trip 1135 are identified from the measured sensory movement parameter values 311,312,313;321,322,323 by the transportation mode recognition devices or system 113, wherein each trip comprises at least measured sensory movement parameter values 311,312,313;321,322,323 of GPS positions by the GPS-sensor 1024/102, and of acceleration forces being applied to the mobile device 10 on all three physical axes by a 3-axis accelerometer 1025/1902, and of operating system activities parameter values of an operating system of the mobile device 10, and a transport mode label value 1134. Trips 1135 with transport mode labels 1134 detected by the gradient boosting machine-learning classifier 1131 are fed into a user back-loop 1136 for dynamic correction by a user associated with the respective trip 1135 and saved to the trips database 33 by updating the learning transport mode movement patterns of measured trips 1135 in the trips database 33. The reliability of the automated transport-mode recognition increases as more data points are accumulated. If the system 113 fails to recognize the mode of transport correctly, users have the option to manually correct the predicted transport mode in the system 113. The changes are automatically detected and the supervised learning structure is retrained in order to avoid repetition of the same mistake and improve the overall performance: the TMR-system's 113 prediction capabilities improve in a continuous cycle.

The architecture of the Transport Mode Recognition (TMR) system represents a Machine Learning (ML) based solution: a collection of labeled trips performed by a heterogeneous set of users is measured and analyzed to extract a set of features that is used to train a supervised multiclassification Machine Learning structure. The output of the pure Machine Learning structure is then postprocessed by a set of hard coded rules, in order to avoid the algorithm to make clearly incorrect or insufficiently confident predictions. An additional add-on module based on Trip Familiarity can recognize the user's routines and can be activated to increase the model performances. The reliability of the automated transport-mode recognition increases as more data points are accumulated, where the accumulation can be performed by an automated process, das described below. As an embodiment variant, if the ML structure fails to recognize the mode of transport correctly, users can have the option to manually correct the predicted transport mode in the system. The changes can be automatically detected, and the supervised model is retrained in order to avoid repetition of the same mistake and improve the overall performance: the model's prediction capabilities improve in a continuous cycle (see FIG. 2).

The measuring data used to build the TMR system consist of trips being captured and hold by appropriate data structures, wherein each trip comprises the following measuring parameters measured and recorded by a mobile device: (i) GPS Positions, (ii) 3-axis Accelerometer, (iii) Operating System Activities, and (iv) Transport Mode Label annotation. The trips can comprise, for example, measuring data for transport modes as car, motorcycle, tram, bus, cycling, skiing, train, plane, boat, or others.

The system can e.g. apply a data filtering and preprocessing. For example, of the trips, data can be filtered out based on the following conditions: (i) At least one minute long, (ii) At least 30 GPS positions, and (iii) Exactly transport mode annotation. As a further preprocessing step, trips comprising duplicated GPS locations by timestamp, GPS locations that have negative speed and GPS locations that have accuracy >50 m can e.g. be removed.

The system can further comprise a data enrichment process. For example, the trip data can be enriched. As an embodiment variant, the enrichment processes can also be based on external APIs of third party providers. The performed enrichments can e.g. comprise: (i) Route matching, in order to understand if the trip was performed on a road, (ii) Query using a Geographic Information System (GIS)

geometries near the trip, the GIS capturing spatial and geographic data, (iii) Public transport matching. For the data enrichment, as a variant, the enrichment does not need to be performed on the full GPS track to perform, but (for example due to some APIs limitations) only a subset equally spaced GPS positions can be used.

The measured and generated features for the available trip data can e.g. comprise:

(1) GPS features comprising over the array of measured GPS speeds (i) Average, (ii) Standard deviation, and (iii) Percentiles from 0 to 100, with step 10 (so percentile 0, 10, 20 . . . ). Over the array of measured GPS altitudes of a trip the standard deviation, and over the measured array of GPS accelerations (i) the standard deviation, and (ii) the variance of the array obtained by measuring the angle between triplets of consecutive GPS points. GPS acceleration is defined herein as the ratio between the following two arrays: (i) Speed difference between a GPS sample and the preceding sample, (ii) Time difference (in ms) between a GPS sample and the preceding sample.

(2) Accelerometer features: If two or more accelerometer samples have the same timestamps, the last one can e.g. be selected with respect to array order. The acceleration norm array is then computed and, the average of this array is removed from all the same array. From the norm array, the following parameters can be extracted: (i) The percentiles from 0 to 100, with step 10; (ii) The interquartile range, which is the difference between the 75th and the 25th percentile.

(3) Features based on operating system activities: Two features using the operating system activities can e.g. be selected, based on the following criteria: (i) "Forward integral" processing is chosen because of the event-wise behavior of the activity labels, and since it's generally the most informative feature, (ii) "Count as most probable" processing can e.g. be chosen for simplicity. An activity event can be defined as a measuring object with a unique timestamp and a map of labels with probabilities (if a label is absent is considered to have zero probability). The two features are calculated for each possible label. Labels can be normalized to the Android names: 'Automotive', 'Cycling', 'OnFoot', 'Running', 'Stationary', 'Unknown', 'Walking', 'Tilting' for feature vector naming compliance between the two operating systems. The "forward Integral processing" can be implemented by assuming that a label probability is valid until the next event. Each label probability can be multiplied by the milliseconds elapsed until the next event, or until the end of the trip for the last received activity event. This must be done for each label of the possible label list. The results of these multiplications can be summed up for each label, and each sum can be divided by the difference between trip end time and the first activity event time, both in milliseconds. If a label is never returned, the corresponding feature should be set to zero. So, if there are no activities at all for a trip, all the features should be set to zero. The "count as most probable" processing can e.g. be implemented, in that for each possible label the number of events is counted, in which the label was the most probable one, where the count is then divided by the total number of events (or the number of unique timestamps). In case of a 50/50 draw, the most probable can be selected in any way.

(3) Public transport features: Given the set of GPS locations, candidate stops can e.g. be identified as sequences of points that fulfill the following conditions: (i) Speed<=3 m/s, (ii) Sequences are longer than 5 seconds. The calculation can be performed after applying a moving average with window length 9 over the array of speeds. This means that every sample is replaced by the average of the sample itself and the 4 samples before and after. For each of these candidate sequences, the average latitude and average longitude can be generated, obtaining a candidate stop position for each sequence/stop (see FIG. 3). Using the public transport algorithm inputs and outputs, some additional features can be generated, comprising: (1) the number of candidate stops of the trip (trajectory stops), (2) the number of candidate stops of the trip (trajectory stops) divided by the cumulated sum of haversine distances between the 16 sampled GPS points, ordered increasingly by time, in meters, (3) the number of suggested stops for the best matching API suggestion, (4) the cumulated haversine distance of the suggestion stops, in order of traversal, divided by the cumulated haversine distance of the sampled GPS points, (5) the cumulated haversine distance of the candidate stops, divided by the cumulated haversine distance of the 16 sampled GPS points (see point 2), and (6) the percentiles from 0 to 100, with e.g. step 10, of the minimum distances from the suggestion stops to the candidate stops (this is the standard public stop algorithm). These features can be generated for all the suggestions, but the ones selected are the ones regarding the suggestion with minimum distance between suggestion stops and candidate stops.

(4) Route Matching (RM features: Route matching features can e.g. be generated in order to estimate, based on the sampled GPS points, if the trip was not performed on a road. Two statistical descriptors can e.g. be generated over the trace points confidences: (i) the average of the confidences, and (ii) the variance of confidences.

(5) Geofencing (GFE) features: Using the geometries returned by general geofencing, the features used by the proximity search can e.g. be generalized. Basically, given the enrichment for the sampled GPS points, the percentage of points can be generated having geometries within 10, 20, 30 . . . 100 meters. This possibly includes points within a geometry, having distance <0. These distributions are can e.g. be generated for: (i) percentage of points seeing only roads within a XX radius (XX from 10 to 100, with step 10), (ii) the percentage of points seeing only rail tracks within a XX radius, (iii) the percentage of points seeing or roads or rail tracks within a XX radius, (iv) the percentage of points within an airport (negative geometry distance), and (v) the percentage of points within an airport (negative geometry distance).

The set of features described above can e.g. be used to feed the machine-learning gradient boosting structure (e.g. LightGBM) with the following hyperparameters configuration: n-estimators=225, learning-rate=0.03, max-depth=30, num-leaves=50, subsample=0.8, subsample=0.7, and min-sum-hessian-in-leaf=5.

For the hardcoded filtering rules, for example, some custom logic can be added after the Machine Learning classifier in order to limit unwanted mistakes. The first set of rules works on the trip features, to correct predictions that are clearly wrong. The second set of rules acts only on the trip modes with low precision, adjusting the predictions that have a low level of confidence, with the goal to reduce the false positive rate.

The rules based on trip features can e.g. comprise: (i) If GFEWater0>0.5 mark this trip as 'boat', (ii) If GFEWater0<0.2 and TMR-prediction='boat', mark this trip as 'other', (iii) If SpeedQuantile90>150 m/s, mark the trip as 'plane', and (iv) If TMR-prediction='plane' and SpeedQuantile100<20 m/s and GFEAirport=0, mark this trip as 'other'. A rules based on model confidence can e.g. be implemented, where if Predicted Transport Mode>Score Threshold, the prediction will be changed to Fallback Transport Mode

| Predicted Transport Mode | Score Threshold | Fallback Transport Mode |
|---|---|---|
| Public | 0.80 | Car |
| Motorcycle | 0.90 | Car |
| Cycling | 0.88 | Other |
| Train | 0.85 | Other |
| Plane | 0.85 | Other |

Figure 4:
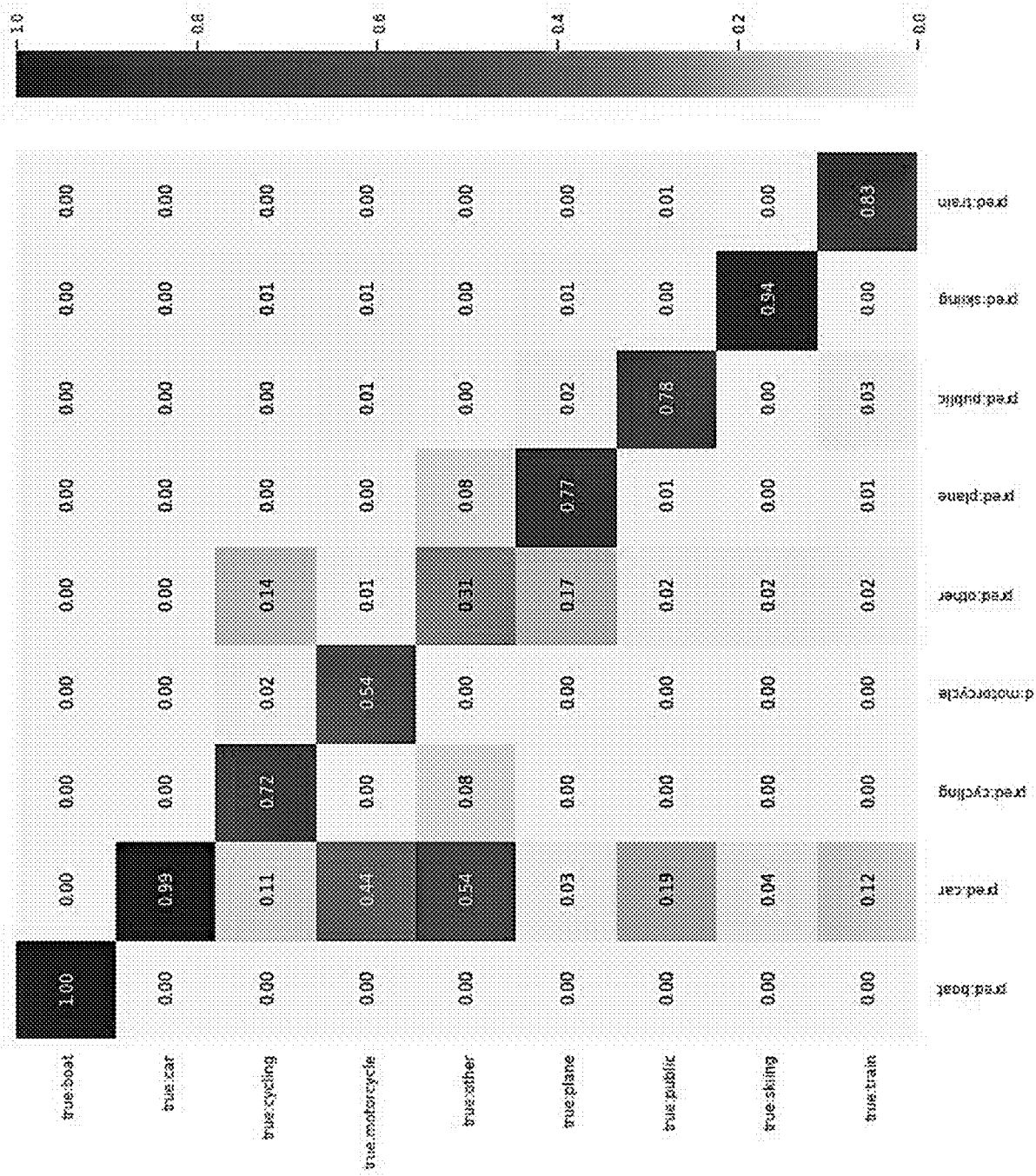
FIG. 4 shows block diagram schematically illustrating an exemplary performances achieved by the overall automated TMR system 113, which are described by the confusion matrix of FIG. 4 and the following table, and obtained through a 5-fold Cross-Measurement with a leave k-users out splitting technique, in order to reduce overfitting.

FIG. 4 shows exemplary performances achieved by the TMR system as illustrated by the confusion matrix and table of FIG. 4 and obtained through a 5-fold Cross-Validation with a leave k-users out splitting technique, in order to reduce overfitting.

As an embodiment variant, in addition to the supervised learning structure for TMR, a trip similarity strategy can be applied to further raise the TMR performances and accuracy. The idea is leveraging user annotations over previous similar trips, if any, and use this information to correct TMR labels, if needed. Thus, to find similar trips, a clustering algorithm can e.g. be run on the following features: (i) Distance between Trips Starting point *, (ii) Distance between Trips Ending point *, (iii) Trip Distances (*distance between start/ending points of the two trips is repeated after reversing one trip, to ignore the travel direction).

In order to improve the recognition between Car and Moto modes of transport, in an even further embodiment variant, a dedicated binary classifier can be applied. Leveraging the used Deep Learning architectures, the dedicated binary classifier aims to extract discriminating features directly from smartphone sensor time series: (i) 3-axis accelerometer, and (ii) GPS Speed.

As further data preprocessing, the time series can e.g. pass through the following preprocessing steps, before being ingested by the neural network: (i) Rotation of the 3-axis accelerometer from the smartphone reference system to the vehicle reference system, (ii) Alignment between accelerometer and GPS, sharing a common 10 Hz sampling grid, (iii) Each trip is split into multiple 5 minutes long mini-trips. The final input to model can e.g. be then a 4-dimensional time series, with a fixed length of 3000 timesteps (5 minutes*10 Hz).

Figure 3:
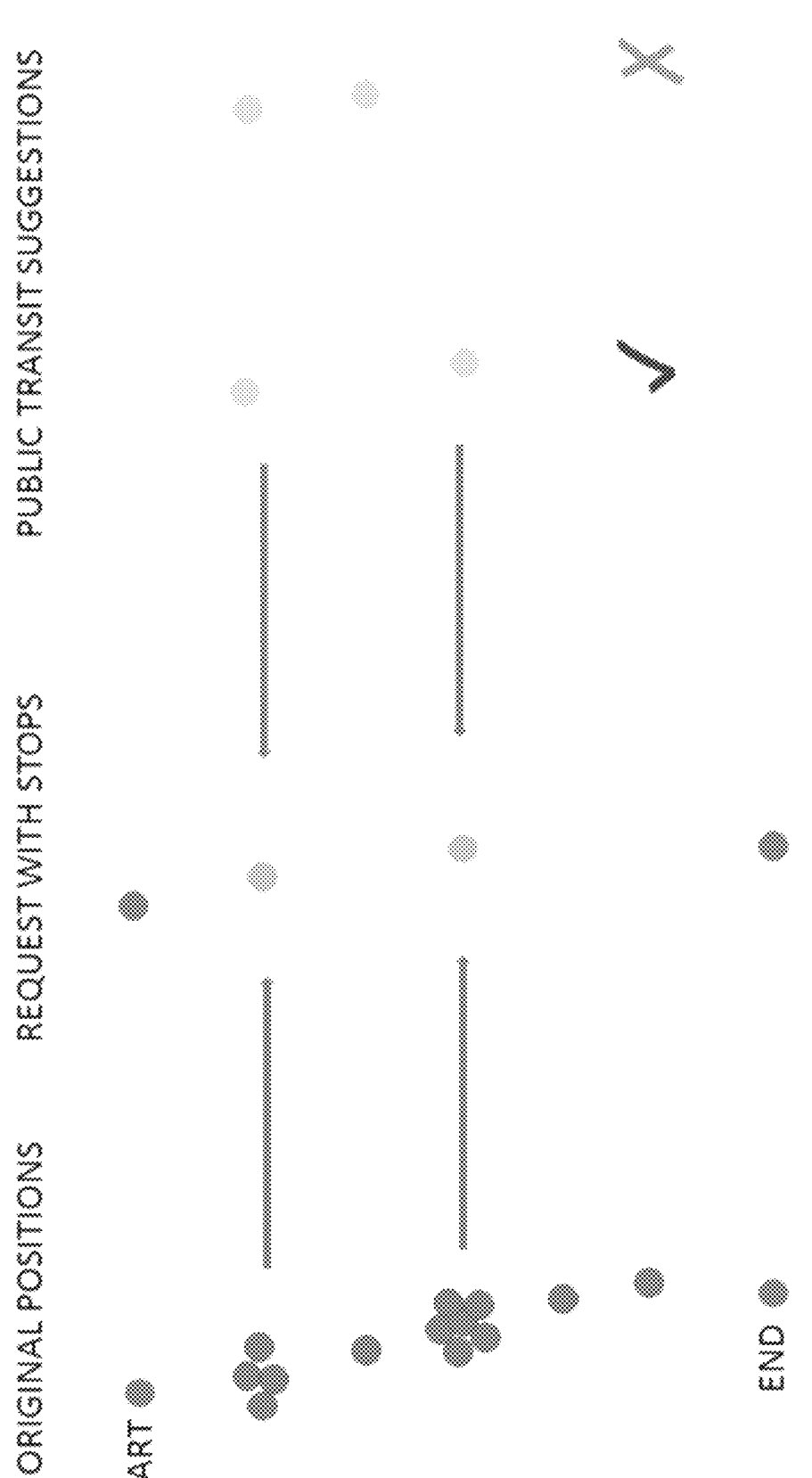
FIG. 3 shows another block diagram schematically illustrating exemplary how for each of candidate sequences, the average latitude and average longitude is generated by the TMR system 113, obtaining a candidate stop position for each sequence/stop. By using the public transport algorithm inputs and outputs, additional features can be generated by the TMR system 113: (i) the number of candidate stops of the trip (trajectory stops) (CandidateStopsCount), (ii) the number of candidate stops of the trip (trajectory stops) divided by the cumulated sum of haversine distances between the 16 sampled GPS points, ordered increasingly by time, in meters (CandidateStopsCountNormalized), (iii) the number of suggested stops for the best matching API suggestion (PublicRoutingNumStops), (iv) the cumulated haversine distance of the suggestion stops, in order of traversal, divided by the cumulated haversine distance of the 16 sampled GPS points (PublicRoutingDistRatio), (v) the cumulated haversine distance of the candidate stops, divided by the cumulated haversine distance of the 16 sampled GPS points (PublicRoutingCandidateDistRatio), and/or (vi) the percentiles from 0 to 100, with step 10, of the minimum distances from the suggestion stops to the candidate stops (this is the standard public stop algorithm). These features can be generated for all the suggestions, but the ones selected are the ones regarding the suggestion with minimum distance between suggestion stops and candidate stops.

An exemplary model architecture is shown in FIG. 3. Further, performances can e.g. be assessed through a 5-fold Cross-Validation with a leave k-users out splitting technique, leading to the results as shown in FIG. 4.

It has to be noted, that in various embodiment variants, the architecture of the Transport Mode Recognition system is very flexible and can be performed on a variety of environments, as e.g. the Databricks environment. The example of the Databricks environment has e.g. the advantages: (1) Having a shared codebase for quick prototyping and testing; (2) Enabling the reuse of the output code directly in the solution deploy; and (3) Get advantage of native Spark parallelism in order to perform multiple experiments and test different approaches. Other environments may have different advantages. Databricks is a technical environment growing out of the AMPLab project at University of California, Berkeley that was involved in making Apache Spark, an open-source distributed computing framework built atop Scala. Databricks provides inter alia a web-based platform for working with Spark, that provides automated cluster management and IPython-style (Interactive Python) notebooks, i.e. providing a command shell for interactive computing in multiple programming languages, in particular the Python programming language, offering introspection, rich media, shell syntax, tab completion, and history.

For the present invention, the analytics pipeline architecture was shaped to reflect, the flow of the live solution. The used pipeline can be separated in the following logical components: (1) Extract data from TMR campaign and IoT Platform (positions, sensors, annotations debug data), and enrich it with GIS services (HERE); (2) Extract descriptors/features from valid trip data; and (3) Learn a TMR classification model in a supervised learning setup. These three steps are the object of the following description. The final output of the last step is a classification model structure that can be consumed by a production service. This structure is a standard scikit-learn object that can be deployed e.g. in any Python enabled architecture. FIG. 7 shows a block diagram illustrating schematic an exemplary overview of the architecture of the Transport Mode Recognition system part of system 1, comprising (i) data extraction, data extraction and filtering, (iii) Position sampling, (iv) Candidate stops, (v) Data enrichment, (vi) Feature description, in particular GPS features, Accelerometer features, Feature based on operating system activities, Public transport features, RME features, and GFE features, (vii) Machine learning, (viii) Hardcoded filtering rules, and (ix) Early detection.

For the data extraction, trip data have to be merged from different tables. As a trip identifier, start/stop boundaries can e.g. be used, for example such ones uploaded as debug data by an appropriate debug module or application. This data is e.g. be uploaded to a container and be copied to corresponding tables stored in a data repository. In principle, one could use any trip boundary information. For example, JSON (JavaScript Object Notation) trip boundaries can be used in order to ensure consistency with the debug application logic, but this is not a constraint. Moreover, additional data can be extracted from the JSON which may not contained in the tables in a first time period, most notably the OS Activity and TMR library labels. Since an embodiment variant may use only the OS Activity labels among the two, and these labels can be uploaded in the normal application data flow, the debug JSON data is not a requirement for the inventive solution (cf. FIG. 8).

For the data extraction and filtering, the trip boundaries can be merged with the following exemplary data sources: (1) analyticsmodel_np0.positions for the GPS locations, (2) analyticsmodel_np0.userannotations for the ground truth provided by other users (Coloride), (3) OS Activities contained in the JSON, (4) (optional) analyticsmodel_np0.accelerometers, and (5) (optional) analyticsmodel_np0.deviceevents. Of these trips, data are filtered out by the system 1 based on the following conditions: (1) At least one minute long, (2) At least 30 GPS positions, and (3) Exactly one user annotation. As a preprocessing step, the system 1 can remove duplicated GPS locations by timestamp, GPS locations that have negative speed and GPS locations that have accuracy >50 m. Motivation for the latter choice is illustrated by FIG. 9, which shows the performance variation of the TMR classifier when varying the minimum accuracy threshold. Since the performance variation is not strong, compliance can be kept with the previously used threshold.

For the position sampling, in order to perform the TMR live call the system 1 needs to perform data processing on a subset of data points, since an arbitrary amount of data cannot be sent in a remote synchronous call. Based on the analysis of the performance over the number of sampled GPS locations, the points to be sampled can e.g. be set to 16 points equally spaced over the GPS locations array. Other sampling strategies could also be used, however, in the present example did not show a significant performance gain. Also, though more points could be sampled, there is up-to-now no evidence suggesting that sampling more than 16 points may be beneficial. 16 points can e.g. be chosen because it is the HERE Geofencing API limit for a batch call (cf. FIGS. 10a and 10b).

Candidate stop extraction can e.g. be performed by the system 1 identically to the current TMR implementation. Given the set of GPS locations, candidate stops are identified as sequences of points that fulfill these conditions: (i) Speed<=3 m/s, and (ii) Sequences are longer than 5 seconds. The data analysis is performed after applying a moving average with window length 9 over the array of speeds. This means that every sample is replaced by the system 1 by the average of the sample itself and the 4 samples before and after. For each of these candidate sequences, the system 1 generates the average latitude and average longitude, obtaining a candidate stop position for each sequence/stop (cf. FIG. 11).

For the data enrichment, trip data is then enriched by the system 1 with e.g. external APIs (Application Programming Interface), most notably HERE services and an appropriate proximity search. A depiction of the enrichment can be seen in FIG. 12. Apart for baseline data, the performed enrichments can e.g. comprise: (1) Route matching, in order to understand if the trip was performed on a road. In the experimental setup the service used is HERE Route Match Extension (RME). Alternative services or a normalized data source can be used, (2) Query of Geographic Information System (GIS) geometries near the trip, performed using a HERE GFE API/layers. This step is basically a generalization of the GFE approach used in a possible TMR solution (same source, more general features), and (3) Public transport suggestions, in this case HERE Routing API. In the analytics data processing pipeline of the system 1, data can e.g. be written on filesystem after this stage. This can happen for the overall data, which can be slow, or incrementally on a monthly basis. This is performed since the enrichment step is the "slow" one.

For the features description, the system 1 generates a number of features based on all available or historic trip data (e.g. see feature extraction illustrated in FIG. 13). The computed feature list is a superset of the used features. Below, the features actually used are described in the TMR solution, so generated features that are not described are typically mostly out of scope. The implementation of such extractions is mostly contained in the second step of the TMR analytics pipeline. In the production solution, if the constraint is a live TMR call, some of the features must be generated locally on the used phone 10 and sent together with the TMR API call. Alternatively, if TMR can be performed asynchronously, these features can also be generated as soon as trip data lands on the IoT platform of the system 1.

Regarding the GPS features, over the array of GPS speeds, the following features can e.g. be generated: (1) Average, (2) Standard deviation, and (3) Percentiles from 0 to 100, with step 10 (so percentile 0, 10, 20 . . . ). In the exemplary Databricks implementation, the percentile NumPy function can e.g. be used, with the interpolation parameter set to "nearest", whereas the known NumPy function provides a large number of predefined mathematical operations including standard trigonometric functions, functions for arithmetic operations, handling complex numbers, etc.

Over the array of GPS altitudes, the following feature can e.g. be generated: Standard deviation. Further, GPS acceleration can be implemented as the ratio between the following two arrays: (1) Speed difference between a GPS sample and the preceding sample, and (2) Time difference (in ms) between a GPS sample and the preceding sample. Finally, over the resulting array of GPS accelerations, the following feature can be generated: Standard deviation. A measure of direction variance of the trip can also be generated, following of the pipeline implementation. Zero values from the bearing array can e.g. be removed.

Regarding the accelerometer features: If two or more accelerometer samples have the same timestamps, select the last one w.r.t. to array order. The acceleration norm array can then be generated and, the average of this array can be removed from all the same array. From the norm array, some statistics can be extracted comprising: (i) The percentiles from 0 to 100, with step 10, (ii) The interquartile range, which is the difference between the 75th and the 25th percentile.

Regarding the feature based on operating system activities: Two features using the operating system activities can be selected, with the following rationales: (1) ForwardIntegral can be chosen because of the event-wise behavior of the activity labels, and since it's generally the most informative feature, and (ii) CountAsMostProb can be chosen for simplicity. An activity event, as used herein, is an object with a unique timestamp and a map of labels with probabilities (if a label is absent is considered to have zero probability). The two features are generated for each possible label. Labels can e.g. be normalized to the Android names: 'Automotive', 'Cycling', 'OnFoot', 'Running', 'Stationary', 'Unknown', 'Walking', 'Tilting' for feature vector naming compliance between the two operating systems. To perform a forward integral calculation, it can be assumed that a label probability is valid until the next event. Each label probability can be multiplied by the milliseconds elapsed until the next event, or until the end of the trip for the last received activity event. This must be done for each label of the possible label list. The system 1 sums the results of these multiplications for each label, and divide each sum by the difference between trip end time and the first activity event time, both in milliseconds. If a label is never returned, the corresponding feature should be set to zero. So, if there are no activities at all for a trip, all the features should be set to zero. Further, the system 1 performs a count as most probable calculation, where for each possible label the number of events is counted in which the label was the most probable one, and divide by the total number of events (or the number of unique timestamps). In case of a 50/50 draw, the most probable can be selected in any way.

Regarding the public transport features, public transport algorithm inputs and outputs are used to generate some additional features: (1) CandidateStopsCount: the number of candidate stops of the trip (trajectory stops), (2) CandidateStopsCountNormalized: the number of candidate stops of the trip (trajectory stops) divided by the cumulated sum of haversine distances between the 16 sampled GPS points, ordered increasingly by time, in meters, (3) PublicRoutingNumStops: the number of suggested stops for the best matching API suggestion, (4) PublicRoutingDistRatio: the cumulated haversine distance of the suggestion stops, in order of traversal, divided by the cumulated haversine distance of the 16 sampled GPS points (see point 2), (5)

PublicRoutingCandidateDistRatio: the cumulated haversine distance of the candidate stops, divided by the cumulated haversine distance of the 16 sampled GPS points (see point 2), and (6) The percentiles from 0 to 100, with step 10, of the minimum distances from the suggestion stops to the candidate stops (this is the standard public stop algorithm). These features are calculated for all the suggestions, but the ones selected are the ones regarding the suggestion with minimum distance between suggestion stops and candidate stops.

Regarding the RME features: RME features are generated in order to estimate, based on 16 GPS points, if the trip was not performed on a road. Two statistical descriptors are generated over the trace points confidences: (1) The average of the confidences using e.g. an implemented RMESampledTracePointsConfMean routine, and (2) the variance of confidences, using e.g. an implemented RMESampledTracePointsConfVariance routine.

Regarding the GFE features: Using the geometries returned by the GFE API (e.g. the HERE GFE API), the system 1 can generalize the features used by the Proximity Search. Basically, given the enrichment for the 16 points, the system 1 generates the percentage of points having geometries within 10, 20, 30 . . . 100 meters. This possibly includes points within a geometry, having distance <0. These distributions are computed for: (1) GFERoadOnlyXX generating percentage of points seeing only roads within a XX radius (XX from 10 to 100, with step 10), (2) GFERailOnlyXX generating percentage of points seeing only rail tracks within a XX radius (see point 1), (3) GFERailRoadXX generating percentage of points seeing or roads or rail tracks within a XX radius (see point 1), and (4) GFEAirport0 generating percentage of points within an airport (negative geometry distance). The exhaustive way of mapping geometries to originating points is to do a separate call for each of the 16 sampled GPS points. However, this can be expensive in terms of resources. A batch call with all the 16 points together can e.g. be performed, and then the geometries mapped back to the originating points by minimizing the haversine distance between the points and the nearestLat/nearestLon attributes for each geometry (for differences and details, see the batch version variant in the first step of the TMR pipeline—where GFE_API_Call should be replaced above in step1, and GFEFeats should be replaced in step2). It is to be noted that the second approach is less expensive but it's also less exact, so the overall performance can be slightly lower.

After the feature generation phase, the trip representation is serialized to the filesystem. For selecting the above described features from the larger generated features pool, a cross-validated Recursive Feature Elimination (see FIG. 14) can be used in order to get an estimate of the optimal feature set, averaging results over multiple experiments in a leave-k-users-out setup. Feature importance can be assessed for each classification setup (see below).

For the machine learning, in order to maximize classifier performances and fulfill the technical requirements, a two-stage classifier can e.g. be built. The first classification stage is a specialized "car"/"nocar" detection. This step maximizes performances over the transportation mode of main interest. Trips that are classified as "car" in the first step are permanently marked as "car". Trips that are not classified as car are then fed to a multiclass classifier that tries to assign the correct transport mode over the available classes. If the multiclass predicts "car" when the first step did not, we mark the trip as "unknown". This is motivated by precision measure evaluation. The classifier can e.g. be trained, leveraging TMR NP0 pilot data, over the following transport modes: car, train, public transport, bicycle, motorcycle, skiing, plane. The exemplarily chosen classification algorithm is Random Forest. Other algorithms are also imaginable. Motivation for this choice can e.g. stem from the need of controlling overfitting in the model, having probability estimates in the prediction. Moreover, this algorithm has the advantage of providing a good method for estimating feature importance. For tuning the algorithm parameters a grid exploration was performed after the feature selection phase (see FIG. 15). An exemplary configuration is: (1) 250 trees with maximum depth 8 for the binary classifier, and (2) 250 trees with maximum depth 10 for the multiclass classifier. After a successful training, models and results can e.g. be serialized for consumption, e.g. by a live service.

Further, hardcoded filtering rules can be applied. Based on the technical requirements, some custom logic can be added after the two-step automatic classifier in order to limit unwanted mistakes. The applied rules can e.g. be implemented as follows: (1) If PublicRoutingNumStops<3 or CandidateStopsCount<3 or PublicRoutingDistRatio<0.6 and the predicted TMR label is public (bus or tram), change the prediction to "unknown". This rule is meant to limit the public transport false positives (car trips predicted as bus trips), (2) If RMESampledTracePointsConfMean<0.25 and the predicted TMR label is not plane or train or bicycle, mark the trip as "unknown". This rule is meant to remove off-road trips from car candidates, and (3) If SpeedQuantile90>320, mark the trip as "plane".

In addition to the full track classification approach described above, an early classification can e.g. be performed when the classifier is highly certain that a trip should not be classified as 'car'. This embodiment variant uses the very same features and approach of the full track mode, but features are calculated only on the beginning of the trip. With an appropriate amount of data, an early filtering for train and bicycle trips can be implemented, with the assumption of performing the early decision for different classes at the same time, similarly to the production setup. The proposed time for the early classification, 300 seconds, can e.g. be based on empirical study of the response to the time window in term of F1-score (see FIG. 16). The exemplary production setup showed good performances at 180 seconds:

| | Precision | Recall | To car |
|---|---|---|---|
| Train | 97% | 78% | 3% |
| Bicycle | 93% | 71% | 18% |

The exemplarily used classifier performed even better with an early detection at 300 seconds:

| | Precision | Recall | To car |
|---|---|---|---|
| Train | 98% | 93% | 1% |
| Bicycle | 97% | 65% | 5% |

In general, a higher precision can be overserved, but mixed results in recall (very convenient for train, less performing for bicycle). The ability to filter out non-car trips from car predictions seems to be always better.

The overall solution leads technically to an improved performance (see below). Performance is evaluated in a leave-k-users-out cross-validated setup, in order to get a realistic performance projection. 3695 annotated trips, collected with Coloride NP0 (TMR tenant), have been fed as a training for the classifiers, with the following label counts:

| Car | 2190 |
|---|---|
| Tram | 462 |
| Train | 285 |
| Motorcycle | 219 |
| Cycling | 204 |
| Bus | 160 |
| Plane | 32 |
| Skiing | 13 |

Passenger trips can e.g. be reassigned as "car" trips for TMR purposes. FIG. 17 and FIG. 18 show respectively the performances of the current TMR service and the proposed solution. Reading both the tables (FIG. 17/18), in general the two effect the system 1 looks for are: (1) High values on the diagonal, which are better since they represent for each class the percentage of trips that are labeled correctly by the classifier, and (2) Lower values on the "car" column are better (outside the diagonal) since they represent for each class the percentage of trips that are mistaken as car trips. Comparing the two tables, the following can be noted: (1) 96% of the car trips are labeled as cars, which is a recall value. This is slightly less performative than an alternative solution, which defaults to car and has a higher car coverage. The latter value is indeed high, but is provided at expense of the precision, which is 82% on the baseline, while it raises to 89% for car in the current solution. (2) A new unknown class is introduced to catch the trips for which a label cannot be decided with sufficient evidence, (3) The combination of machine learning and custom logic, both of which are rooted in the past experiences on TMR from different teams, accordingly, to point 1 contributes to lower the number of car false positives, namely non-car trips that are labeled as cars. This is evident in all the considered classes: −22% cycling trips classified as car (from 23% to 1%), −10% public transport trips (from 33% to 13%), −2% train, −6% plane, −8% skiing. The resulting precision effect, as already observed, is that the car prediction is cleaner, (4) At the same time, the accuracy over the single non-car classes is generally higher: +16% train trips correctly classified (98% correct), +10% public transport, +1% cycling. Plane trips are an exception (−16% recall) but keep in mind that these trips are marked as "unknown" instead of car, (5) Motorcycle trips proved to be virtually indistinguishable from car using the available signals. Almost all of the motorcycle trips are regularly marked as car trips, (6) Most of skiing trips (92%) are now classified as "unknown". This is not ideal but far from dangerous since they are never classified as car trips.

Further, it is possible a make similarity add-on at the inventive system 1. Thus, in addition to the supervised learning approach for TMR, a trip similarity strategy can be applied in order to further raise TMR performances. The additional approach is leveraging user annotations over previous similar trips, if any, and use this information to correct TMR labels, if needed. This feature can be easily integrated in a production API, where the requirement is to have the 16-points representation of annotated trips available to the API, partitioned by user. The service can e.g. receive a new 16-points representation of a trip, together with TMR probability output, and matches this trip with similar annotated trips, if they exist. Similarity is calculated using a Euclidean pseudo-distance between trajectories. If one or more matches are found, a simple weighting algorithm modifies the TMR probabilities based on the annotation evidence. The new most probable class is then chosen as the TMR label. FIG. 19 show an exemplary F1 score varying TMR label weight (probability mass assigned to the automatic label).

The example's number of similar annotated trips to consider is two, or one if only one exists. With this parameter, the performance gain can be shown by the following table with F1 performance gain for significant classes, #annotations=2:

| F1 | Before | After |
|---|---|---|
| Car | 0.91 | 0.94 |
| Train | 0.98 | 0.98 |
| Public | 0.84 | 0.88 |
| Cycling | 0.88 | 0.85 |
| Motorcycling | 0.00 | 0.51 |

Trip Familiarity Score or Index Measuring

According to the present invention, there are different embodiment variants to technically assign to users and to sessions a score of how much of them follow habits (i.e. familiarity score measuring). The first two embodiment variants use a clustering method and then evaluate the familiarity from the dimensions of the clusters (and the familiarity of sessions from the dimension of the clusters in which them are assigned).

Below, the used variants of clustering method and the scoring method are described:

In a first embodiment variant, which uses a set of links of each session (herein denoted as link version), the clusters are created using jacquard similarity between the link of the sessions. Jaccard Similarity (coefficient) measures similarities between sets. It is defined as the measured size of the intersection divided by the size of the union of two sets. In particular, the similarity between two sessions is calculated in this way:

$$Sim(S_1, S_2) = \frac{|L_{S1} \cap L_{S2}|}{|L_{S1} \cup L_{S2}|}$$

where $L_{Sx}$ is the set of links of the session x. The agglomeration is done starting from one cluster for each session, and by agglomerating clusters that have a similarity of at least 0.8. The similarity between clusters with more than one session in it is done by considering the maximum similarity between all the possible combinations of sessions.

In a second embodiment variant, using start and stop points of each session (herein denoted as Start and Stop version), the start and stop points of each the sessions are used for clustering. The distances between two sessions are generated in the following way:

$$D(S_1,S_2)=hav(P_{A1},P_{A2})+hav(P_{B1},P_{B2})$$

where $P_{Xn}$ is the start(A) or end(B) point of the session n, and hav( ) is the Haversine distance between two points. The Haversine distance measures the great-circle distance between two points on a sphere given their longitudes and latitudes. The agglomeration can e.g. be done starting with a cluster for each session, considering as centroid of the cluster the couple start and end points of the session. The next step is done by agglomerating the clusters with a distance of 300 meters or less, iteratively. Every time two clusters are joined the centroid of the cluster are recalculated with a simple average of latitude and longitude of both A and B points of the centroids. Then another agglomeration is done like the previous but considering the centroids distance with the points matched in reverse way (start-points matched with end-points).

For the scoring generation of user familiarity and after the clustering, the Gini coefficient can be used on the dimensions of the clusters to assign to each user a familiarity score. The Gini coefficient measures the inequality among values of a frequency distribution (here the familiarity of trips). A Gini coefficient of zero expresses perfect equality, where all values are the same (for example, where all measured points of the trip match). A Gini coefficient of one (or 100%) expresses maximal inequality among values (e.g., for a large number of trips where only one trip has different measure points and all other trips have complete match, the Gini coefficient will be nearly one). Note that for larger sets of trips, values close to one are unlikely.

The following relation gives a possible index, which can be used for the generation of the familiarity and familiarity score, respectively:

$$Fam_2(U) = \sum_i |C_i|(\lambda)^i$$

where $|C_i|$ is the percentage of user session in the i-th cluster, taking the clusters in dimension order, decreasing. $\lambda$ is a parameter between 0 and 1 that indicates how clusters are considered in the proposed scoring. This value defines the weight given to each cluster in the final score, depending on the position of the cluster in the ordering. For example, if the value is set to 0.5, the first cluster will count 1, the second 0.5, the third 0.25 and so on. If the value is set to 1, each clusters is considered in the same way, if the value is set to 0, just the first cluster is considered. In an embodiment variant, this value is stetted to 0.5. The main idea of this index is to design a value that orders the users with the following order, given the clusters dimensions (x-axis: cluster number, y-axis: cluster dimension), as illustrated in FIG. 20.

For comparison between the Gini index and the index used in this embodiment variant, the used index is generated to adjust the fact that the first and the last two cases of the ordering wanted score 0 in the Gini index, that is an acceptable value just for the last one case. In FIG. 21 the correlation between the Gini index and the used index is shown. As it can be seen, there is a set of value that scored 0 in Gini but they assume a significative value in this new index. Further, it can be seen that the correlation between this two indexes seems to show some kind of regularity in the couple of values. The graph shows that there are some groups of points placed on the same line. This means that further exploration can lead to some kind of clustering algorithm, that uses a combination of this two indexes.

In any case, no general correlation can be overserved between the two indexes because they have two different concepts behind. Gini defines some kind of variance of the cluster dimensions, the new index defines a measure on how the sessions is distribute into the clusters, focusing on the main clusters. Both can be considered as measures of the user Familiarity. Finally, to score for the session familiarity, the familiarity score for a session is measured as the relative dimension of the cluster in which the session is placed, generated as the division between the session in cluster and the total sessions of the user.

A third embodiment variant of Familiarity (denoted herein as "Bag of Links" embodiment variant (BOL)) starts from a scores of familiarity for each link to calculate familiarity of sessions and users. A score of familiarity for each link of each user is generated as the percentage of sessions of the user in which the link appears. The session familiarity is generated as the average of the links scores in the session, the user familiarity is generated as the average of the scores of the links travelled by the user.

To compare the three proposed embodiment variants, the following can be observed: In the first two embodiment variants the familiarity depends on the way the sessions are clustered. After an inspection on the results, the cases in which the two methods give different results are the following. The user goes from the same point A to the same point B, but passing through different links (see FIG. 22). This behavior causes low aggregation in Link familiarity variant and high aggregation in Start Stop variant. In the dataset it has been spotted some cases in which the user travels the same streets but the way the geocoding measuring (e.g. HERE) gives the links causes a wrong behavior in the Link embodiment variant. Typically, it can happen that big streets have two different linkIDs for the two direction of the street, or two streets are too near and the geocoding measuring (e.g. HERE) spots the user in the wrong one. (see FIG. 23)

A second case happens when the user goes once from point A to point B1 (session S1), and once from A to B2 (session S2), as shown in FIG. 23. If S1 and S2 have enough links in common (the user travels the same path but ends up in different places) the two trips are clustered together in the Link method but not in the Start Stop method (in the cases in which the stop points are not enough near). (see FIG. 24)

The Bag of Links (BOL) embodiment variant does not generate clusters so a direct comparison on how the trips are agglomerated cannot be performed. However, a good inspection on this method can be done considering the get_familiarity process, respect to the other get_familiarity of the other embodiment variants. The case in which the BOL embodiment variant becomes useful is when the user does a new trip using only link that has already travelled in each of the previous sessions, but without covering the 80 percent of the shortest of these sessions. In this case the start and stop points are far away so the get_familiarity start stop will return 0, also the number of links in common are not enough to cover the 80 percent of links so also the get_familiarity of the link methods will return a low score. This new method instead will give a maximum scores of 1 (see FIG. 25).

To realize the different embodiment variants, different libraries can e.g. be used to generate the familiarity and relative examples of usage. Each libraries can require a specific input and retrieve the same output composed of three different dataframes. Exemplary dataframes my comprise the following composition: (i) familiarity_user: UserID: User_ID, SessionSize[ ]: Array containing the dimensions of clusters of that user, Familiarity: Index calculated with Gini index, Familiarity_v_2: Index calculated with the new index (described above); (ii) familiarity_session: UserID: User_ID, SessionID: Session_ID, familiarity_sess: Session familiarity, it is the relative dimension of the cluster in which the session is placed (session in cluster/total sessions of the user), and (iii) clusters: UserID: User_ID, Cluster: Generated identifier of the cluster, Sessions [ ]: Sessions in the cluster, Centroid: Centroid calculated in different ways, depending on the case. Each library can provide a function called get_familiarity (as already mentioned above), that takes as input a data frame containing the clusters previous calculated and a data frame containing a set of new sessions (each session must have the same shape of the data fame used to generate the cluster data frame). This function returns a score of familiarity for each session in the input set. This function does not update the clusters and simply assigns each new session to an existing cluster and return a slightly modified session-familiarity of that cluster (return the session familiarity of the sessions contained in that cluster, calculated as if the new session were contained in it). The function returns −1 if the session comes from a new user.

In a Familiarity Link Library, e.g. of databricks, a familiarity function can be implemented having as input one row for each session and the following fields: (i) UserID: Identifier for the user, (ii) StartTimeUTC: Start time of the session, used as a session ID, (iii) LinkIDs [ ]: Set of links traveled by the user in the session. The absolute value of the LinkID can e.g. be taken in order to consider just the link and not the travelled direction. Further, in a Familiarity Link Deployable, e.g. of databricks, an example of the usage of the previous library Familiarity Link Library can be provided. The environment can be selected on the widget and the function saves the three results dataframes on the three variables familiarity_user, familiarity_session and clusters. This databricks can be deployed on the described environments.

In a Familiarity Start Stop Library, a function can e.g. be provided which needs in input a data frame with the following composition: (i) UserID: User_ID; (ii) Start-TimeUTC: Start time of the session, used as a session ID; (iii) Coordinates{'lat_a': StartLatitude, 'long_a': StartLongitude, 'lat_b': EndLatitude, 'long_b': EndLongitude}: a structure containing the information of starting and ending points of the session. As an example library of the Familiarity Start Stop Library a Familiarity Start Stop Deployable can e.g. be provided, e.g. as another databricks. This is an example of the usage of the previous library. The environment can be selected on the widget and the function saves the three results dataframes on the three variables familiarity_user, familiarity_session and clusters. This databricks can e.g. be deployed on the described environments.

Further by e.g. a Familiarity Bag of Links, the output data frames can be different from the previous cases. The three tables can have the following shape: (1) Familiarity_user: (i) UserID: identify the user, and (ii) UserFamiliarity: familiarity of user, calculated as described above; (2) Familiarity_session: (i) UserID: identify the user, (ii) SessionID: identify the session, and (iii) SessionFamiliarity: familiarity of session, calculated as described above; (3) Scores: (i) UserID: identify the user, (ii) LinkID: identify the link, and (iii) scores: score of the link, calculated as described above. The scores table substitutes the cluster table. When it is desired to generate the familiarity of a set of new sessions, the get_familiarity of this library can be used but passing the scores data frames, instead of the cluster one. The functions of this library can e.g. be implemented to need the input with the following shape df: (i) UserID: identify the user, (ii) StartTimeUTC: starting time of the session, used as SessionID, and (iii) Links[ ]: array containing the absolute values of linkID of links traveled by the user in the correspondent session. A Familiarity Bag of Links Deployable can be provided as an example of the usage of the previous library. The environment can be selected on the widget and the function saves the three results dataframes on the three variables familiarity_user, familiarity_session and score. This databricks can be deployed on the des cribbed environments.

Trip Familiarity Detection 114

The inventive trip familiarity detection and measuring 114 can be realized as an integrated detection engine based on the above described Driver Passenger Detection (DPD) 112, Transport Mode Recognition (TMR) 113 and trip familiarity score measuring. I.e. the trip familiarity detection can be realized using TMR 113 measuring similarity with annotated trips, DPD 112 measuring familiarity through the above described LinkID v1, and the Familiarity Score measuring 114 using (i) the familiarity through the described LinkID v2 and/or (ii) start & stop and/or (iii) bag of links. A total of 5 different exemplary familiarity clustering data processing and algorithms are disclosed herein. However, other processes are imaginable based on the disclosed techniques.

First, the disclosed TMR 113 can be used providing the inventive technical strategy and data handling considerations. When a TMR 113 request is received live, the system 1 respectively the TMR 113 checks if a user already annotated or corrected a similar trip. Consequently, the system 1 must be able to efficiently retrieve historical annotated trip data and define a trajectory similarity measure. Since the TMR 113 live request contains a representation of the trip with 19 points, in the present embodiment variant, it makes sense to store this representation for each annotated trip, partitioned by a user identifier. This can e.g. be done in a database or a filesystem (e.g. one row per trip). The user annotation preferably can e.g. be stored together with the trip summary. This trip summary can be built/updated in batch using, for example, Databricks (e.g. nightly). The embodiment variant can imply information availability within 24/48 h from user annotation. Existing facilities and other approaches can be considered as well (cf. FIG. 26). For weighting the parameters and evaluating the performance under TMR 113, the multiclass probabilities can e.g. be weighted less than the annotation probability. This is in line with the fact, that, fi the user corrected a trip in the past and a similar trip was observed by the system 1, the user should be trusted. The proposed value for the weight is 0.4. FIG. 27 show an exemplary graph, with a TMR baseline.

An exemplary embodiment variant of the DPD 112, which can be used for the trip familiarity detection 115, and which can e.g. comprise the following technical steps performed by the system 1 and the trip familiarity detection and measuring 115, respectively: (1) Collect user history, (2) Cluster similar trips, (3) Define centroid trip, (4) New trips arrives: seek match with existing clusters, and (5) Check cluster DPD label. This is illustrated by FIG. 28, where N is the total number of sessions with DPD score in the cluster, where $D_i \in [0,1]$ $P_i \in [0,1]$ and $X_i \in [0,1]$ are final confidence scores returned by DPD for each sessions (including enter/exit and BT connection), and where cluster scores can be also generated from user annotations (Truth) or eventually from a combination of both sources.

The objective of the familiarity score is to create a measure for scoring purposes on how much a user travel on familiar roads. This can e.g. require the three different methods, as illustrated by FIG. 29, i.e. (1) Clustering through linkID, (ii) bag of links: linkIDs frequency, and (iii) start & stop. The start&stop method, as illustrated in FIG. 30 is in this context a powerful approach.

DPD used in the context of familiarity detection 114 can comprise the following: (1) For each user: (i) collect trip history (~few weeks), (ii) cluster similar trips (hierarchical agglomerative clustering via Jaccard distance $$J(A, B) = \frac{|A \cap B|}{|A \cup B|}$$

where trips that share 80% of the geocoding measuring (e.g. HERE) links are defined similar), and (iii) assign DPD average label to the cluster (using both user annotations+ algorithm results); and (2) For new trip arriving: (i) seek match with existing clusters (Jaccard distance between new trip & the centroids), and (ii) check cluster DPD label.

FIG. 30 shows an exemplary overview of a possible general architecture of the trip familiarity detection and measuring 114. It has to be noted that to measure similarity between trajectories can be computationally challenging in regard to the performance and consumption of the system 1. Thus, as an embodiment variant, a similarity prefilter can be used in the system 1, in particular for TMR 113, where the data processing is only performed on a subset of likely candidates. A trip is considered a valid candidate of its start and end both lie within a certain radius from the start/end of the current trip (the one that is evaluating in a TMR live request). The radius can e.g. be set to 500 meters for this example, based on empirical observation. Since user annotations can be in limited number (in normal operating conditions) and using the proposed similarity prefilter, the trajectory similarity is actually generated against a small subset of trips, which is illustrated in FIG. 31.

One of the technical objects of the trip familiarity detection is to automatically identify groups ("clusters") of similar trips. These clusters reflect user habits, which can be exploited to assist in the prediction of for example the transport mode or whether the user was travelling as a driver or as a passenger. A good example is people's way to work. Commuters will frequently travel the same route and will most likely use the same mean of transportation every time. To cluster trips, a way to quantify how similar two trips are needs to be found. In the following, two different embodiment variants A/B for the trip familiarity detection 114 and familiarity scoring are closer discussed:

(A) Jaccard Index of HERE Link IDs:
1. Trips sensory data are processed and enriched with additional data capturing location content such as road networks, buildings, parks, and traffic patterns. This data can also be accessed from external sources as e.g. from mapping and location data and related services providers, such as HERE Technologies (hereafter HERE). The route matching can thus be accomplished by information form providers as HERE. HERE expresses a route as a sequence of Link IDs, where a single Link ID represents a section of the road with uniform characteristics. Every time, the traveler has the possibility to take a turn or there is a change in the contextual information, a new Link ID begins. The similarity of two sequences of Link IDs can be measured by the Jaccard score, defined as the ratio of intersection over union. Intersection means the number of unique Link IDs that are present in both routes and union the number of unique Link IDs that are present in at least one of them. The score reaches from 0 (not at all similar) to 1 (both sequences are identical).
2. Clustering is typically performed on distance measurements, which can be obtained by subtracting the score from one.
3. In order to match a new trip with an existing cluster, a "centroid" has to be stored. The centroid is defined as the set of Link IDs that are present in the majority of the trips that belong to the respective cluster. How well the new trip matches the cluster is quantified via the Jaccard index between the Link IDs of the centroid and those of the new trip.

(B) Start-, Endpoint and Travelled Distance:
1. The geographical distance is generated between the start points of two trips and between the end points of the same trips using the Haversine formula. We want the cluster to also contain trips performed in the opposite direction and therefore additionally compare "start point 1" to "end point 2" and "end point 1" to "start point 2" and then use the comparison that results in the smaller distance (larger similarity).
2. Two trips are further compared and/or matched in terms of their lengths in kilometers. More precisely, the relative difference of their lengths is used in order to correctly handle trips starting and ending in similar locations but with different routes.
3. In order to guarantee the same contributions of all components to the overall similarity of two trips, we apply a modified sigmoid function that maps all three components into a range between 0 and 1.
4. The overall familiarity is then composed as a weighted average of the three components, resulting again in a number between 0 (identical trips) and 1 (completely different trips).
5. In this approach, clusters are stored as start- and end regions defined as circles. The center of a start (end) region is defined by the average of all start (end) points and the radius is the respective standard deviation. Additionally, the average travelled distance and its standard deviation is stored. A visual representation of such a cluster is shown in FIG. 33.
6. New trips are matched by calculating the distance between start (end) points in units of the respective radius and the distance in terms of travelled kilometers in units of the standard deviation. Again, sensitivity to the travel direction (A→B vs. B→A) is avoided by the same technique as described previously.

A preferred implementation follows the second approach. The reason for this is that users often use parallel roads in order to avoid dense traffic. For the Link ID approach this results in a completely different trip, while for the second approach the resulting difference is in most cases negligible.

Trips are clustered by iteratively grouping together trips that are closest together until there are no trips left that are closer together than a configured threshold. For this, for example, a machine learning structure can be applied based on agglomerative clustering, such as the agglomerative clustering structure from scikit learn using Python programming language. By the machine learning based clustering, proposed herein, routes are grouped as a set of objects in such a way that routes in the same group (cluster) are more similar (in some sense) to each other than to those in other groups (clusters).

Clusters, according to the invention, are groups with definable small distances between the cluster members, dense areas of the data space, intervals, and particular distributions. With the inventive structure, the clustering is thus technically approached herein as a multi-objective optimization problem. The appropriate clustering structures and parameter settings (including parameters such as the distances (in a variant, also realized as a distance function) to use, a density threshold or the number of expected clusters) depend on the individual data set of the user and intended use and/or transportation mode. The clustering herein is realized as an automatic task based on an iterative process of knowledge discovery and/or multi-objective optimization involving trial and failure by the machine learning structure. The inventive "start-, endpoint and travelled distance" method thus comprises certain hyperparameters that need to be optimized to achieve best performance. During the distance generation, there are two parameters, which are the weights for the start- and end point component and for the travelled distance component. During the clustering, there are two more hyperparameters, namely the distance threshold under which we consider two trips to be similar enough to form a cluster and a minimum number of trips required to create a new cluster. So, in total there are four hyperparameters that need to be chosen. The optimization can preferably be done separately for different use cases. For example, at least two such flavors can be used: One for the driver vs. passenger classification, where it is desired that clusters consist mainly of either driver or passenger trips in order to yield valuable information to distinguish these two categories. The second flavor is created for the transport mode recognition 113, where the parameters are chosen in a way that maximizes the pureness of the found clusters in terms of transportation mode.

The machine-learning based clustering provides a set of clusters, containing all or most of the objects in the data set. Additionally, the inventive machine-learning based clustering may specify the relationship of the clusters to each other, for example, a hierarchy of clusters embedded in each other, based on criteria as frequency, most frequent day-time of the routes in a cluster, transportation mode etc. If the trip familiarity detection further comprises a risk measurement, i.e. a measurement of a probability measure for the occurrence of an impacting event, such as an accident, traffic jam etc., said criteria may be associated with different weights to calibrate the risk measurement to said conditions concerned. In this context, it is to be noted that the criterion used for the identification of drivers' familiarity is crucial for most of the prior art systems. Two main criteria based on different scales were typically separately used to identify drivers' familiarity, in the prior art system, which are: (i) using a frequency-based scale (i.e.: having previously driven a route from more than once a day to never); and (ii) using a distance-based scale (i.e.: from drivers close to home to foreigners). It is clear that on both detection criteria, a driver can become route familiar due to repeated exposition. The first scale (frequency-based) directly identifies familiarity, while the second scale (distance-based) indirectly identifies familiarity instead. Thus, the recognition performance is limited in the prior art systems. By introducing the above-described weights, the inventive system does not have such limitations but allow to rely on its detection technically to different scales and criteria, respectively.

It is to be noted that since clusters are stored as start- and end regions defined as circles, where the center of a start (end) region can be defined by the average of all start (end) points and the radius is the respective standard deviation, and where the distance can be defined as the average travelled distance with its standard deviation as variance, the presently applied clustering could be described as a distribution-based clustering structure. Thus, for the technical aspect of the detection, clusters are implemented as objects belonging most likely to the same distribution, where the measured likelihood triggers the association of a route with a certain cluster identified by the machine-learning structure, where the recognition performance of the route familiarity detection 114 refers to the ability to recognize previously experienced sensory inputs.

As a further embodiment variant, e.g. to further improve the performance of the system 1, a Driver DNA measurement can e.g. be applied and performed by the system 1. One of the aims of the system 1 and e.g. a corresponding telematics app is to measure and to score the driver behavior through the recording of GPS, Accelerometer, Gyroscope, and other integrated sensors present in personal mobile phone or black boxes. Different combination of driver and transport mode have different driving style, moreover each driver has a different driving style depending on external factors e.g. weather, road type, and on personal factors e.g. motivation of the trip, time constraints and trip familiarity. Given previous assumptions, the transport mode recognition 113 and driver passenger detection 112 can be improved based on an in depth recognition and/or analysis of a single person driving style in combination with his trip history by the system 1. Another aim of telematics app is the machine-based coaching of the driver to reduce his risk while improving his driving style. The analysis of the driving style for each user with a related risk estimation will allow to provide personalized feedbacks and programs to reduce the risk exposure of each driver after a minimum amount of trip history. As an embodiment variant, different assumption for designing features that can contribute to technically define a driving style, can be used as follows: (i) Correlation between accelerometer and GPS speed, (ii) Frequency of maneuvers and phone distraction events per kilometers, (iii) In depth analysis of speed distribution while turning taking into consideration curvature degrees, (iv) Analysis of speed distribution taking in consideration road sinuosity, speed limit and road class, and (v) Analysis and feature extraction from accelerometer and gyroscope distribution as a function of road class, sinuosity and shape. Using clustering algorithms together with the above feature extracted from an historical set of trips of a single user allows to define and measure the driver's driving style. For the Driver DNA, as defined above, the system 1 clusters the feature measuring and describing the driving style of a user and to correlate each cluster with the frequency of transport mode, driver or passenger trips present in the cluster. In the end for each cluster there will be a rank of possible transport mode and a most probable output of driver or passenger. This combination is what is called herein the measuring of a DriverDNA.

Driver Passenger Detection (DPD) 112

For identifying and/or classifying an occupant of a vehicle 41, 42, 43, . . . based on sensory data measured by a plurality of sensors 102 of a cellular mobile device 10 of the occupant 6/61/62, the plurality of sensors 102 at least comprise an accelerometer 1025 and a gyroscope 1026. The mobile device 10 further comprises one or more wireless connections 105, wherein by at least one of the wireless connection, the cellular mobile device 10 acts as a wireless node 221, . . . , 225 within a cellular data transmission network 2 by means of antenna connections of the cellular mobile device to the cellular data transmission network 2, and the plurality of sensors 102 being connected to a monitoring mobile node application 101 of the mobile device 10. The one or more wireless connections 105 or wired connections of the mobile telecommunication apparatus 10 can for example comprise Bluetooth as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on the Wi-Fi 802.11 standard, and/or a contactless or contact smart card, and/or a SD card (Secure Digital Memory Card) or another interchangeable non-volatile memory card. For providing the wireless connection 105, the mobile telecommunication apparatus 10 can for example act as a wireless node within a corresponding data transmission network by means of antenna connections of the mobile telecommunications apparatuses 10, in particular, as mentioned, mobile telecommunication networks such as 3G, 4G, 5G LTE (Long-Term Evolution) networks or mobile WiMAX or other GSM/EDGE- and UMTS/HSPA-based network technologies etc., and more particularly with appropriate identification means as SIM (Subscriber Identity Module) etc.

The monitoring mobile node application 101 captures usage-based and/or user-based telematics data of the cellular mobile device 10 and/or the user 6/61/62 of the cellular mobile device 10. The mobile telecommunications apparatuses 10 and the monitoring cellular mobile node application 101 can e.g. be connected to an on-board diagnostic system 431, . . . , 435 and/or an in-car interactive device 441, . . . , 445, wherein the mobile telecommunications apparatuses 10 capture usage-based 31 and/or user-based 32 automotive data 3 of the motor vehicle 41, 42, 43, . . . and/or user. The mobile telecommunications apparatuses 10 can for example provide the one or more wireless connections 1024 by means of radio data systems (RDS) modules 10241 and/or positioning system 10242 including a satellite receiving module and/or a mobile cellular phone module 10243 including a digital radio service module and/or a language unit 10244 in communication with the radio data system 10241 or the positioning system 10242 or the cellular telephone module 10243. The satellite receiving module 10242 can for example comprise a Global Positioning System (GPS) circuit and/or the digital radio service module comprises at least a Global System for Mobile Communications (GSM) unit. The plurality of interfaces of the mobile telecommunications apparatuses 10 for connection with at least one of a motor vehicle's data transmission bus can for example comprise at least on interface for connection with a motor vehicle's Controller Area Network (CAN) bus, e.g. in connection with an on-board diagnostics (OBD) port, or another connection for example for battery installed devices, or also OEM (Original Equipment Manufacturer) installed systems obtaining information access to on-board sensors or entertainment systems (such as Apple Carplay etc.) providing the necessary vehicle sensor information.

As mentioned, a data link 21 is set by means of the wireless connection 105 of the mobile telecommunication apparatus 10 over the mobile telecommunication network 2 between the mobile telematics application 101 as client and an intelligent central automotive circuit 11, wherein the mobile telecommunication apparatus 10 acts as wireless node 221, . . . , 225 within said mobile telecommunication network 2, and wherein the operating parameters 40121 and the environmental parameters 40111 are measured and collected in dataflow pathway 103 as automotive telematics data 3 during operation of the motor vehicle 41, 42, 43, . . . via the mobile telecommunication apparatus 10 by means of a mobile telematics application 101 and transmitted to the central circuit 11. The intelligent central circuit 11 comprises a sensory-data-driven core aggregator 110 with a plurality of dynamically applied sensory data-based triggers 1012 triggering, capturing, and monitoring said sensory parameters in the dataflow pathway 103 by means of a mobile telematics application 101 of the mobile telecommunication apparatus 10. The mobile telecommunication apparatus 10 can for example comprise at least a GPS module (Global Positioning System) and/or geological compass module based on a 3-axis teslameter and a 3-axis accelerometer, and/or gyrosensor or gyrometer, and/or a MEMS accelerometer sensor comprising a cantilever beam with the seismic mass as a proof mass measuring the proper or g-force acceleration, and/or a MEMS magnetometer or a magnetoresistive permalloy sensor or another three-axis magnetometers.

The mobile device 10 measures gravitational acceleration movement sensory data by means of the accelerometer based on measuring parameters obtained from the accelerometer. Vehicle 41,42, . . . entering or exiting movement patterns of the user are detected from the acceleration movement sensory data at least comprising pattern for base axis and degree of rotation associated with a vehicle entrance or exit of the user 6. The detected vehicle entering or exiting movement patterns of the user 10 trigger as input features the recognition of a vehicle entering or exiting movement of the user by performing a decision-tree classification on the input features to rule out whether the user entered or exited from a left or right side of the vehicle. It is to be noted that the system 1 can also be realized by using other classification algorithms or structures e.g. boosted tree or neural network etc.

The DPD system 112 allows to select (as few as possible) characteristic input features to reduce the number of model parameters to be used. The inventive DPD (Driver Passenger Detection) method and system comprise at least the following three main steps: 1. Detect the exact moment when the user is entering/exiting the car by analyzing the acceleration. 2. Use the gyroscope data to select various features such as the verse and the degree of the rotation associated to the entrance/exit. 3. Perform a decision-tree classification on the input features to rule out whether the user entered (exited) from the left/right side of the car. The system provides a detection of the exact moment when a person is entering/exiting the car. It is to be mentioned that without this information, any other analysis of the Gyroscope sensor will be useless to the DPD problem due to the many rotations that a user can perform in a huge variety of movements. The detection step is accomplished by collecting information both on the variance of the acceleration in the up/down (Earth reference system) directions and on the presence (or not) of some particular discontinuities in the acceleration signals in the smartphone reference system (not rotated).

One of the advantages of the present invention is its easy adaptability and suitability for its use in modular systems, e.g. to technically provide familiarity detection of trips. Thus, the present Driver Passenger Detection (DPD) system can e.g. be realized as part of an inventive, more complex, and composite modular monitoring and detection system 1 with interactive Driver Passenger Detection (DPD) 112, Transport Mode Recognition (TMR) 113 and trip familiarity detection and/or score 114, allowing a broad monitoring of user actions related to the use of his/her mobile phone.

LIST OF REFERENCE SIGNS

1 Mobile identification and classification system
  10 Mobile telecommunications apparatus
    101 Mobile telematics application (cellular mobile node application)
    102 Integrated Sensors of the mobile node
      1020 MEMS magnetometer
      1021 Proximity Sensor
      1022 Fingerprint Sensor
      1023 Ambient Light Sensor
      1024 GPS Sensor
        10241 Longitude position
        10242 Latitude position
        10243 Altitude position
      1025 Accelerometer
      1026 Gyroscope 1027 Cameras
1028 Touchscreen
1029 MEMS compass module
1030 Back Illuminated Sensor
1031 NFC Sensor
103 Dataflow pathway
105 Wireless connections
  1051 GSM
  1052 WLAN
  1053 Bluetooth
  1054 Near Field Communication NFC (for NFC Sensors)
11 Central circuit
110 Telematics-driven aggregator
  1101 Data Interface
111 Machine-learning module
112 Driver Passenger Detection (DPD) system
113 Transport Mode Recognition (TMR)
  1131 Gradient boosting machine-learning classifier
  1132 Input feature values
  1133 Transportation modes
    11331 Public transportation
    11332 Motorcycle
    11333 Cycling
    11334 Train
    11335 Tram
    11336 Plane
    11337 Car
    11338 Skiing
    11339 Boat
  1134 Transport mode label (Output value)
  1135 Trips
    11351 Transport mode movement pattern
  1136 Supervised learning structure
114 Trip familiarity Measuring and Detection
  1141 Trips 1, . . . , †
    11411 Start Points of Trips 1, . . . , †
    11412 End Points of Trip 1, . . . , †
    11413 Lengths of Trips 1, . . . , † as Measured Geo. Dist.

1142 Pairings 1, . . . , p of Trips 1, . . . , † with $$p = \binom{t}{2} = \left( \frac{t!}{2!(t-2)!} \right)$$

1143 Measured Familiarity Parameters of Pairings 1, . . . , p
    11431 First Geographical Distance
    11432 Second Geographical Distance
    11433 Third Geographical Distance
  1144 Trip Clusters 1, . . . , c
    11421 Distance Threshold for similarity
    11422 Minimum number threshold of trips required
      to create a cluster
12 First-tier automated risk-transfer system
  121 Electronic first-tier resource-pooling system
  122 First-tier risk-transfer parameters
  123 First-tier payment-transfer parameters
13 Second-tier automated risk-transfer system
  131 Electronic second-tier resource-pooling system
  132 Second-tier risk-transfer parameters
  133 Second-tier payment-transfer parameters
2 Data transmission network
20 Cellular network grid
  201, . . . , 203 Network cell/Basic service area
  211, . . . , 213 Base (transceiver) station
    2111, . . . , 2131 Cell Global Identity (CGI)
  221, . . . , 226 Cellular network node
21 Uni- or bidirectional data link
3 Sensory data of the mobile device 10
31 Sensory parameter values of the 3-axis accelerometer
32 Sensory parameter values of the GPS sensor
33 Trips database
  331, . . . , 33† Measured Time Serie of Sensory Parameter Values of
    Stored Trips 1, . . . , †
    33i1 Measured Time Serie of Sensory Parameter Values
      of the 3-axis accelerometer of Stored Trip i
    33i2 Measured Time Serie of Sensory Parameter Values
      of the GPS Sensor of Stored Trip i
41, 42, 43, . . . Motor vehicles
  401, . . . , 405 On-board sensors and measuring devices
  411, . . . , 415 OEM (Original Equipment Manufacturer) devices 421, . . . , 425 Data transmission bus interface
  431, . . . , 435 On-board diagnostic system
  441, . . . , 445 In-car interactive device
  451, . . . , 455 Automotive telematics devices
6 User of the mobile device

The invention claimed is:

1. A method for electronic trip familiarity detection based on sensory data measured by a plurality of sensors of a mobile device associated with a vehicle, the sensors comprising a GPS sensor and an accelerometer, the mobile device acting as a wireless node within a cellular data transmission network by means of antenna connections of the mobile device to the cellular data transmission network, the GPS and accelerometer being connected to a monitoring mobile node application of the mobile device capturing usage-based and/or user-based sensory data of the GPS and accelerometer of the mobile device, the method comprising:

measuring a plurality of time series of sensory parameter values based on measuring parameters obtained from the GPS and accelerometer of the mobile device, each of the measured time series at least comprising a time series of the sensory parameter values including location and speed measurements of the GPS sensor, and the GPS sensor measuring longitude, latitude, and altitude positions of the mobile device as the time series by measuring different speeds of light delays in signals received from two or more satellites;

detecting, for each of the measured time series, a start point and an end point of at least a part of the measured time series of the sensory parameter values, the detection of the start point and the end point triggering allocation of the at least part of the measured series to a trip having the detected start point and the detected end point, the detection of the start point and the end point in the at least part of the measured time series of the sensory parameter values including reporting exact geo-coordinates by a monitoring module when a start recording trigger is fired and when a stop recording trigger is fired, the start recording trigger and the stop recording trigger being fired based on an edge module running in the mobile device monitoring different sensory parameters including at least parameters from motion activity detection, the start recording trigger being triggered by at least detecting a significant location change, and the stop recording trigger being triggered by at least detecting a GPS speed below a threshold value for a predefined time period;

in response to the start recording trigger being fired, processing a trip validation by monitoring GPS speed during a time period below or equal to 120 seconds, wherein when there are at least 5 GPS speed values above or equal to 20 km/h within 120 seconds, the trip validation process is successfully finished and a trip recording stage starts, and during the trip recording stage, the mobile node application records GPS sensory data at 1 Hz and accelerometer sensory data at 10 Hz, the recording being stopped when the stop recording trigger is fired;

measuring, for any pairing of trips, a first geographical distance between the detected start points of said trip pairing and between the end points of said trip pairing based on location measurement parameter values of the sensory parameters of the at least part of the measured time series and a second geographical distance between the detected start point of a first trip and the detected endpoint of a second trip of said trip pairing and between the detected start point of the second trip and the detected endpoint of the first trip of said trip pairing based on the location measurement parameter values of the sensory parameters of the at least part of the measured time series;

measuring a third geographical distance by measuring, for each of the trips of the pairing a trip length between the detected start and end points of each trip of the trip pairing, the third geographical distance being given by a relative difference of the measured trip lengths;

mutually normalizing the first, second, and third geographical distances by applying a modified sigmoid transfer mapping to the first, second, and third geographical distances in a normalized range from 0 and 1; and measuring an overall familiarity parameter value by composing the first, second, and third normalized geographical distance values to a weighted average of the first, second, and third normalized geographical distance values, wherein an overall familiarity parameter value of 0 indicates identical trips and an overall familiarity parameter value of 1 indicates completely different trips.

2. The method for electronic trip familiarity detection according to claim 1, wherein clusters of trips are stored having start and end regions with a defined radius.

3. The method for electronic trip familiarity detection according to claim 2, wherein a center of a start and/or end region is defined by an average of all start and end points of trips associated with a cluster and the radius is defined as a respective standard deviation.

4. The method for electronic trip familiarity detection according to claim 2, wherein, for a cluster, an average travelled distance and its standard deviation are stored.

5. The method for electronic trip familiarity detection according to claim 4, wherein a trip is matched by generating a distance between start and/or end points in units of the respective radius and a distance in terms of travelled kilometers in units of the standard deviation.

6. The method for electronic trip familiarity detection according to claim 2, wherein the trips are clustered using an agglomerative clustering by a machine learning structure grouping iteratively together trips that are closest together until there are no trips left that are closer together than a defined threshold.

7. The method for electronic trip familiarity detection according to claim 6, further comprising using one or more predefined hyperparameter dynamically optimized in dependence of increasing and decreasing performance measures.

8. The method for electronic trip familiarity detection according to claim 7, wherein, for generation of the first, second, and/or third geographic distance, the method includes using at least two hyperparameters, which are weights for the start and end point and for the travelled distance.

9. The method for electronic trip familiarity detection according to claim 7, wherein, for the clustering, the method includes using at least two hyperparameters, which are:

a distance threshold, wherein within its range two trips are detected to form a cluster, and a minimum number threshold of trips required to create a new cluster.

10. The method for electronic trip familiarity detection according to claim 7, wherein the optimization of the one or more hyperparameter is performed separately for each possible technical application comprising different modes of transportation and/or different geographic locations and/or driver to passenger trips.

11. The method for electronic trip familiarity detection according to claim 1, wherein the mobile device is a mobile telecommunication device GPS and accelerometer are integrated sensors of said mobile telecommunication device.

12. The method for electronic trip familiarity detection according to claim 11, wherein the mobile telecommunication device is a cellular mobile phone and/or a smart phone.

13. The method for electronic trip familiarity detection according to claim 1, wherein transport modes distinguishable by the method include at least land-based vehicles and/or maritime vehicles and/or air-based transportation means and/or hiking and/or skiing.

14. The method for electronic trip familiarity detection according to claim 13, wherein the land-based vehicles at least comprise distinguishable modes for cars and/or motor bikes and/or bicycles.

15. The method for electronic trip familiarity detection according to claim 1, wherein the detection of the start point and the end point in the at least part of the measured time series of the sensory parameter values includes selecting earliest geo coordinates for the start point and latest geo coordinates for the end point.

16. The method for electronic trip familiarity detection according to claim 1, wherein the detection of the start point and the end point in the at least part of the measured time series of the sensory parameter values includes reporting of the exact geo coordinates by an application when the start recording trigger is fired and when the stop recording trigger is fired.

* * * * *